(12) United States Patent
Maier et al.

(10) Patent No.: US 8,908,674 B2
(45) Date of Patent: Dec. 9, 2014

(54) METHOD FOR CONFIGURING AN OPTICAL NETWORK

(75) Inventors: Guido Alberto Maier, Milan (IT); Simone De Patre, Milan (IT); Giuseppe Ferraris, Turin (IT)

(73) Assignee: Telecom Italia S.p.A., Milan (IT)

( * ) Notice: Subject to any disclaimer, the term of this patent is extended or adjusted under 35 U.S.C. 154(b) by 1084 days.

(21) Appl. No.: 11/989,604

(22) PCT Filed: Aug. 8, 2005

(86) PCT No.: PCT/EP2005/008590
§ 371 (c)(1),
(2), (4) Date: Aug. 5, 2009

(87) PCT Pub. No.: WO2007/016942
PCT Pub. Date: Feb. 15, 2007

(65) Prior Publication Data
US 2009/0296719 A1 Dec. 3, 2009

(51) Int. Cl.
*H04L 12/26* (2006.01)
*H04L 12/28* (2006.01)
*H04L 12/801* (2013.01)
*H04L 12/833* (2013.01)
*H04L 12/721* (2013.01)

(52) U.S. Cl.
CPC ............. *H04L 45/123* (2013.01); *H04L 47/29* (2013.01); *H04L 47/31* (2013.01); *H04L 45/124* (2013.01); *H04L 47/10* (2013.01); *H04L 45/12* (2013.01); *H04L 47/39* (2013.01)
USPC .......................................... 370/351; 370/238

(58) Field of Classification Search
CPC ......... H04L 45/00; H04L 45/02; H04L 45/12; H04L 45/127
USPC .................................. 370/238, 255, 351, 400
See application file for complete search history.

(56) References Cited

U.S. PATENT DOCUMENTS

| | | | |
|---|---|---|---|
| 6,321,271 B1 * | 11/2001 | Kodialam et al. ............. | 709/241 |
| 2002/0018264 A1 * | 2/2002 | Kodialam et al. ............. | 359/128 |
| 2002/0051427 A1 * | 5/2002 | Carvey .......................... | 370/254 |
| 2004/0248576 A1 | 12/2004 | Ghiglino et al. | |
| 2005/0008367 A1 * | 1/2005 | Laalaoua ........................ | 398/49 |
| 2005/0069314 A1 * | 3/2005 | De Patre et al. .................. | 398/5 |
| 2005/0088978 A1 * | 4/2005 | Zhang et al. ................... | 370/254 |
| 2005/0197993 A1 * | 9/2005 | Korotky .......................... | 706/52 |
| 2005/0232157 A1 * | 10/2005 | Tyan et al. ..................... | 370/237 |
| 2007/0297405 A1 * | 12/2007 | He ................................. | 370/389 |
| 2011/0069703 A1 * | 3/2011 | Fiaschi et al. ................. | 370/357 |

OTHER PUBLICATIONS

Hiroaki Harai, "Performance of Alternate Routing Methods in All-Optical Switching Networks," Apr. 7, 1997, INFOCOM '97 Sixteenth Annual Joint Conference of the IEEE Computer and Communications Socieites, vol. 2, pp. 516-524.*

(Continued)

*Primary Examiner* — Dang Ton
*Assistant Examiner* — Ryan Kavleski
(74) *Attorney, Agent, or Firm* — Finnegan, Henderson, Farabow, Garrett & Dunner, L.L.P.

(57) ABSTRACT

A network model for the planning and/or the provisioning of traffic flows in a communication network includes nodes interconnected with each other by links according to a given network topology. The network model uses a graph defined by arc objects storing information related to both the links and adjacent nodes thereof.

19 Claims, 27 Drawing Sheets

(56) References Cited

OTHER PUBLICATIONS

Maier et al., "Static-Lightpath Design by Heuristic Methods in Multifiber WDM Networks"; Proceedings of OptiComm 2000 SPIE Conf., Dallas, pp. 64-75, (2000).

Jukan et al.; "Service-Specific Resource Allocation in WDM Networks with Quality Constraints", IEEE Journal on Selected Areas in Communications, vol. 18, No. 10, pp. 2051-2061, (2000).

Lee et al.; "A wavelength-Convertible Optical Network", IEEE Journal of Lightwave Technology, vol. 11., No. 5/6, pp. 962-970, (1993).

Zhang et al.; "An Efficient Heuristic for Routing and Wavelength Assignment in Optical WDM Networks"; Proceedings of IEEE ICC 2002, vol. 5, pp. 2734-2739, (2002).

Palla et al.; "Statistical mechanics of topological phase transitions in networks"; Physical Review E—Article No. 046117, vol. 69, No. 4, pp. 1-12, (2004).

\* cited by examiner

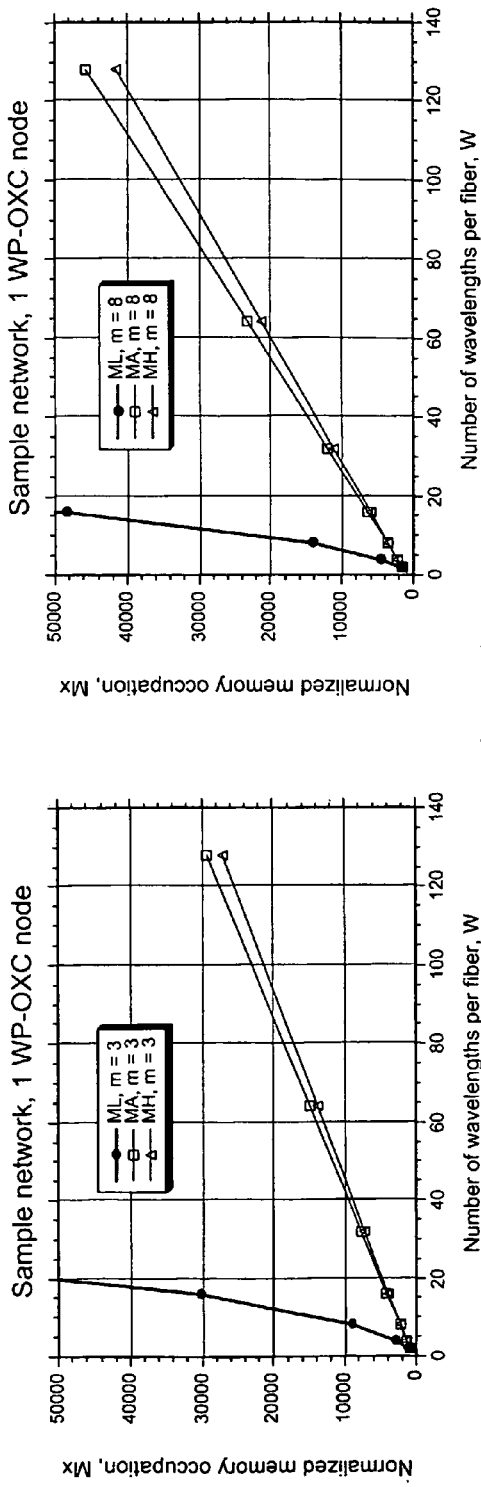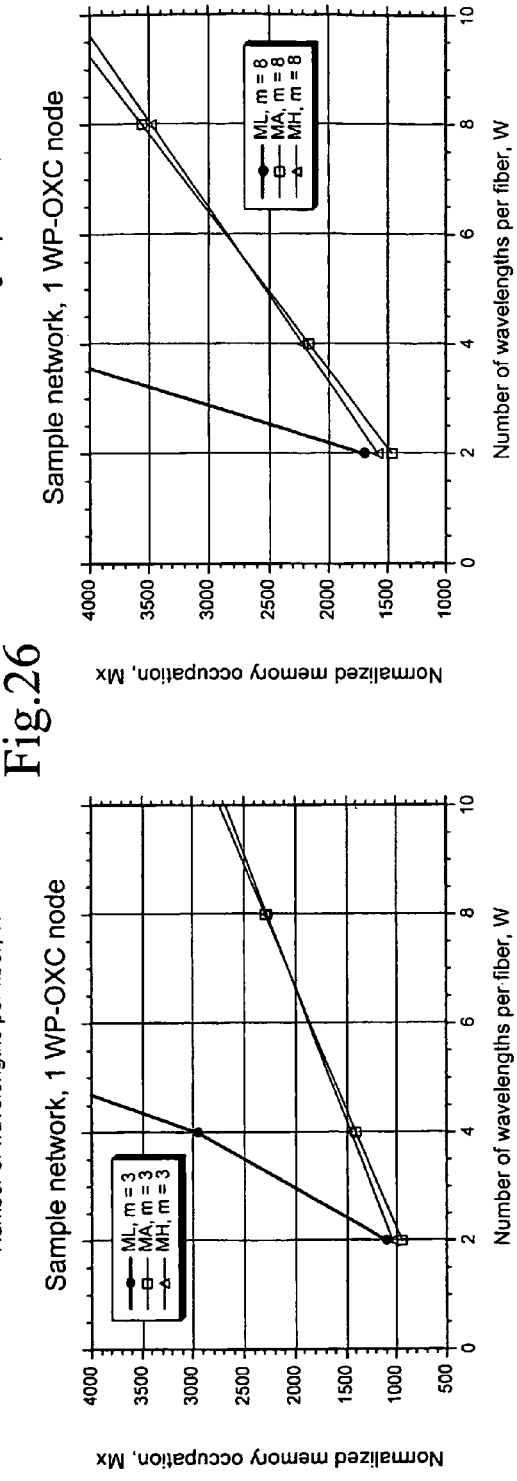
Fig. 26

METHOD FOR CONFIGURING AN OPTICAL NETWORK

CROSS REFERENCE TO RELATED APPLICATION

This application is a national phase application based on PCT/EP2005/008590, filed Aug. 8, 2005.

BACKGROUND OF THE INVENTION

The present invention relates a method for simulating, planning and/or provisioning traffic flows in communication networks, particularly optical networks, more particularly optical networks employing wavelength division multiplexing (WDM).

Transport networks are typically wide area networks that provide connectivity for aggregated traffic streams. Modern transport networks increasingly employ optical technology, and particularly wavelength division multiplexing (WDM) technology, to utilize the vast transmission bandwidth of optical fiber. WDM is based on transmission of data over separate wavelength channels on each fiber. Presently, WDM is mainly employed as a point-to-point transmission technology. In such networks, optical signals on each wavelength are converted to electrical signals at each network node. On the other hand, a WDM optical networking technology, which has been developed within the last decade, and which is becoming commercially available, employs wavelengths on an end-to-end basis, without electrical conversion in the network.

Planning of a transport network refers to assigning network resources to a traffic demand. Efficient planning is essential in minimizing the investment made on the network required to accommodate a given demand. In WDM networks, traffic is carried by means of circuit switched connections, optically routed on the basis of their wavelength. In the context of WDM optical networks, planning means routing and wavelength selection for a set of end-to-end wavelength allocation demands (or "connection requests"), a demand distribution and a network structure being given.

A WDM network is characterized by its physical topology, that is, by the manner in which its nodes are interconnected by optical links. Though the ring is the most studied and most common topology today, mesh networks are being developed and deployed.

In a mesh optical network, a set of switching nodes is interconnected by a plurality of fiber links. It is assumed that each path p between any pair of source and destination nodes (not necessarily adjacent) requires a dedicated wavelength w on each link belonging to the path itself. The pair (p, $\overline{w}$) is referred as "lightpath", $\overline{w}$ being a vector collecting the wavelengths w used on each link of the path. If the path p connects adjacent nodes, the lightpath is typically referred as "lighthop". A source-destination node pair may require more than one lightpath. The typical context assumes that there is a fixed set of wavelengths available on each fiber, and therefore the connections are established at the expense of possibly multiple fibers on network links, typically bundled in one or more optical cables. The switching nodes are the Optical Cross Connects (OXCs). They perform switching on the WDM transit lightpaths, preferably in all-optical way, that is, without intervention of electronics. In addition they may behave as terminal equipment for some lightpaths, performing add and/or drop functions. Further to switching, OXCs may effectuate wavelength conversion. Other nodes may perform exclusively add and/or drop functions (Optical Add/Drop Multiplexers, or OADMs). In the context of planning, the term "wavelength" may refer to a label assigned to a lightpath in each link, instead of the actual value of the wavelength itself. Each fiber has a cost, typically reflecting the installed fiber material, optical amplifiers, and optical termination equipment at both ends of the link. The cost of the OXCs and of the OADMs may also be taken into account. The objective of planning may be typically taken as the minimization of the total network cost.

In WDM networks, routing is coupled with wavelength assignment, that is, which wavelength channel should be allocated to a lightpath in each link. The combination of these two functions is called Routing and Wavelength Assignment (RWA). In the case of multifiber links, RWA becomes Routing, Fiber and Wavelength Assignment (RFWA), as also a particular fiber must be selected on each link for a given lightpath. The complexity of the RFWA function greatly depends on the wavelength conversion capability of the switching nodes of the network. WDM networks may be distinguished in three categories, according to their wavelength conversion capability:

a) Wavelength Path (WP) networks: no wavelength conversion capability is provided in the switching nodes;
b) Virtual Wavelength Path (VWP) networks: every node is fully equipped with wavelength converters so that an incoming optical channel can always be converted on an idle output wavelength;
c) Partial Virtual Wavelength Path (PVWP) networks: only part of the nodes are equipped with wavelength converters.

Two different traffic types may be offered to a WDM network:

a) static traffic: a known set of permanent connection requests is assigned a priori to the network, which must be able to satisfy all the requests together, starting from the idle network;
b) dynamic traffic: connection requests arrive at random instants to the nodes of the network and connections are semi-permanent (i.e. temporary with long duration). Each connection is set up independently while other connections are active and network resources have already been allocated to other lightpaths. This situation is also referred in the art as "provisioning". In general, with provisioning there is no warranty that the network is able to find enough idle resources to satisfy a particular connection request: in this case, the connection is blocked.

Static traffic is usually considered when a new network should be started up or an existing infrastructure should undergo a large scale reconfiguration or a physical topology upgrading. In these cases the network can be planned according to future traffic. Static planning can be summarized as in the following: given a static traffic matrix, comprising a set of connection requests between pairs of source-destination nodes, find the optimum values of a set of network variables that minimize a given cost function, under a set of constraints. The choice of variables, cost function and constraints greatly varies from case to case.

Dynamic traffic can be considered during normal operation lifetime of the WDM network. In dynamic traffic conditions the optimal RFWA must be determined for every new lightpath requested in a given instant of time by a node pair of the network, keeping into account the network resources already allocated to other active connections. To perform the three functions of RFWA on the new connection request, a routing, a fiber and a wavelength assignment criterion has to be chosen: the main approach is to choose in a heuristic way among known simple algorithms. Path routing is usually done by "Shortest Path" (SP) or "Least Loaded Routing" (LLR). The SP method tends to route the new connection along the shortest physical path linking the source node to the destination node. For defining the distance two metrics can be used: the first, referred as "Minimum Hop" (mH), evaluates the number of links (or lighthops) concatenated to form the path; the second, referred "Minimum Length" (mL), considers the total physical length of the path. The LLR method tends to route the lightpath avoiding links with very high loads (i.e. a small number of free wavelengths).

Typical wavelength and fiber assignment criteria include "Pack", "Spread", "First Fit" and "Random". "Pack" and "Spread" consider the utilization of wavelengths on the network and define a priority order, promoting the most and the least used wavelength in the network, respectively. "First Fit" creates an arbitrary and preset priority order for wavelength selection which is kept unchanged throughout the whole network. In "Random" criterion, no priority order is predetermined and the wavelength assignment is made randomly.

Solving the static traffic planning with heuristic algorithms developed for dynamic traffic is known. For example, G. Maier, A. Pattavina, L. Roberti, T. Chich, "Static-Lightpath Design by Heuristic Methods in Multifiber WDM Networks", Proceedings of OptiComm 2000 SPIE Conf., Dallas, October 2000, pg. 64-75, disclose an approach to WDM multifiber network design and optimization under static traffic aimed to minimize the number of fibers in the network. The authors used a tool named "layered graph" (sometimes called wavelength graph) as a working auxiliary representation of the network state. This representation, often used for dynamic traffic analysis or for static optimization in mono-fiber networks, was used by the authors for a multifiber network optimization with static traffic.

The layered graph in a multifiber WDM network is built by replicating the physical network topology on a set of (W×F) parallel planes or graphs, where W is the number of wavelengths used in the network and F is the maximum number of fibers in a link: each of the n physical nodes of the network appears as a virtual image node in all the (W×F) planes. A further image of the node may represent its add-drop function. Vertical (bidirectional) arcs between the image nodes represent OXC switching operations (fiber switching and wavelength conversion). If a physical node is equipped with wavelength converters its corresponding virtual nodes in different W planes are joined by vertical arcs; otherwise only planes having the same wavelength are vertically connected. Associating a horizontal arc on the layered graph to a lighthop on the network implies both the adoption of the corresponding physical link of the topology and the choice of one particular fiber and one particular wavelength.

In the Maier et al. article mentioned above, a single algorithm performs all these operations exploiting the layered graph. Suitable weights are associated to the nodes, to the vertical arcs and to the horizontal arcs, so that the layered graph is transformed into a weighted graph. Then, a Dijkstra algorithm finds the connection path with the least total weight on the weighted graph, thus obtaining the RFWA of the lightpath.

A layered graph is also disclosed in A. Jukan and H. R. Van As, "Service-Specific Resource Allocation in WDM Networks with Quality Constraints", IEEE Journal on Selected Areas in Communications, Vol. 18, No. 10, October 2000, pp. 2051-2061, that proposes a generic approach to service-differentiated connection accommodation in wavelength-routed networks where, for the network state representation, the supplementary network graphs are defined and referred to as service-specific wavelength-resource graphs. The graphs are used for the appropriate allocation of wavelengths on concatenated physical resources building a wavelength route, along which the necessary transmission quality is achieved and the required management and surveillance functions are provided.

A graph in which a technique usually referred to as "node splitting" is considered is disclosed in K.-C. Lee and V. O. K. Li, "A Wavelength-Convertible Optical Network", IEEE Journal of Lightwave Technology, Vol. 11, No. 5/6, May/June 1993, pp. 962-970. At each node, each wavelength $\lambda_1$ is connected to each wavelength $\lambda_2$ on an inbound link $I_1$ to each wavelength $\lambda_2$ on an outbound link $I_2$. If $\lambda_1 \neq \lambda_2$, a weight greater than zero is added. Furthermore, at each node, a super source vertex is created and connected to each wavelength on an outgoing link. Moreover, a super destination vertex is created and connected to each wavelength on an incoming link.

Y. Zhang, K. Taira, H. Takagi and S. K. Das, "An Efficient Heuristic for Routing and Wavelength Assignment in Optical WDM Networks", Proceedings of IEEE ICC 2002, Vol. 5, April/May 2002, pp. 2734-2739, discloses a heuristic algorithm that sets up and releases lightpaths for connection requests dynamically. The authors disclose an auxiliary graph in which the nodes and the links in the original network are transformed to edges and vertices, respectively, and the availability of each wavelength on the input and output links of a node as well as the number of available wavelength converters are taken into account in determining the weights of edges.

SUMMARY OF THE INVENTION

The Applicants remark that the known network models in all the cases found in literature are not very flexible for the main reason that in them the network is internally represented with a constant level of detail in all its the regions and all its elements. This leads to the drawback that sometimes network planning is carried out with an unnecessary huge complexity of calculation, memory occupation and/or computing time. On the other hand, some other times the model does not allow to simulate, plan or provision a transport network in many possible scenarios.

On one side, with reference to a WDM network, in a simple graph having nodes coincident with the OTN switching nodes and one edge per WDM link, each link carries a multiplex of WDM channels, so that edges of the simple graph must be multiple, i.e. each edge can host multiple connections. Multiplicity (i.e. the maximum number of connections that can be hosted by an edge) is equal to the product of the number of fibers per link F by the number of wavelengths per fiber W. The Applicants remark that this model is very limited, since it is not able to represent wavelength information. The consequence is that it can be used only in scenarios in which the choice of wavelength has no effect on routing, such as for example in VWP networks. Wavelength and fiber assignment can never be done jointly with routing. Furthermore, in case of WP networks, in which wavelength conversion cannot be performed, the wavelength continuity constraint cannot be enforced.

On the opposite side of the "detail scale", the layered graph replicates the network physical topology in as many planes as the number of wavelengths per fiber. Nodes are replicated in respective images, one per plane. Vertical links connecting images of the same node represent wavelength conversions and are created only for nodes having suitable converters. In a multi-fiber network, a number of planes equal to the number of fibers by the number of networks F×W is adopted, thus creating a number of vertical links to represent space switching. The layered graph model has the advantage of being able to store detailed information about wavelength assignment. Routing, fiber and wavelength assignment can be carried out jointly, thus achieving heuristic RWFA solutions very close to the optimal ones. Wavelength continuity constraint can be enforced and partial or limited wavelength conversion cases can be represented.

However, the Applicants remark that a number of drawbacks can be identified with regards to the layered-graph model.

A first drawback arises by considering a network in which there are different fibers hosting different numbers of wavelengths and/or in which there are different links hosting different numbers of fibers. In order to avoid disruption of the layered-plane structure, the number of planes has to be chosen equal to the maximum number of wavelengths per fiber multiplied by the maximum number of fibers per link, evaluated by inspecting all the fibers and links in the network. In fibers having less wavelengths or links having fewer fibers, arcs of the graph representing non-existing wavelength channels must be disabled. This implies that the graph is oversized compared to what would be needed.

A second drawback arises by considering a network in which a portion of (but not all) the network nodes are VWP. The simple model cannot be adopted since at least some of the nodes do not implement wavelength conversion, making the wavelength information relevant to ensure wavelength continuity. On the other hand, the information regarding wavelength assignment is redundant in links terminated on both sides by nodes having full wavelength conversion capability: the particular wavelength assignment adopted on these links does not influence the routing decisions. Given the full wavelength-conversion capability of the nodes, the only condition to be able to route a new connection on those links is that there is at least one wavelength-channel available on at least one fiber of the link, no matter which fiber and no matter which wavelength.

A third drawback is the representation of switching in the layered graph. In the layered graph, inter-plane switching operations (wavelength conversions and/or fiber switching) are represented explicitly by vertical arcs: this gives the possibility of differentiating these transitions by assigning them different weights (possibly disabling some of them to represent blocking conditions). This feature, useful in some situations, introduces an asymmetric representation of the inner node architectures that allows detailing only some particular transitions and not others. Intra-plane transitions can not in fact be represented in detail: for example, a transition from fiber 1 of link A to fiber 2 of link B (with no wavelength conversion) is a vertical arc, to which a suitable weight can be assigned, while a transition from fiber 1 of A to fiber 1 on B it does not correspond to any layered-graph arc, so that a weight cannot be assigned in this case.

The latter drawback could be solved by introducing node splitting for taking into account of switching weights. With node splitting, a node is split into a set of images and new arcs are created to represent internal connections, assigning them suitable weights that describe different switching "costs". However, the Applicants remark that node splitting also implies some disadvantages: node splitting is a pure mathematical tool, i.e. the created arcs do not correspond to any actual physical link that could be identified by an address or a name appearing in the physical topology. Moreover, as the node size gets larger a huge number of new objects (growing as the square of the node size) should be created: the presence of a high number of node images, treated by the heuristic (e.g. shortest-path) algorithms as regular nodes, greatly increments the number of steps and the quantity of information that has to be stored and updated during simulation, planning, or provisioning, resulting in huge complexity and computing time.

According to the Applicants, there is a need of a network model being able to map network elements of the physical topology of a network onto a graph representation in a flexible manner, in which the detail level could be scaled according to the actual needs, so as to limit, case by case, the complexity of the necessary calculation and/or the amount of memory occupation and/or CPU time.

The Applicants have found that this need can be satisfied by implementing a network model in which nodes and links of the network are represented by a same object (referred to as an "Arc" in the following description). With this model, an appropriate detail level can be set based on the features of the nodes and of the links used in the network. The number of defined Arcs is then set on a case-by-case basis, according to the detail level required for modeling the tackled network scenario. This advantageously allows to limit the amount of memory occupation and/or the CPU time needed for planning and/or provisioning the network. At the same time, many different network scenarios can be represented, with no substantial limitation.

In a first aspect, the invention relates to a method for routing at least one traffic flow between a source node and a destination node in a network comprising a plurality of nodes interconnected with each other by a plurality of links according to a predetermined network topology. The method comprises:

representing said network with a graph, wherein the graph comprises at least a first plurality of arcs, wherein each of said first plurality of arcs is associated at least to one link and comprises information at least related to said link;

determining at least one path on the graph for the at least one traffic flow based on said information, said at least one path on the graph comprising a group of said first plurality of arcs;

associating to said at least one path on the graph a respective path in said network for said at least one traffic flow;

wherein each of said plurality of arcs is further associated to one node being adjacent to said link and said information is further related at least to said node.

In a second aspect, the invention relates to a communication network comprising a number of nodes interconnected with each other by links according to a predetermined network topology. The network further comprises a network controller for configuring the nodes in order to establish network paths for routing traffic flows according to a plurality of connection requests, and a network manager being adapted to apply the steps of the method of the first aspect of the invention, for allocating each of said plurality of connection requests, so as to output configuration information for the network controller, said information being suitable for configuring said nodes in order to establish said network paths.

In a third aspect, the invention relates to a computer program loadable into the memory of a computer, comprising software code portions for performing the steps of the method of the first aspect of the invention, the computer program product being adapted, when run on a computer, to output information suitable for allocating at least one connection request on a network comprising a plurality of nodes interconnected with each other by a plurality of links according to a predetermined network topology.

BRIEF DESCRIPTION OF THE DRAWINGS

Further features and advantages of the present invention will be better illustrated by the following detailed description, herein given with reference to the enclosed drawings, in which:

FIG. 26 shows plots of quantities representing computing memory allocation versus wavelength for the graphs of FIGS. 23, 24 and 25;

DETAILED DESCRIPTION OF PREFERRED EMBODIMENTS OF THE INVENTION

Figure 1:
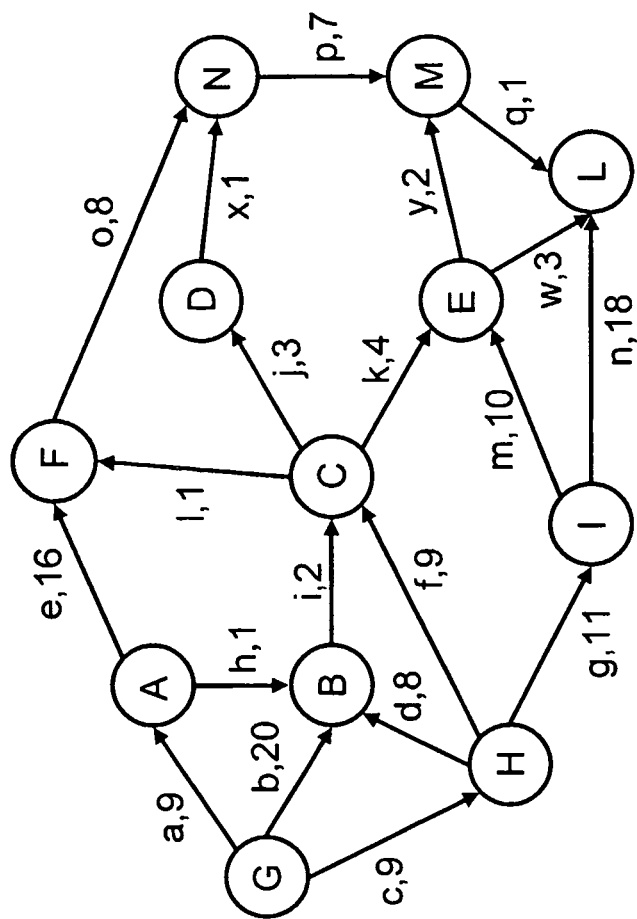
FIG. 1 schematically shows an exemplary mesh network, with weights assigned to the links connecting the network nodes.

The model that will be disclosed in the following can exemplarily be applied to an OTN/ASON (Optical Transport Network/Automatic Switched Optical Network) network scenario, possibly managed by the GMPLS (Generalized Multi Protocol Label Switching) protocol. However, it is applicable, in general, to problems in which network resources have to be assigned to any kind of traffic flow. More precisely, it is best suited to cases in which network resource assignment can be solved by graph-based algorithms. Typical applications might comprise: MPLS (Multi Protocol Label Switching), SDH/Sonet (Synchronous Digital Hierarchy/Synchronous Optical Network) network design, IP-TE (Internet Protocol/Traffic Engineering) routing, ATM (Asynchronous Transfer Mode) routing, PSTN (Plain Service Telephone Network) routing, ISDN (Integrated Service Digital Network) routing, Frame-Relay routing, X.25 routing.

With exemplary reference to a WDM network, the setup of one or more lightpaths on a WDM network, to respectively allocate one or more connection requests, typically requires two main steps:

a) search of a RFWA solution: collection of all the information needed for the setup of the lightpath, that is, how to route the channels on the fibers in the various links crossed by the lightpath;

b) network configuration: actions performed on the network equipment (e.g. the OXCs), according to the information collected in step a), in order to create and correctly route the channels from the source node to the destination node.

Step a) is performed by an entity referred to as a "network manager", that can be centralized or distributed in the network. RFWA can be performed for a single connection request, e.g. in case of dynamic planning, or for a set of connection requests, e.g. in case of static planning. The network manager can be an actual physical system, typically an automatic system (i.e. a system that does not need of an active, e.g. manual, intervention from a user), which is active in the life period of the network, or it may be a "virtual concept" corresponding to the off-line planning phase of a static network.

In any case, the network manager typically needs a model of the network to carry out its operations. A network model is a representation of the network, i.e. a data structure that contains all the information relevant to the network, such as for example: physical topology, virtual topology (connection requests), characteristics of links and nodes, network state (i.e. which resources have already been allocated to which lightpath and which are instead available). The network model is used by algorithms run by the network manager in order to evaluate the RWFA information necessary to control the network for the set-up of the lightpaths. During the evaluation process these algorithms may also temporary alter the state of the network model, e.g. tentatively rerouting a connection: this does not imply any change in the state of the real network.

Step b) is performed by an entity referred to as a "network controller", that interacts with the network manager, and that can be centralized or distributed in the network. In particular, when the network manager has completed its evaluation process using the network model, it transfers the RWFA information to the network controller, which has the duty of accordingly changing the state of the actual network by reconfiguring its switching elements. Step b) is not implemented during static planning.

If the network management and control occur in a distributed way, the network manager and the network controller are implemented in each node of the network. In this case, the controller can discover the network topology by communication with the other nodes by means of standard signaling protocols known to the skilled in the art. Furthermore, the only configuration information provided by the manager to the controller concerns the local configuration of the nodes. The controller may then communicate such local configuration information to other network nodes by means of standard signaling protocols known to the skilled in the art.

If the network management and control occurs in a centralized way, the network topology can be discovered by the controller by receiving information from all the network elements by means of a standard Telecommunication Management Network (TMN) known to the skilled in the art. In this case, the manager should provide the controller with configuration information for all the elements of the network; the controller may then propagate such information to all the network elements via the TMN.

The network manager may be implemented as a computer program. The network model used by the network manager may be a data structure recognized and used by such computer program. When RWFA is solved with heuristic methods (e.g. in the case of dynamic RFWA or static planning by dynamic RFWA), a network representation based on a so-called "graph" is typically used. The elements of the graph are labeled. The label is a list of properties of an element that may include, for example: an identifier, a status (such as for example "free" or "already allocated"), one or more weights (e.g. equipment cost, physical length, attenuation, etc.) and so on. In practice, a graph modeling a network may be implemented via software objects, as a pointer structure in which each element contains a list of pointers to its neighbors, so as to represent the adjacency relations of the topology, and a label containing a list of properties.

The actual operations performed by the network manager, implemented in suitable software code portions of a computer program, may be carried out by any well-known general purpose computer having appropriate processing abilities, as it will be clear to those skilled in the art. In the following, descriptions of steps and/or objects will be presented that will enable those skilled in the art to realize computer program code portions appropriate to particular contexts and facilities, such as particular machines, computer languages, operating systems and the like. The computer program implementing the network manager can be for example embodied in one or more executable files, resident on a suitable support accessible from the memory of the computer, such as a hard disk, a removable disk or memory (e.g. a diskette, a CD- or DVD-ROM, or a USB key), or an external disk readable through a LAN (Local Area Network). For the purposes of the present invention, the terms "software program" or "computer program" also comprise files needed for the execution of the executable file or files, such as libraries, initialization files and so on, that can be resident on a suitable support accessible from the memory of the computer, such as a hard disk, a removable disk or memory (e.g. a diskette, a CD- or DVD-ROM, or a USB key), or an external disk readable through a LAN. Furthermore, for the purposes of the present invention the terms "software program" or "computer program" also comprise files possibly different from the executable file or files and/or from the files needed for the execution of the same, embodied in an installable software, adapted, when run on the computer, to install the executable file or files and the files needed for the execution of the same. The installable software can be resident on a suitable support, such as a removable disk or memory (e.g. a diskette, a CD- or DVD-ROM, or a USB key) or it can be available for download from a network resource, such as a server comprised in a LAN, or reachable through an external network, for example the Internet.

Moreover, for the purposes of the present invention, the terms "network manager" and "network controller" should be intended as generic terms, meaning any equipment or apparatus (either hardware, or software, or a mix of hardware and software) being capable of implementing the planning and/or the provisioning of traffic flows (e.g. lightpaths) to be routed on a network. For example, they may be included in equipment for implementing a centralized or distributed control plane of a MPLS or GMPLS network.

Figure 27:
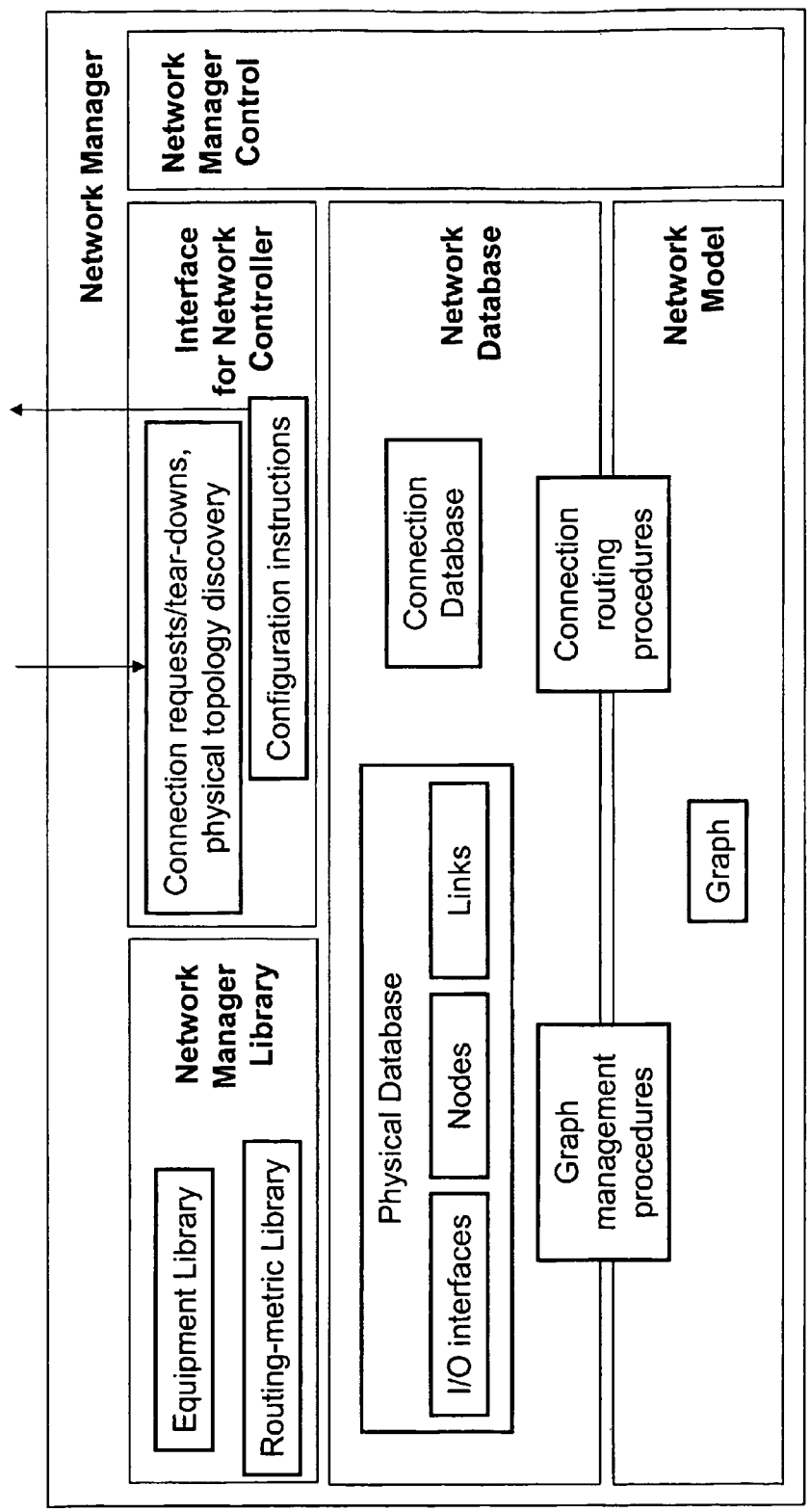
FIG. 27 schematically shows functional blocks of one embodiment of a network manager according to another aspect of the present invention.

FIG. 27 shows, in functional blocks sufficient for the purposes of the invention, an exemplary embodiment of a network manager suitable to be used for the planning and/or provisioning of a network. The various functional blocks shown in FIG. 27 may represent routines or objects of a computer program implementing the network manager, as understood by those skilled in the art.

The network manager of FIG. 27 comprises an Interface for a Network Controller function. This interface includes a set of the procedures derived from the network controller, carrying information regarding a discovery of the physical topology of the network, as well as information regarding the connection requests to be setup and/or torn-down. Another set of procedures included in the interface for the network controller should allow the network manager to provide the network controller with configuration instructions for the network elements, in order to setup or tear down the connection request(s).

The exchange of information between the network manager and the network controller may occur by any means known to the skilled in the art, for example by exchanging electronic-sheet data files. Use of an automated network controller is preferred. However, the network controller may be represented, in certain cases, by a human operator. In such cases, the interface to the network controller of the network manager may be any man-to-machine interface known by the skilled in the art. These cases also include the utilization of the network manager to perform the off-line planning phase of a fully static network.

The network manager of FIG. 27 further includes a Network Manager Library function, for storing reference information related to rules to be applied for determining the path routing. The Network Manager Library may include information related to the network equipment (Equipment Library), as well as information related to the metric or metrics used for determining path routing (Routing-metric Library). The Equipment Library may, in particular, store information related to predefined types of nodes and/or links usable in any kind (or in a majority) of network. The Routing-metric Library may, in particular, store information related to procedures concerning at least one routing criterion and an associated metric. A plurality of routing criteria and/or metrics can be defined in the Routing-metric Library.

The network manager of FIG. 27 further includes a Network Database function, for storing information related to the elements present in the network, as well as information related to the connection requests to be managed and/or already managed. More particularly, a Physical Database may store information related to the nodes, and/or to the links, and/or to the input/output (I/O) interfaces associated to the nodes, disposed in the network. In order to fill the Physical Database, interaction with the Interface for the Network Controller function may be required, particularly for deriving information retrieved from the physical topology discovery procedures. Interaction between the Physical Database and the Network Manager Library may be further required, particularly for deriving reference information stored in the Equipment Library (e.g. related to the types of nodes) and/or in the Routing-metric library. A Connection Database is further provided in the Network Database function in order to record data related to the connection requests to be established and/or already established. In order to fill the Connection Database, interaction with the Interface for the Network Controller function may be required, particularly with the connection requests setup/tear down procedures (for recording the new requests for traffic flows to be established or torn down). An interaction with the Interface for the Network Controller may be further required for passing the configuration instructions to be provided to the network controller for the actual setup/tear down of the connection request.

The network manager of FIG. 27 further includes a Network Model function, storing an abstract representation of the network. The Network Model function is one of the main elements of the network manager. The network model is based on a Graph, more particularly a weighted graph, in which a "weight" is assigned to the elements of the graph representing the physical network equipment. Known algorithms, such as, for example, the Dijkstra algorithm for finding the "shortest" path (i.e. the path corresponding to the minimum weight), may be run to explore the graph, for determining the best routing for allocating a connection request.

The Network Model function interacts with the Network Database function for the construction and/or the update of the Graph. These operations may be managed by a Graph management procedures function, interworking with both the Graph and the Network Database function (particularly, the Physical Database). Interaction between the Graph management procedures function and the Network Manager Library function may be further required (particularly with the Equipment Library), in order to gain reference information not included in the Physical Database.

The Network Model function further interacts with the Network Database function for running the routing algorithms on the Graph for the allocation of the connection requests. For such purpose, a Connection routing procedures function may interwork with the Graph and with the Connection Database, storing the procedures for the proper running of the routing algorithm (or algorithms) once a connection request has to be allocated. Information coming from the Routing-metric Library of the Network Manager Library function may be required to the Connection routing procedures function.

The network manager of FIG. 27 further includes a Network Manager Control function, that can be implemented as a controlling procedure in a computer program embodying the network manager. This controlling procedure should be able to activate the needed procedures and/or functions, to coordinate the information flows between them.

In order to describe the network model according to an aspect of the present invention, the exemplary network depicted in FIG. 1 will be considered, in which a plurality of nodes, each labeled by a respective upper-case letter, are interconnected with each other by a plurality of links, each labeled with a respective lower-case letter. A weight assigned to the link is also shown near the link label in FIG. 1, representing, for example, a cost associated to the link equipment. The links shown in FIG. 1 are unidirectional, as represented by the arrows connecting the various nodes.

The network of FIG. 1 is modeled by a graph comprising elements called Arcs. For the purposes of the present invention, an Arc is generally referred to as a basic data structure adapted to store information. In particular, the Arc in the graph of the model according to one aspect of the invention stores information related to both a link and one adjacent node thereof of the network. As it will become clear in the following, this choice allows to flexibly representing physical switching nodes in a sufficiently detailed way, without introducing complexity or arbitrary elements, such as with node splitting. Each Arc is advantageously labeled with a name label (Arc ID).

In order to represent non-symmetrical physical links, the graph is preferably unidirectional, and thus each Arc is unidirectional. In other words, the output of an Arc is connected to the input of other Arcs (neighbor Arcs) according to the graph topology. More particularly, two Arcs are considered "neighbors" if they store information related to adjacent links (i.e. links being separated by a single node in the network topology). In preferred embodiments, in order to limit the number of objects involved in the model, the connections between the Arcs are not represented by additional graph elements: on the contrary, topological information may be included in the Arcs themselves. This may be implemented by including in each Arc a list containing the Arc IDs of each of its neighbor Arcs: such a list implicitly creates the set of logical connections between an Arc and its neighbors. In other words, each Arc is connected in the graph to a "neighbor" Arc by a virtual connection, representing the internal connectivity of the node associated to the Arc.

Figure 2:
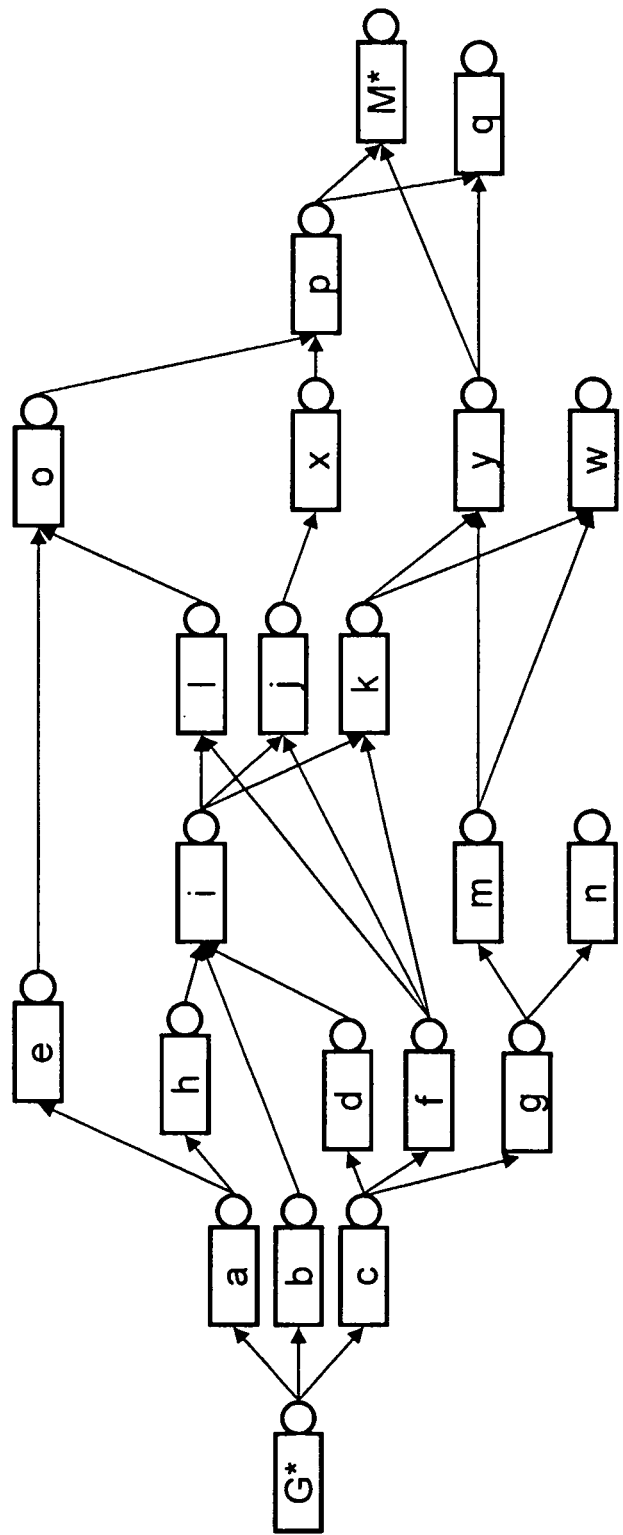
FIG. 2 schematically represents a first embodiment of a graph according to an aspect of the invention, modeling the exemplary mesh network of FIG. 1.

FIG. 2 displays a representation of the graph modeling the exemplary network of FIG. 1. Nodes are not explicitly represented any more: they have been "absorbed" in the neighbor list of each Arc. For example, the Arc labeled as "a" in FIG. 2 stores information related to both the link labeled as "a" and the node labeled as "A" in FIG. 1. Two Arc objects G* and M* have been introduced in FIG. 2 representing the source and destination nodes of a connection request between nodes G and M of FIG. 1. For example, these Arc objects may practically represent the input and output UNI (User Network Interface) interfaces of the two nodes: thus, the specific pieces of information stored therein derive from the corresponding UNI objects of the physical topology. When performing the routing algorithm, the Arcs representing the interfaces play the role of source and destination of the requested connection in the weighted graph.

Figure 3:
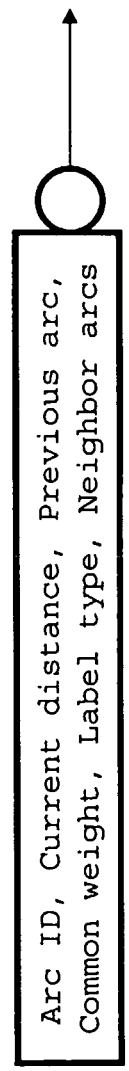
FIG. 3 schematically represents a first embodiment of Arc object used in a graph according to an aspect of the present invention.

FIG. 3 shows a graphical representation of an exemplary Arc object, containing the following basic information:
  a name label (Arc ID): a label that allows to distinguish the different Arcs from each other;
  a "current-distance" field (Current distance): an updatable field that indicates a "distance" of an Arc reached by the routing algorithm from the object representing, in the graph, the source node of a connection request being allocated. Such distance is calculated according to a predetermined metric, e.g. the sum of the weights of the Arcs already crossed by the routing algorithm;
  a "previous-Arc" field (Previous Arc): an updatable field that indicates the last Arc crossed by the routing algorithm before the Arc under consideration, during the allocation of a connection request;

a common weight (Common weight): a "cost" associated to the Arc, that takes into account of information related to both the link equipment and the node equipment represented by the Arc;

a temporary/permanent field (Label type): an updatable field used by the routing algorithm for exploring the graph, during the allocation of a connection request. As soon as it becomes clear that the path followed to reach a given Arc is the best one (e.g. because the path followed has a minimum weight sum), the Label type is set to permanent and the neighbor Arcs are explored;

a neighbor Arcs list (Neighbor Arcs): a list of Arcs being adjacent to the Arc under consideration.

Figure 4:
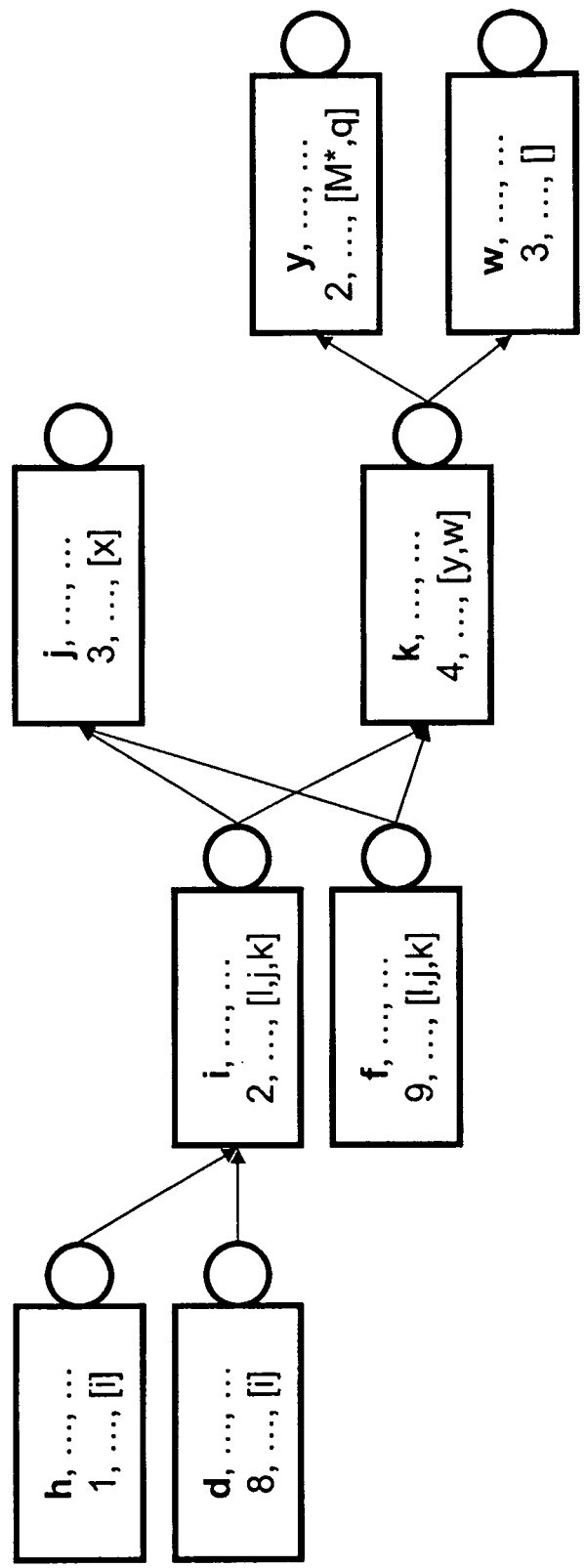
FIG. 4 schematically shows a portion of the graph of FIG. 2, showing weights assigned to the Arc objects and a neighbor list field associated with each Arc object.

FIG. 4 shows a portion of the modeled network of FIG. 2 with Arc objects storing an Arc ID, a common weight and a list of Neighbor Arcs, as described so far. The common weight is directly derived from the link weights set in FIG. 1: in other words, in the example considered in FIG. 4 it is intended that the weight contribution given by the node portion of each Arc object is null.

An exemplary path-searching algorithm (e.g. a shortest-path searching algorithm, such as the Dijkstra algorithm) may be run on the Arc-based weighted graph of FIG. 2 (a portion of which is shown in FIG. 4). An exemplary running of a shortest-path searching algorithm will be described hereinafter. It will be assumed that a connection request between the Arc objects G* and M* should be allocated, corresponding to a path (e.g. a lightpath) between the nodes G and M of the network of FIG. 1. The weights of the Arcs of FIG. 2 will be considered as being equal to those specified for the respective links of FIG. 1. The weight associated to the Arc objects G* and M* will be considered as being null.

Initially, for all the Arcs except the source Arc object G*, the Label type is set to temporary, the Current distance field is loaded with an infinite-distance value and G* is set as Previous Arc. In a simple exemplary case, referred to a shortest path searching algorithm, an infinite-distance value may be any value greater than the weight of the network diameter, i.e. the maximum node distance (defined as the "length" of the minimum path "length" between any two nodes) among all the possible node pairs in the network. For the source Arc object G*, the Label-type is set to permanent, the Previous Arc is set to G* itself and the Current distance is set to a zero-distance value. In this exemplary case, the zero-distance value is zero. In each algorithm step, all the Arcs having temporary labels are considered. The calculated Current distance values thereof are compared by a distance-comparison procedure, that in this exemplary case may be an arithmetical number comparison. The Arc "winning" the comparison (i.e. the Arc with temporary label having the least Current distance, in the example) is selected as pivot. In case of parity, the choice of the winner can be randomly performed. The Label type of the winning Arc is turned to permanent and all its neighbors are inspected. The Current distance of a neighbor Arc reached from a pivot Arc is calculated by combining the Current distance of the pivot Arc with the weight of the reached Arc, by applying the distance-evaluation procedure. In this exemplary case this procedure is the sum of the Current distance of the pivot Arc with the weight of the reached neighbor Arc. The obtained value is compared by the distance-comparison procedure (that in this exemplary case designates as winner the lower value) to the Current distance stored in the neighbor Arc. If the stored Current distance wins the comparison, the neighbor Arc is not modified. If the newly evaluated distance wins, the Current distance field of the reached neighbor Arc is updated with the evaluated distance-value, and the Arc ID of the pivot Arc is stored into the Previous Arc field of the reached neighbor Arc. In case of parity, the choice can be randomly performed. After all the neighbors have been inspected, a new algorithm step begins by choosing a new pivot. The algorithm goes on until the Label type of the destination Arc object M* is set as permanent.

The following list shows the fields of all the Arcs at the end of the steps required to route the connection G*-M* in the Arc-based weighted graph of FIG. 2. Each Arc is described in the format (Arc ID, Current distance, Previous Arc, Label type). For the sake of simplicity, only fields that have changed from the previous step have been listed:

0. (z, ∞, G*, t), where z stands for all the Arc IDs, except G*; (G*, 0, G*, t)
1. (G*, 0, G*, p), (a, 0, G*, t), (b, 0, G*, t), (c, 0, G*, t)
2. (c, 0, G*, p), (d, 9, c, t), (f, 9, c, t), (g, 9, c, t)
3. (b, 0, G*, p), (i, 20, b, t)
4. (a, 0, G*, p), (e, 9, a, t), (h, 9, a, t)
5. (g, 9, c, p), (m, 20, g, t), (n, 20, g, t)
6. (f, 9, c, p), (l, 18, f, t), (l, 18, f, t), (k, 18, f, t)
7. (d, 9, c, p), (i, 17, d, t)
8. (e, 9, a, p), (o, 25, e, t)
9. (h, 9, a, p), (i, 10, h, t)
10. (i, 10, h, p), (l, 12, i, t), (j, 12, i, t), (k, 12, i, t)
11. (l, 12, i, p), (o, 13, l, t)
12. (j, 12, i, p), (x, 15, j, t)
13. (k, 12, i, p), (y, 16, k, t), (w, 16, k, t)
14. (o, 13, l, p), (p, 21, o, t)
15. (x, 15, j, p), (p, 16, x, t)
16. (w, 16, k, p)
17. (y, 16, k, p), (M*, 18, y, t), (q, 18, y, t)
18. (p, 16, x, p)
19. (q, 18, y, p)
20. (M*, 18, y, p)

The sequence of Arcs of the graph forming the path found between the source Arc G* and the destination Arc M* can be determined by reversing the list of Arcs constructed starting from the destination Arc M* and considering each Previous Arc labeled as permanent. From the above step list, starting from M*, it is obtained: M*, y (see step no. 20), k (see step no. 16), i (see step no. 12), h (see step no. 10), a (see step no. 9), G* (see step no. 4). Thus, the path on the graph of FIG. 2 is: G*, a, h, i, k, y, M*, corresponding to G, A, B, C, E, M on the network of FIG. 1. It can be shown that the same result could be obtained by running a Dijkstra algorithm directly on the network of FIG. 1.

Figure 5:
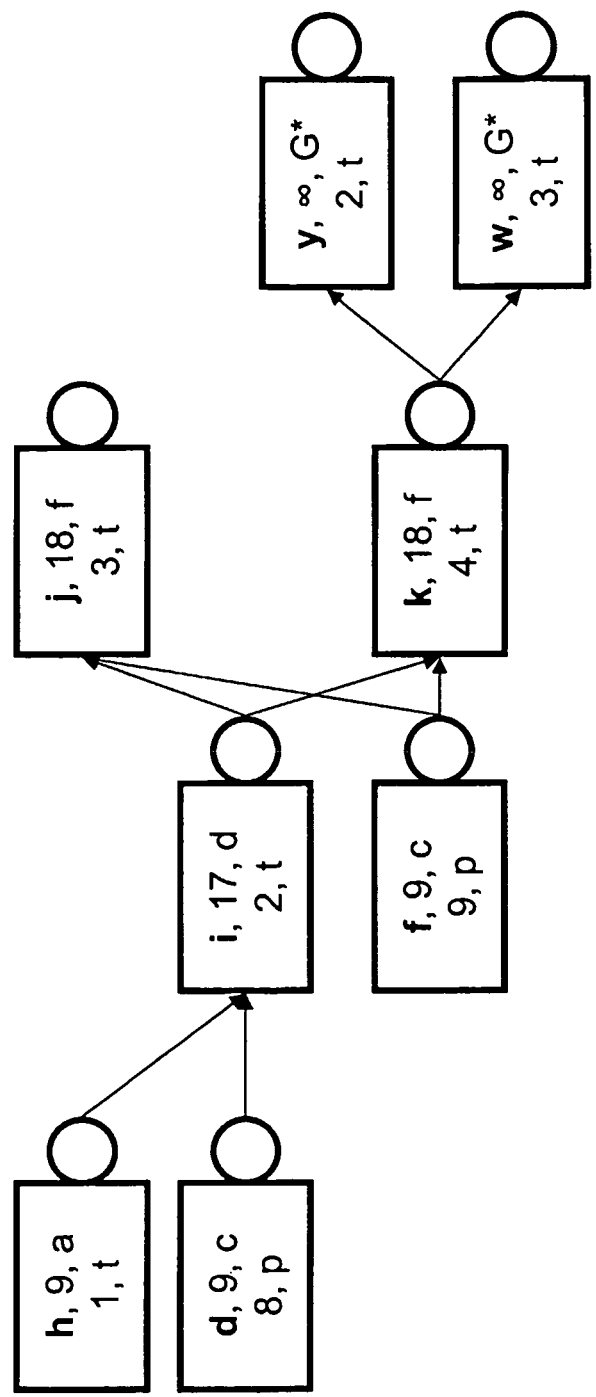
FIGS. 5-8 show how the fields of the Arc objects of the graph portion of FIG. 4 are updated during the running of a path-finding algorithm.
Figure 6:
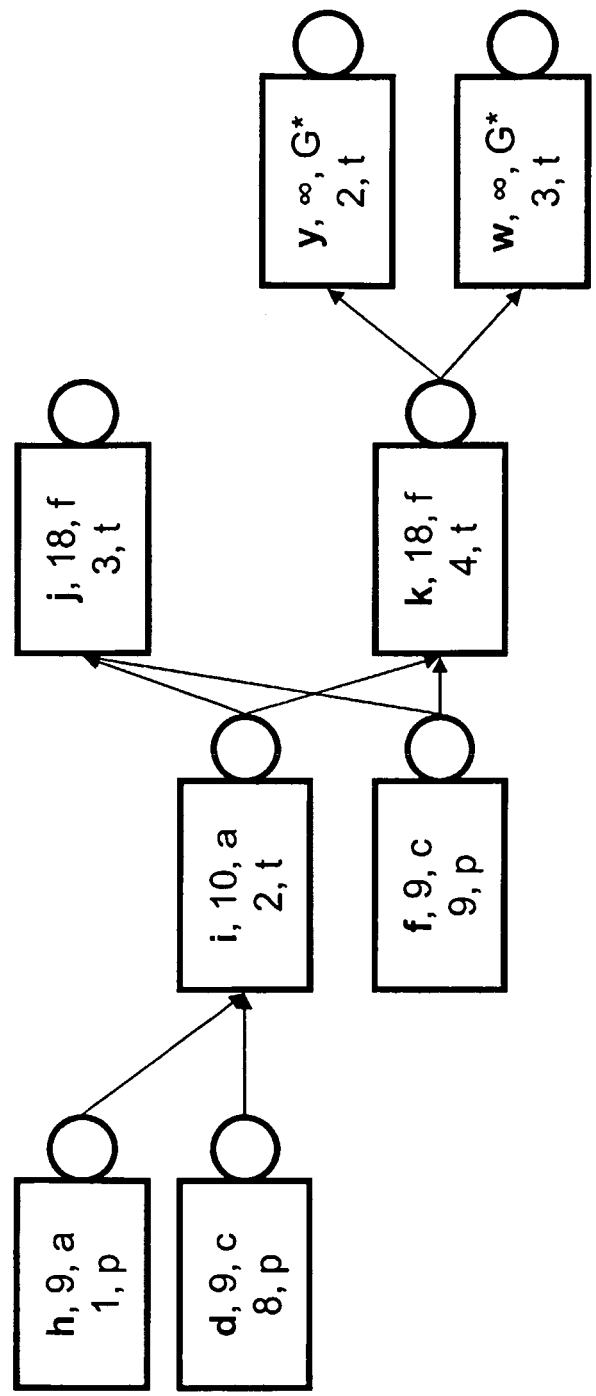
Figure 7:
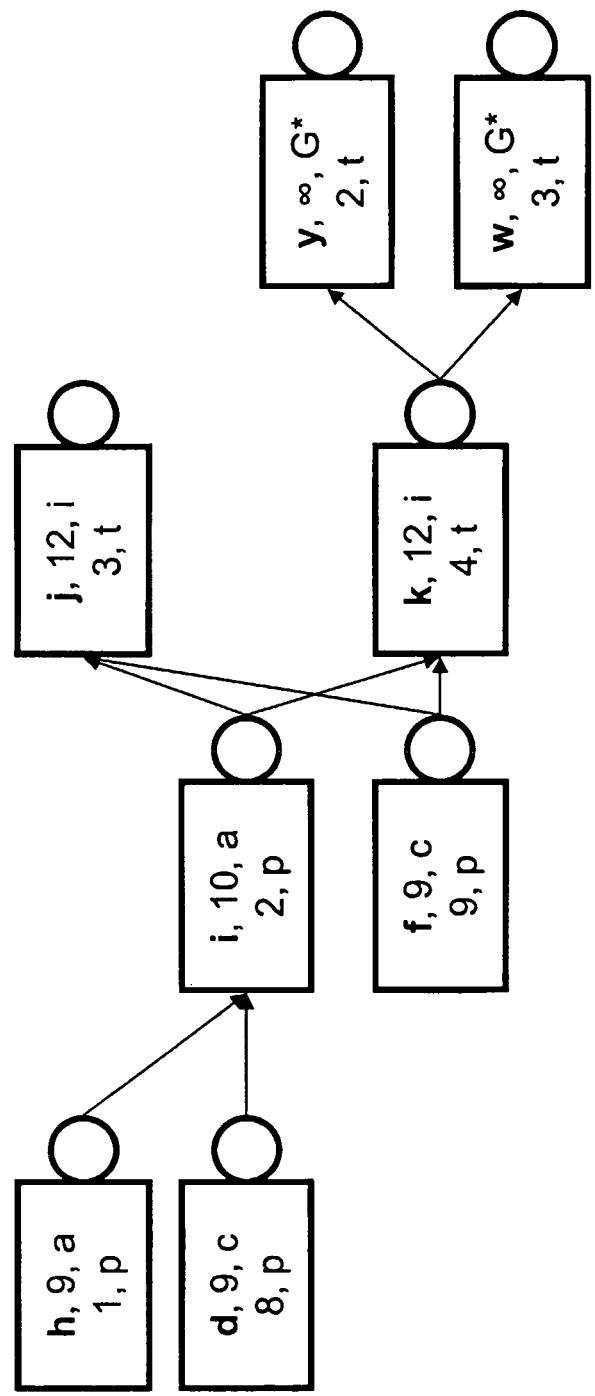
Figure 8:
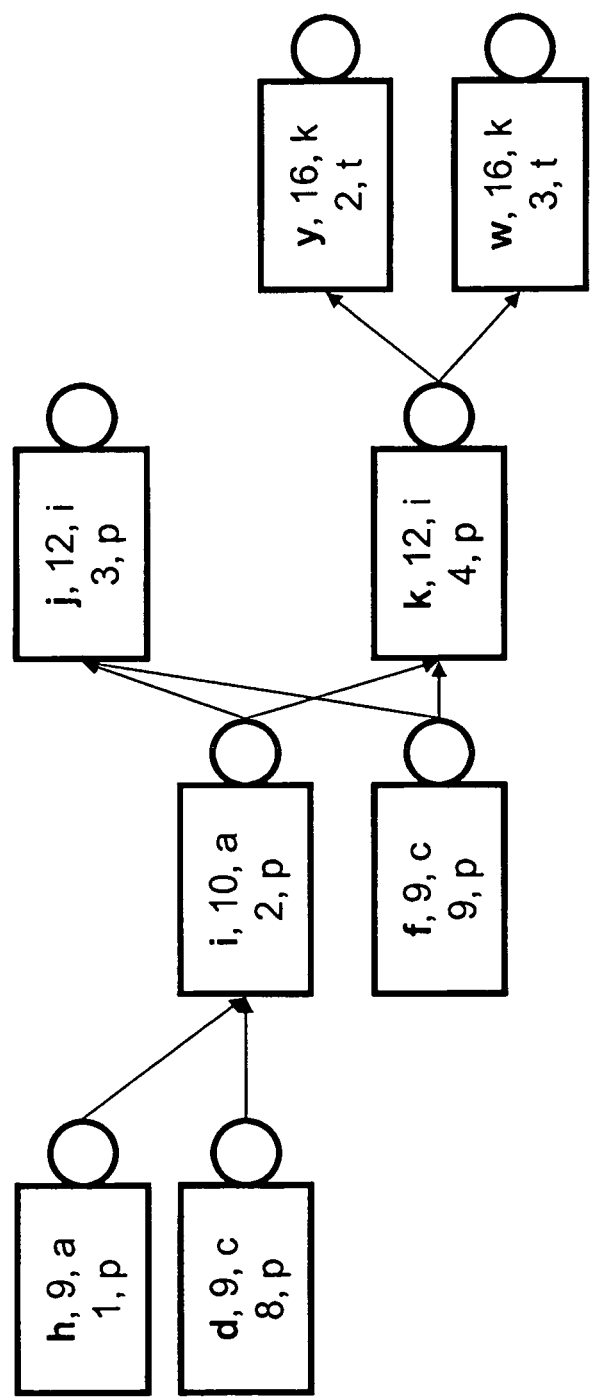

For greater clarity, FIG. 5 shows the status of the elements of the graph of FIG. 2 (more particularly, of the graph portion of FIG. 4) at the end of step no. 7 in the above list: the Neighbor Arcs lists have been omitted from the Arc elements to simplify the figure. The Arc h input-side has been reached from Arc a (as specified in the Previous Arc field of Arc h) at a Current distance value of nine, while the Current distance of Arc i input-side is seventeen via Arc d (Previous arc). In a subsequent step (step no. 9 in the above list) Arc h becomes the pivot and its Label type is thus set to permanent. Then Arc i is considered as the neighbor of Arc h. A new distance value is calculated for Arc i input by combining (summing) the Current distance of Arc h to the Common weight value stored in Arc h. The value obtained (ten) wins the comparison with (i.e., is smaller than) the Current distance value of Arc i. Therefore, the Current distance of Arc i is updated with the value ten and its Previous Arc field is set to indicate Arc h, as shown in FIG. 6. In the subsequent algorithm-step (step no. 10 in the above list), Arc i becomes the pivot: its Label type is set as permanent and the algorithm starts to consider its neighbors l (not shown in FIGS. 4-6), j and k (FIG. 7). FIG. 8 shows the state of the graph portion of FIGS. 4-6 at the end of step no. 13 in the above list, in which also Arc k becomes permanent, after that Arc j has already played the pivot part in a previous step.

In the above example, the weights assigned to the Arcs of the graph of FIG. 2 were equal to the weights assigned to the links of the network of FIG. 1. However, the Arc-based weighted graph according to the present invention displays more advantages when switching-nodes become involved in the routing operation: this situation will be now introduced.

By comparing FIG. 2 with FIG. 1, it is noticed that the transition of a path from Arc i to Arc j corresponds to a switching operation performed by node C, as well as transitions i to k, i to l, f to l, f to j and f to k. In an accurate model for routing, such transitions should neither necessarily be free of cost, nor the transitions should occur all at the same cost as far as the routing algorithm is concerned. In practical situations there could be reasons to prefer a path that avoids configuring a transit node in a certain way compared to another. A certain internal connection of a node could even be blocked, while another could be available.

Figure 9:
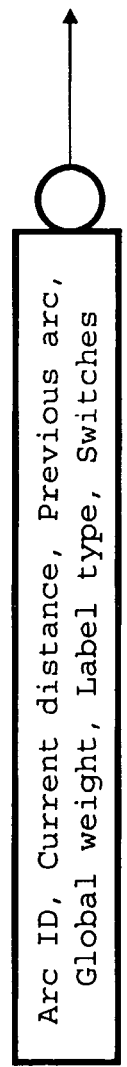
FIG. 9 represents a second embodiment of Arc object used in a graph according to an aspect of the present invention.
Figure 10:
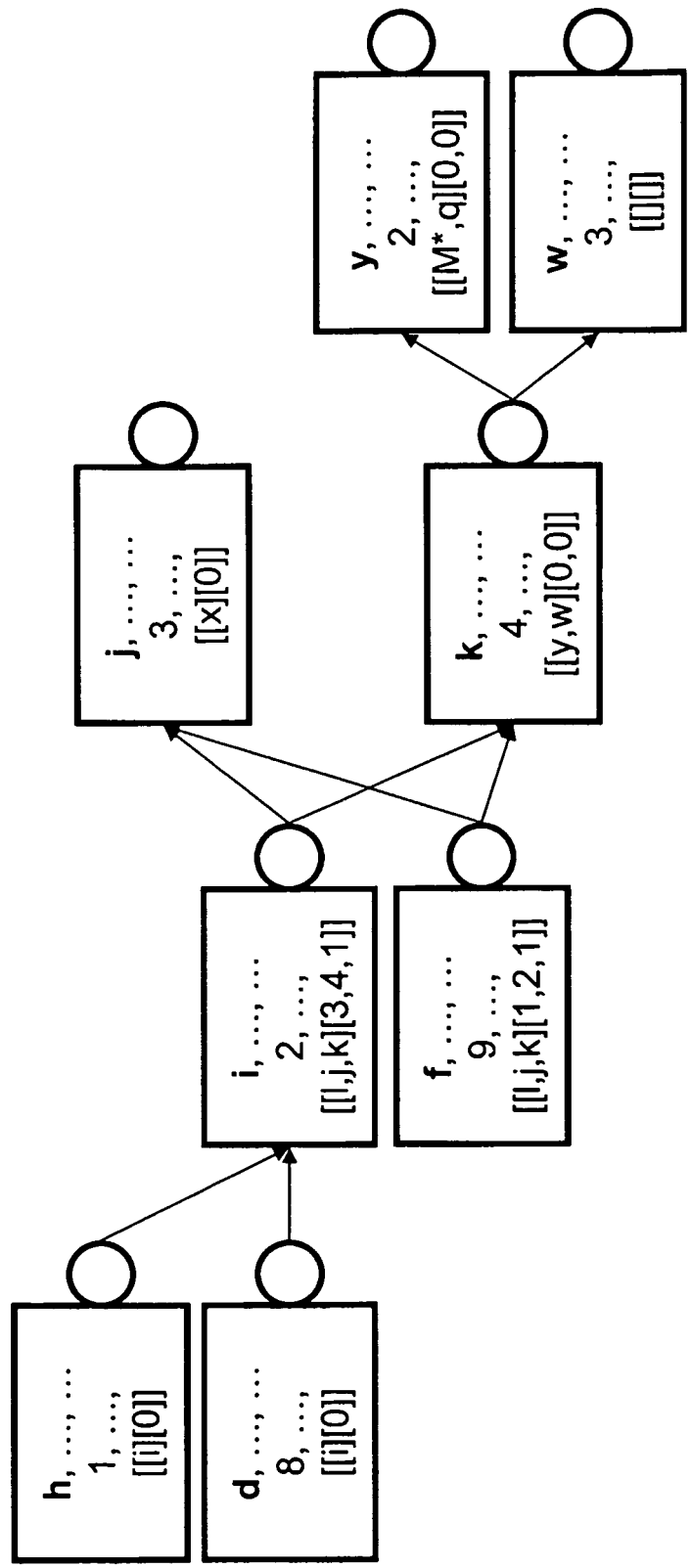
FIG. 10 shows the graph portion of FIG. 4, in which non-zero weights are assigned to some switching transition between different Arc objects.

In the Arc-based graph of the present invention a switching node representation can be achieved by exploiting the virtual link mechanism and the neighbor list stored in each Arc: in a preferred embodiment, another vector is associated to the neighbor Arc list with the same number of elements, containing a suitable weight for each transition from the current Arc to each of its neighbor Arcs, i.e. to each switching transition. The list of neighbor-Arc IDs and the weights associated to the switching transitions may be stored in each Arc in an array, hereinafter referred as Switches field. FIG. 9 shows a generic Arc object comprising the Switches field array. FIG. 10 shows the graph portion of FIG. 4 in which a non-zero weight has been added to the switching transitions from Arc i to Arcs l,k,j and from Arc f to Arcs l,k,j.

It is noticed that, with the graph model of the present invention, in order to take into account of possible cost differences among the switching transitions no new element (arc, edge or vertex) is created: the number of information-storage elements remains equal to the number of Arcs. When updated by the algorithm, the Current distance value of, e.g., Arc j is obtained by combining (summing) the Current distance value of Arc i to the Common weight specified in Arc i and to the weight associated to the i-j transition.

By considering the weights added for the switching transitions as shown in FIG. 10, the algorithm steps of the above described example are modified as in the following:

0. (z, ∞, G*, t), where z stands for all the Arc IDs, except G*; (G*, 0, G*, t)
1. (G*, 0, G*, p), (a, 0, G*, t), (b, 0, G*, t), (c, 0, G*, t)
2. (c, 0, G*, p), (d, 9, c, t), (f, 9, c, t), (g, 9, c, t)
3. (b, 0, G*, p), (i, 20, b, t),
4. (a, 0, G*, p), (e, 9, a, t), (h, 9, a, t)
5. (g, 9, c, p), (m, 20, g, t), (n, 20, g, t)
6. (f, 9, c, p), (l, 19, f, t), (j, 20, f, t), (k, 19, f, t)
7. (d, 9, c, p), (i, 17, d, t)
8. (e, 9, a, p), (o, 25, e, t)
9. (h, 9, a, p), (i, 10, h, t)
10. (i, 10, h, p), (l, 15, i, t), (j, 16, i, t), (k, 13, i, t)
11. (k, 13, i, p), (y, 17, k, t), (w, 17, k, t)
12. (l, 15, i, p), (o, 16, l, t)
13. (o, 16, l, p), (p, 24, o, t)
14. (l, 16, i, p), (x, 19, j, t)
15. (w, 17, k, p)
16. (y, 17, k, p), (M*, 19, y, t), (q, 19, y, t)
17. (x, 19, j, p), (p, 20, x, t)
18. (q, 19, y, p)
19. (M*, 19, y, p)

The shortest path found by the Dijkstra algorithm in this example on the graph of FIG. 2 is still G*, a, h, i, k, y, M*, corresponding to G, A, B, C, E, M on the network of FIG. 1.

Figure 11:
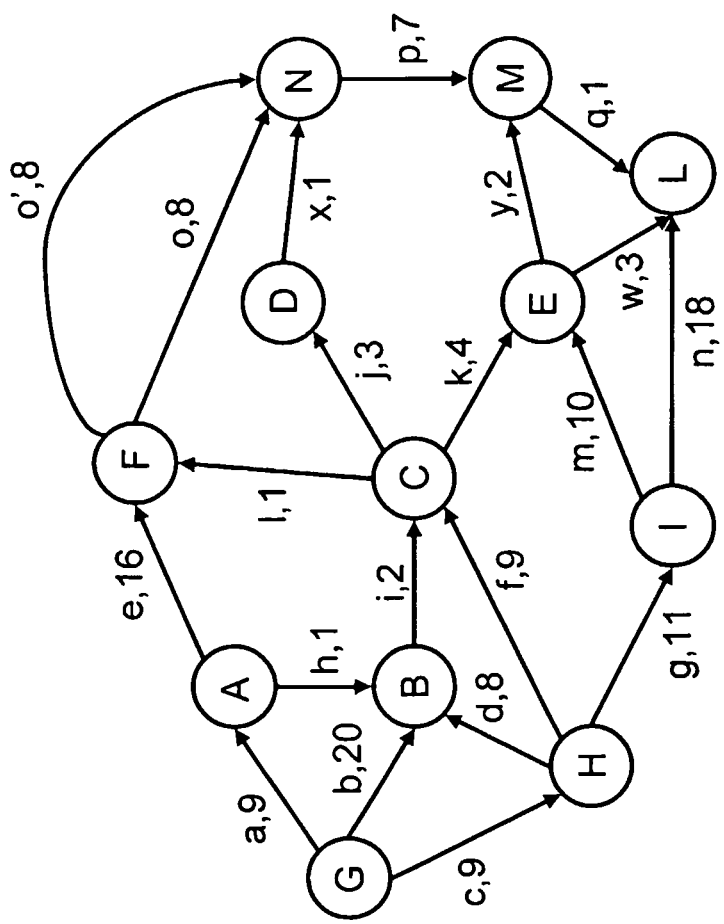
FIG. 11 schematically shows the mesh network of FIG. 1, in which one link (link "o") is split into two disjoint paths.
Figure 12:
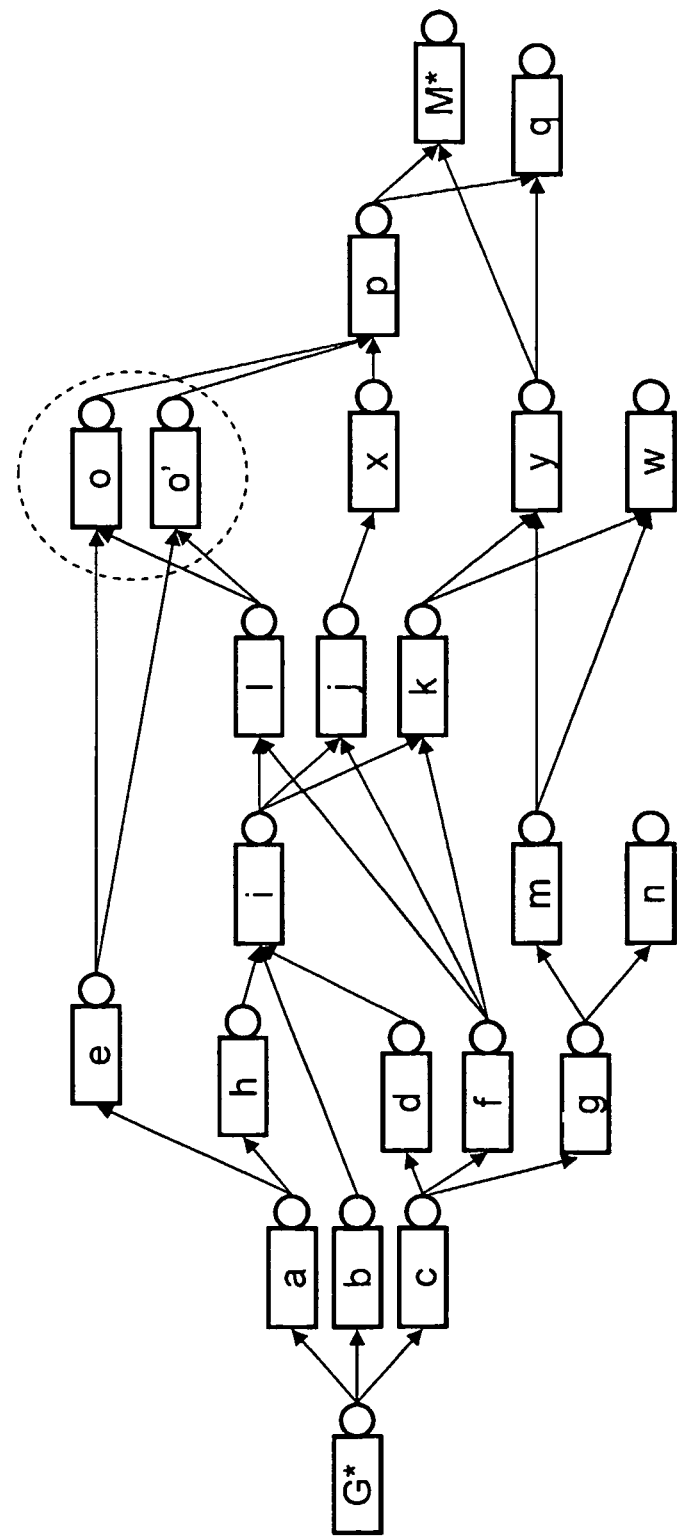
FIG. 12 schematically shows a second embodiment of a graph according to an aspect of the present invention, modeling the mesh network of FIG. 11.

Another important feature of an accurate model is that a routing algorithm should be able to keep into account situations in which a link is composed of several disjoint connections (hereinafter called "ducts"), geographically separated with each other, to take into account of failures due to cable-cuts. For example, FIG. 11 shows the network of FIG. 1 in which both the working and the protection paths of a connection terminating in node N could be routed through link FN, composed of the two disjoint ducts o and o'. FIG. 12 shows how this same situation can be modeled in the Arc-based graph of the present invention, by representing each duct o, o' as a separate Arc, both having Arc p as neighbor Arc. A further field may allow marking Arc o and Arc o' as disjoint, as it will be better explained in the remainder of the description, so that the routing algorithm operating on the graph could take into account of this fact for determining a pair of working-protection paths. However, it is noticed that for the purposes of the present invention, "links" and "ducts" are concepts so inter-related with each other that may practically be considered as having the same meaning.

In the examples shown above, weighted graphs in which the weighting system was based on scalar weight parameters were described. In other words, the current distance (or the Current distance field) of the graph elements has been described as a scalar function (a number in the specific sample case), assuming a value defined on a single-dimension domain. Moreover, the metric was linear, being the distance calculated by the routing algorithm a simple linear combination (a sum) of the weights of the crossed elements along the path.

This has not to be considered as limiting the invention. In fact, these features of the weighting system are not satisfactory in all the cases. The metric according to which distances are measured on a weighted graph is the parameter adopted by the routing algorithm to prefer a certain path to another: the choice of the metric thus reflects the particular routing criterion that the network planner has decided to adopt. The set of criteria that a planner can conceive and apply is virtually unlimited. Many of them frequently recur in scientific literature related to heuristic optimization and routing.

The linear metric shown above in the examples, with weights assigned to the Arcs substantially in a random way, or directly by the planner, can be defined as an administrative-weight Shortest Path Routing (SPR). In many common criteria the metric is still linear, but the weights are assigned according to specific physical characteristics of the links. For instance, weights can be proportional to the physical lengths of the geographical links (minimum-mileage SPR), or to the wavelength of a WDM channel (wavelength first-fit), or to the fiber (fiber first-fit), etc. The minimum-hop SPR is another very popular and simple linear criterion in which all the elements are given a unit weight.

All the metrics mentioned so far are linear: however other kinds of metrics are frequently used. An example is the so-called Least-Loaded Routing (LLR) criterion: in order to comply with this metric, the Arcs of the graph may be weighted by a free-capacity index, i.e. a parameter proportional to the residual spare capacity on the link to which the Arc belongs at the arrival of a connection request. The metric associated to this criterion evaluates the current distance along a path assigning it the minimum free-capacity index among those of the crossed Arcs. The routing algorithm then selects the path with the maximum distance.

Not only the planner can choose among different routing criteria: he/she may be also interested in combining a set of them, while keeping an independent control on each of the assignment criteria. In order to comply with this requirement, a number of weights equal to the adopted criteria can be advantageously assigned to the graph elements: in other words, a vector of weights can be advantageously assigned to the Arcs of the graph.

Correspondingly, the current distance field can be advantageously configured as a vector, storing information on how a given Arc is "far" from the source Arc, in a given algorithm step, according to a certain number of different metrics. When the routing algorithm has to take routing decisions, the elements of the weight vectors may be combined in a way that reflects a routing strategy of the planner. For instance, if metrics are all of the linear kind, the weights of a distance vector can be linearly combined according to a suitable normalizing system: in this way, for example, SPR, first-fit wavelength and/or fiber assignment can be jointly solved. If metrics are of heterogeneous type (i.e. they can not be normalized and summed together) a prioritized combination rule can be applied. This may comprise taking routing choices on the distance-vector element with the highest priority, and considering the other elements in priority sequence when parity cases have to be solved. For example, minimum hop SPR can be used as the criterion having the highest priority. Only when two paths are equal as for the number of hops, the path having the lower load of the two can be selected, according to the least-loaded non-linear metric, etc. The combination rules that can be supported by the proposed invention is not intended to be limited by the set mentioned here.

Figure 13:
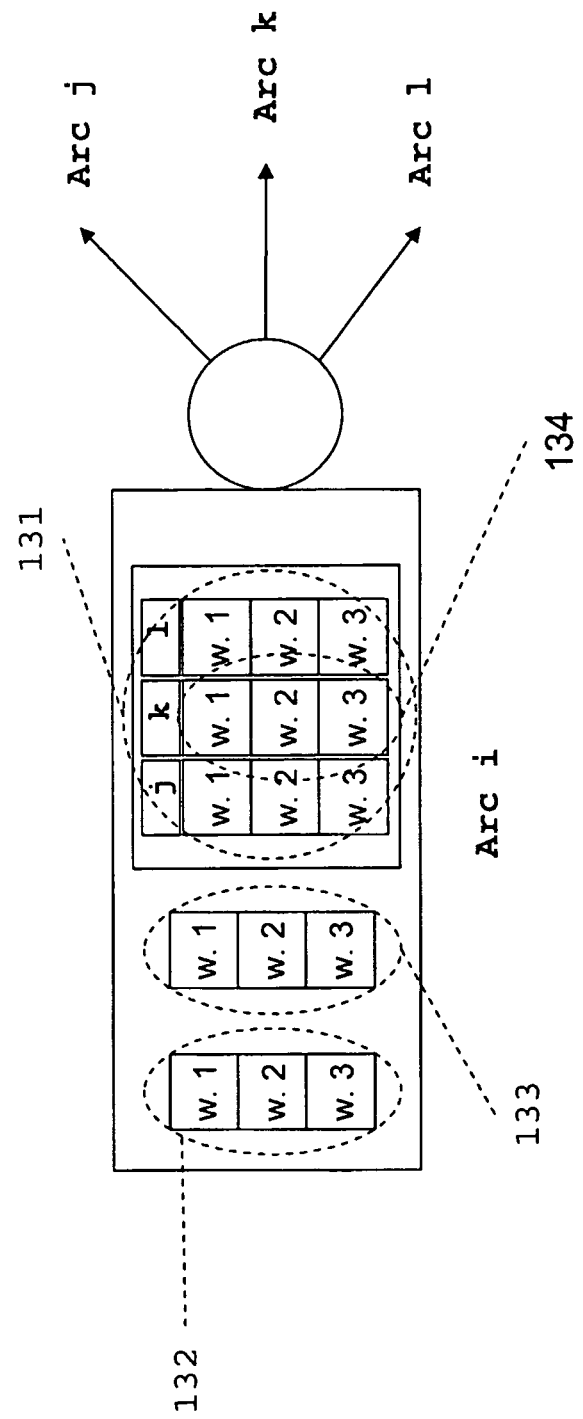
FIG. 13 represents a third embodiment of Arc object used in a graph according to an aspect of the present invention.

In preferred embodiments, a multiple-weight mechanism can be accommodated as follows. Each field of an Arc adapted to contain a weight (Current distance, Common weight) is configured to host an ordered array of weights, in which each element concerns a particular resource-assignment criterion, according to its position. Weight enrichment can be extended also to the Switches field, in which a weight array can be associated to each Arc-to-neighbor transition (thus forming a Switches-array column). The size of the arrays can be set according to the number of concurrent criteria that a user has chosen to solve his planning or simulation problem, or to manage a real-time connection provisioning. Once the number and type of criteria have been decided, the weight vectors stored in the fields of the Arcs are set with the same size and with the elements in predetermined positions. An exemplary Arc object with highlighted weight-vectors is schematically shown in FIG. 13, in which: the reference number 131 indicates a Switches 3×3 matrix field, adapted for storing three weight values, corresponding to three respective metrics, associated to each of three different types of switching (Arc i to Arc j, Arc i to Arc k, Arc i to Arc l); the reference number 132 indicates a three-dimensional Current distance array field, storing three different values, corresponding to three respective metrics and distance evaluation procedures; the reference number 133 indicates a three-dimensional Common weight array field, corresponding to three respective metrics. Each column of the 3×3 Switches matrix, such as for example column 134 in FIG. 13, corresponds to one particular switching transition, i.e. it stores one weight values per associated metric. Each row of the three fields (Current distance, Common weight, Switches) stores weight values compatible with each other and with respect to a given metric.

The implementation of different procedures concerning a routing criterion and its metric in an external Routing-metric library may advantageously provide flexibility on the choice of each single criterion, so that a user can specify and define its own criteria. To summarize, for the defined criteria and metric the following elements can be set in the Routing-metric library:

Distance evaluation procedure: it defines how the weights of the elements of the weighted graph are combined together to measure the "length" (or the cost, or the distance) of a path. For example, the evaluation procedure of linear metrics is a linear combination (a sum), whereas that of the least-loaded routing is an operation of finding a minimum. Other examples of non-linear metrics may be path availability or loss. It should be noted that in some metrics (e.g. SPR), the distances increase as the number of graph elements crossed by a path increases (increasing metrics), while for other metrics (decreasing metrics) the opposite holds (e.g. LLR). A monotonic behavior of the distance with the number of crossed elements may be requested to guarantee the absence of looping phenomena of some routing algorithms, such as the Dijkstra algorithm. This condition may limit the number of possible metrics that can be implemented, e.g. excluding those having weights of different signs. To bypass the constraint, modifications of the path-finding algorithm may be implemented, such as the use of alternative algorithms (modified Dijkstra algorithm, Ford or Bellman-Ford-Moore-D'Esopo-Pape). Moreover, it is observed that for most metrics a common Distance evaluation procedure may simply consist in an algebraic operation performed on weight values. However, this is not strictly necessary. For instance, a metric can be defined over a finite definition set of conventional values (symbols), and distance evaluation can be achieved via a matrix in which an output value is stored for each possible combination of the two input values.

Distance comparison procedure: it defines how weights concerning the same metric and belonging to two or more weight vectors should be compared. In one embodiment, the input to the procedure is an array having the set of Arc IDs as first row and the corresponding weights as second row. The distance comparison procedure produces an ordered version of the input array, sorting the columns according to a winner sequence: the Arc in the first column wins the comparison versus the Arc in the second, which wins versus the Arc in the third, etc. The order of sorting depends on the particular metric. For example, with SPR, weights will be sorted in increasing-value order, while values will be decreasing for the LLR. The output array of the distance comparison procedure may be accompanied by a second output parameter, storing a list containing the groups of parity cases, i.e. of those Arcs resulting equal to each other according to the metric. This second list may enable another option to the planner, which is to specify a tolerance interval for the comparison. The comparison result is dependent on the metric type. For instance, the monotonic behavior of the metric should be taken into account: with increasing metrics the comparison designates the smallest weight as winner, while with decreasing metrics the winner designates the highest value. Moreover, it is observed that for most metrics a common Distance comparison procedure may simply consist in quantitative relations on weight values. However, this is not strictly necessary. For instance, a metric can be defined over a finite definition set of conventional values (symbols), and distance comparison can be carried out with the aid of a vector storing the priority of each possible value of the metric.

Infinite distance value: it is a specific weight value connected to a given metric with the following properties: a) when the result of a Distance evaluation operation is potentially a looser versus the Infinite distance, it is forced to be equal to the Infinite distance itself; b) the Infinite distance value always loses against any other value in a Distance comparison; c) a Distance evaluation operation combining any other distance value to the Infinite distance value always returns the Infinite distance value. For example, in case a simple SPR linear metric with positive weights is considered, and the number "ten" is selected as Infinite distance value, any evaluated distance greater than ten is forced to be equal to ten. If the resulting weights are negative values (in case the routing criterion is a "longest path") and the Infinite distance value is the number "zero", any negative distance is converted to zero. With regards to property c), if an element of the Common weight vector of an Arc is set to the Infinite distance value, the corresponding elements in the Current distance fields of all its neighbors will always have the Infinite distance value. The same happens when an element of a vector of the Switches field is set to the Infinite distance value, in the neighbor corresponding to that vector. In the exemplary routing calculations described above, an Infinite distance value was used in the initialization of the Dijkstra algorithm, when it was assigned to the Current distance of any Arc different from the source Arc. When used for this purpose, the planner should choose a value that presumably will be never reached by the paths of the graph. There is however another way to exploit this feature. For its properties, the Infinite distance value can be used as a (lower or upper, depending on the metric) threshold value to implement constraint-based routing. Moreover, it is observed that if the metric is not formalized in algebraic terms, a special conventional value can be used as Infinite distance value, which is recognized by the path-finding algorithms as an indication that this weight is a boundary in a path-distance evaluation or that this weight is a loser in any distance comparison procedure.

Zero distance value: this is the dual element of the previously described Infinite distance value. The Zero distance value has the following properties: a) when the result of a Distance evaluation operation is potentially a winner versus the Zero distance, it is forced to be equal to the Zero distance itself; b) the Zero distance value always wins against any other value in a Distance comparison; c) a Distance evaluation operation combining any given distance value to the Zero distance value always leaves the given distance value unchanged. In the exemplary routing calculations described above, a Zero distance value was used in the initialization of the Dijkstra algorithm, when it was assigned to the Current distance of the source Arc. However, another useful application can be identified. As noticed before, the weight vectors of the Arc-based graph may be set of the same size, containing a number of elements equal to the number of adopted routing criteria. However, it may happen that a given graph element is not relevant for some criteria. In such case, the corresponding element in the Common weight or in the Switches vector can be loaded with a Zero distance value. It is further noticed that the Zero distance value should be chosen according to the metric of that criterion (e.g. zero for additive metrics, one for multiplicative metrics, etc.). Moreover, it is observed that if the metric is not formalized in algebraic terms, a special conventional value can be used as Zero distance value, which is recognized by the path-finding algorithms as an indication to skip that weight in a path-distance evaluation, or that such weight is the winner in a distance comparison.

Weight initialization procedure: when a new network is planned, weights are assigned during the creation of the Arc-based graph to all the Common weight and Switches fields of the Arcs. The values to be assigned to each Arc depend on the characteristics of the elements of the physical topology that is represented by the Arc. The Weight initialization procedure is the collection of all the rules used, for a given metric, to translate the physical parameters into the weight values. Two sub-procedures may be defined for each metric: a first sub-procedure regards the network links and acts on weights of the Common weight field; a second sub-procedure concerns the network nodes and acts on weights both of the Common weight field and of the Switches field.

Weight updating procedure: the weights connected to some metrics may be assigned during the graph construction and then left unchanged. This is a typical situation with static criteria, such as the SPR. Other routing criteria, such as the LLR, are however dynamic (or adaptive). In these cases, the weights of the Arcs need to be updated in order to conform to the network state as the network becomes loaded with traffic. Weight update may be carried out after each path-setup operation. For each metric, a Weight updating procedure may contain the set of rules that combine the network-state to the physical-layer information in order to update the weight values. Similarly to the Weight initialization procedure, a link and a node sub-procedure can be defined.

The procedures listed above are specific to each metric. The Routing-metric library can also contain a Metric combination procedure, which performs a further comparison "transversal" to the metrics. As described above, each metric used by the designer has its own Distance comparison procedure which produces as output an array of (ArcIDs, weights)—plus, possibly, a list of parity cases—winner-wise ordered according to the specific metric. The Metric combination procedure collects all the outputs from the various Distance comparison procedures and, on the basis of these, takes the final decision, by combining the various metrics in the decision process according to a combination criterion (or an operation mode). Such a procedure may be activated in order to select the winner of a comparison during the path-finding algorithm execution: a) whenever a new distance value has to be compared to the Current distance of a neighbor-Arc of the pivot Arc; and/or b) whenever the Current distance fields of all the temporary-labeled Arcs are compared with each other to select the new pivot Arc. Many possible operation modes of the Metric combination procedure may be conceived. For example, three operation modes can be provided:

a) Hard-bound detection. Some of the metrics that are adopted in a planning session can be used to prevent the set up of connections having a certain parameter over (or below) a prefixed threshold. Such metrics can be referred to as "hard-bound" metrics. The threshold value related to a hard-bound metric may correspond to its Infinite distance value: this is because, by definition, no path can exist with a distance value violating such a threshold. In case of hard-bound metrics, the role of the Metric combination procedure shall be to inspect the received set of weights, so as to detect any Infinite distance values related to hard-bound metrics. The corresponding Arcs are directly selected as losers of any possible comparison, independently of the other metrics: any further comparison is unnecessary for those Arcs. The case of constrained routing will be exemplarily considered. A typical example of a constrained-routing criterion is the Maximum-number-of-Hops Constrained Routing (MHCR). In the framework of MHCR, no connection can be set up along a path crossing more than N hops. Let us assume that LLR is adopted together with MHCR and the Current distance fields of the three temporary-labeled Arcs a, b and c are to be compared; moreover, N=10. The LLR Distance comparison procedure produces, e.g., the following output: {(b, 2); (c, 4); (a, 5)}. The MHCR Distance comparison procedure produces, e.g.: {(a, 3); (c, 5); (b, 10)}. The Metric combination procedure has to immediately discard Arc b, as it is associated to an Infinite distance value of a hard-bound metric. The output of the MHCR Distance comparison procedure is not useful anymore at this point: the Metric combination procedure can proceed to select the winner according to the other metrics—the LLR in this case—leading to the election of Arc c.

b) Comparison by inter-metric combination. Metrics that are mutually commensurable can be combined to elect the winner. This inter-metric operation may be carried out by the Metric combination procedure by combining together a set of elements in prefixed positions within each distance vector received in input, and then selecting the winner distance vector on the basis of the result of this operation. Let us consider for example, an administrative-cost SPR metric, which can be linearly combined with a minimum-hop SPR metric with combination coefficients "2" and "1", respectively. As above, the Current distance fields of the three temporary-labeled Arcs a, b and c have to be compared with each other. The administrative-cost SPR Distance comparison procedure produces, e.g., the following output: {(b, 2); (c, 4); (a, 6)}. The minimum-hop SPR Distance comparison procedure produces, e.g.: {(a, 3); (c, 5); (b, 12)}. The Metric combination procedure combines the vectors in {(c, 5+8); (a, 3+12); (b, 12+4)}, thus selecting Arc c as the winner. The same result could have been achieved by defining an SPR metric which already included the combination of hops and administrative costs, but the approach of separating the metric-dependent Distance comparison procedures from the "transversal" Metric combination procedure greatly enhance flexibility and modularity.

c) Prioritized comparison. In this case, the Metric combination procedure may consider the output of the Distance evaluation procedure related to a highest-priority metric. For example, the first element of the array can be chosen as the winner if there are no parity cases. In case of parity, the Metric combination procedure may select the sub-array related to the second highest-priority metric that contains the vectors being equal according to the first-priority metric. The process of comparison is repeated, until a clear winner is selected at some priority level. A user can set the priority levels of the various metrics within the Distance evaluation procedure. Following the above-reported example, let us assume the administrative-cost SPR metric with highest priority and the minimum-hop SPR metric with lowest priority in the comparison of the Current distance fields of the three temporary-labeled Arcs a, b and c. The administrative-cost SPR Distance comparison procedure produces, e.g., the following output: {(b, 2); (c, 2); (a, 6)}. The minimum-hop SPR Distance comparison procedure produces, e.g.: {(a, 3); (c, 5); (b, 12)}. The Metric combination procedure combines the vectors according to the given priorities in {(c, 2, 5); (b, 2, 12); (a, 6, 3)}, thus selecting Arc c as the winner.

The three operational modes listed above, with others that can be possibly conceived, could be altogether present in the Metric combination procedure: it is up to the planner to define a reasonable comparison operation. The operation of the Metric combination procedure can be influenced by the content of a Routing metric field of the path to be routed. For example, in the above described prioritized mode, the priorities of the metrics can be made variable from path to path, or some metrics can be excluded, or some hard-bound metrics overruled. A further feature that may be implemented in the Metric combination procedure is the management of global parity cases, i.e. the managing of the cases in which all the input distance arrays result equal for all the metrics and their combinations. Preferred embodiments may provide that a random selection of the winner can be implemented in these cases.

For describing the network databases (physical database, connection database), reference will be made to an exemplary optical network scenario. The network scenario exemplarily considered in the following corresponds to the OTN (Optical Transport Network), defined according to ITU-T Recommendations.

In this scenario, the traffic comprises a set of optical connections, each one named lightpath. A lightpath may be also called Optical Channel trail, the entity managed by an OCh (Optical CHannel) sub-layer of the OTN hierarchy: it is an end-to-end entity connecting a source node to a destination node, crossing OTN links and transit switching nodes (OTN nodes). More precisely, the trail connects a source User Network Interface (UNI) in the source node to a destination UNI in the destination node. A UNI is an interface between the OTN layer and the client layer. It is distinguished from the Node Network Interface (NNI), which is a network element connecting a node to an incoming or outgoing OTN transmission link: an OCh trail also transverse an input and an output NNI per crossed transit OTN node. In practice the lightpath is an optical circuit, being the sequence of the WDM channels (one channel per each crossed OTN link) used to carry the transmitted information for the whole duration of the connection (circuit switching). A Wavelength Division Multiplexing (WDM) channel is a particular wavelength in the set of multiplexed wavelengths traveling in an optical fiber of an OTN link in a given propagation direction.

In the lightpath definition considered in the present example, the intermediate nodes crossed by a lightpath can either optically switch the lightpath (transparent switching) or they can convert signals to an electrical form for switching and then back-convert them to optical signals (transponder switching). In both switching cases the wavelength can be converted passing from a WDM channel to the next (by a VWP node), or it can be obliged to remain the same (by a WP node). Transparency and wavelength conversion capability are two independent node properties, though frequently transparent nodes cannot perform wavelength conversion while nodes with transponders can do it.

Moreover, in the example herein considered, an assumption is made that no client-layer processing is performed on the digital stream of a lightpath by any of its transit nodes, independently of the fact that the nodes are transparent or transponder-equipped. By client-layer processing operations it is meant client signal insertion and/or extraction, adaptation of a client signal to the OTN framing (Optical channel Payload Unit, or OPU, framing) and grooming, i.e. client signals multiplexing/demultiplexing. For instance, the lightpath can never undergo client add/drop operations in transit nodes, i.e. extraction of a client signal from an OCh trail to substitute it with a different client signal.

The lightpaths are classified according to the bit rate (or digital capacity) of the carried digital flow. According to the OTN standard, the hierarchical level of the OTU (Optical channel Transport Unit) framing determines this end-to-end parameter. According to OTN standards, three levels may be defined: OTUk with k=1 (around 2.5 Gbit/s), OTUk with k=2 (around 10 Gbit/s), OTUk with k=3 (around 40 Gbit/s). Transmitters and receivers match the bit rate, as well as each crossed transponder. Transparent transit nodes are able to optically switch any lightpath regardless of its bit rate.

In current OTN technology, some frequently adopted options complicate the lightpath-layer scenario beyond the simple OCh establishment. First of all, traffic relations, especially in long-distance or backbone transport networks, are typically symmetrical: therefore a lightpath in one propagation direction is frequently accompanied by a lightpath connecting the same source and destination node in the opposite direction. Moreover, many techniques can be adopted to increase the robustness of the connections in order to automatically face failures. One of the main techniques consists in reserving capacity to one or more backup lightpaths that are used in case of failure. Therefore, the activation of an optical traffic relation between two nodes may imply the actual resource allocation for several lightpaths: a working lightpath, a second working lightpath in the reverse direction if the relation is bidirectional, their respective backup lightpaths selected according to the particular survivability techniques adopted. It is noticed that at a given instant of the network lifetime, only one (two in the bidirectional relations) of these lightpaths is active, since only one is sufficient to carry all the traffic.

In order to keep all these features into account, a network element may be defined in the OCh-layer model according to preferred embodiments of the present invention: such network element is the lightpath compound, that is the set of all the lightpaths that are necessary to establish a point-to-point optical traffic relation, according to its required features of directionality and protection.

A basic event to be managed by the model is a request to establish an optical traffic relation, which translates into the request to activate a new lightpath compound. The compound activation is followed by the setup of all the lightpaths of the compound.

In preferred embodiments, a database is provided to keep records of the established lightpath-layer entities. For example, the information related to the established lightpaths can be stored in dedicated databases located in the centralized network control system or distributed to the network nodes. In this latter case, suitable signaling protocols are needed to distribute information. The database may be implemented in various ways.

An exemplary database implementation may be based on the exploitation of two object lists, namely a Lightpath compound list and a Lightpath list, respectively.

Lightpath Compound List

The Lightpath compound list contains information about the lightpath compound. Each element of the list is an instance of a general predefined Lightpath compound class, identified by a series of fields. For example, each element of the Lightpath compound list may contain the following information fields:

1. Compound ID: an ID field that uniquely identifies each compound. The ID may be alphanumeric, defined in a proprietary way, by assigning strings specifically created by the management system using the model. Alternatively, protocol-compliant ID systems may be used, e.g. assigning a label. Another possibility is to adopt a user-defined ID set. The sole constraint is that each ID is associated to one and one only compound in the modeled network.
2. Source destination: a field containing the pair of Node IDs (see below) of the source and the destination nodes of the traffic relation. In case of a bidirectional traffic relation, the source and destination role assignment is purely conventional.
3. Directionality: a field defining the directionality feature of the lightpaths of the compound. For example, if a compound comprises a working and a protection lightpath, the latter ones inherit the directional properties of the former ones. For example, the field may assume the following values:
   0: unidirectional;
   1: bidirectional;
   2: constrained bidirectional. The backward lightpaths may be required to follow exactly the same path of the forward lightpaths. The setup of the backward lightpath is called, in this case, conjugated routing.
4. Protection: a field defining protection information for the lightpath compound. This field may be implemented as an array of ordered binary numbers corresponding to different protection options, with value "1" if a protection option is required and value "0" if a protection option is not required. For example, the elements of the array may assume the following meanings:
   a. end-to-end protection;
   b. failure-based restoration;
   c. sharing of protection lightpaths;
   d. link-failure protection (0) or (link+node)-failure protection (1).
5. Capacity: a field defining the capacity of the digital flow of the required optical connection. According to OTN standard three levels are defined, namely: k=1 (around 2.5 Gbit/s), k=2 (around 10 Gbit/s), k=3 (around 40 Gbit/s). All the lightpaths of the compound have the same capacity.
6. Client spec: a field to be used in special cases in which a connection is created to carry exclusively a specific type of client signal. The lightpaths of a compound with an application name specified in this field are constrained to use UNI interfaces with a compatible Client port field (see below) as source and destination. Normal connections, for which this field is set to generic, can use any UNI interface, regardless of its Client port attribute.
7. Timing: a field defining duration of the compound. The compound has an opening instant (the instant at which the request was issued) and a duration (after which all the lightpaths of the compound are torn down). These values are useful when the model is employed for simulation. If a connection is static, the compound duration may be set to a "special" value, e.g. recognizable as infinite (i.e. lasting for all the modeled network lifetime). It has to be noted that the compound instance can remain in the compound list also after the expiration of its duration: in this way a trace of a connection remains in the database and information can be retrieved even regarding a closed connection.
8. Occupation: a field defining the capacity (or bandwidth) already occupied by active client-layer connections in the compound.
9. Disjoint compounds: a field defining a list of compounds to be left disjoint with respect to the present compound. There are cases in which the planner requires the traffic relation to be failure-independent from other traffic relations. The compound can thus contain a list of other compounds that should be failure-independent from it: this means that all the lightpaths of such compounds will be routed in physical diversity from the lightpaths of the compound. Each element of the list may comprise a Compound ID. A flag may specify whether physical diversity means link or node disjointness.

10. Lightpaths: a field containing the list of the Lightpath IDs (see below) of all the lightpaths belonging to the compound.

Preferred embodiments may provide that once a compound is created with a set of specified features, such features could be modified later on. For example, an unprotected connection may be requested initially. A later event may be a request to assign capacity for protection. In this case, the compound is updated by varying its Protection field and subsequently protection lightpaths are routed. It is noted that a request for more than one connection between the same pair of nodes translates into a corresponding number of different lightpath compounds. It is further noticed that some fields (such as, e.g., Capacity, Compound ID and Source destination) should not be varied once a compound has been created. In case a variation of these fields is required, the compound should be torn down and a new one created.

Lightpath List

The Lightpath list contains detailed information about the lightpaths. Each element of the list is an instance of a general predefined Lightpath class, identified by a series of fields. For example, each element of the Lightpath list may contain the following information fields:

1. Lightpath ID: an ID field that uniquely identifies each lightpath. The ID may be alphanumeric, defined in a proprietary way, by assigning strings specifically created by the management system using the model. Alternatively, protocol-compliant ID systems may be used, e.g. assigning a label. Another possibility is to adopt a user-defined ID set. The sole constraint is that each ID is associated to one and one only lightpath in the modeled network.
2. Compound: a field defining the Compound ID of the lightpath compound to which the lightpath belongs.
3. Orientation: a field defining the propagation direction in the lightpath. For example, this field could assume the following values:
    0: forward lightpath. The forward indication is referred to the orientation of the compound: by definition a forward lightpath has the same source and destination of the compound;
    1: backward lightpath. Its source is the destination of the compound and its destination is the source of the compound
4. Type: a field defining the type of lightpath. For example, this field may assume the following values:
    0: working lightpath;
    1: dedicated protection lightpath;
    2: disjoint restoration lightpath;
    3: failure-based restoration lightpath;
    4: . . . others . . . ;
5. Failure source: in case the lightpath is a restoration lightpath (see field Type above) a field defining a Duct ID (see below) or a Node ID (see below) of the duct or node triggering the establishment of the restoration lightpath. If the lightpath is not a restoration lightpath, this field is null.
6. Status: a field defining the current status of the lightpath. For example, this field can assume the following values:
    0: "hot", i.e. currently in use;
    1: "cold", i.e. the capacity is currently reserved, but not used. Typically, this situation may apply to a protection or restoration lightpath in absence of failures;
    2: "expired", the lightpath belongs to a compound that is already closed.
7. Routing metric: a field defining indications for the routing algorithm to apply for the setup of the lightpath. For example, this field may carry a priority array that instructs the routing algorithm on how to combine different metrics.
8. Arcs: a field defining the set of IDs of the Arcs over which the lightpath has been routed. In practice, this field provides information regarding the routing and resource assignment for a lightpath, once it has been set up.

The physical topology of the WDM network is defined by the location of the nodes and by the set of links connecting them. In practice, an OTN node comprises the equipment needed to perform OTN-layer switching, i.e. space and/or wavelength switching.

Various possible types of node can be employed (e.g. optical cross connects, digital cross connects with optical cards, optical add-drop multiplexers, fiber switches), having different characteristics in size, and/or wavelength conversion capability, and/or blocking features, etc. However, it is noticed that some common elements among the various types of node can be identified: in all case, nodes have a set of input interfaces, a set of output interfaces and a switching subsystem (or switching matrix).

The two sets of interfaces comprise NNIs and UNIs. As mentioned above, the former are interfaces leading to/coming from the WDM optical lines, while the latter lead to/come from the client layer of the OTN. UNIs are used to terminate the lightpaths, while NNIs perform admissible transit lightpath processing function (when implemented), such as: regeneration, wavelength conversion, performance monitoring, FEC encoding/decoding, etc. NNIs may be assumed to be null elements, performing no function at all, in case of transparent OTN nodes.

In general, the switching subsystem defines the set of the available input-output connections that the node is able to realize, i.e. all the possible ways by which input and output interfaces can be physically linked with each other. In its full-functionality version the switching subsystem is composed of a space-switching portion and of a wavelength-switching portion. The former portion may be implemented by an electronic switching matrix or by an optical switching matrix, whereas the latter may be implemented by transponders or all-optical wavelength converters.

An interface, as well as a realizable connection, may be characterized by a specific OTU capacity (e.g. 2.5, 10 or 40 Gbit/s): in this case it can operate only on lightpaths carrying OTU framing of a compatible level k. UNI interfaces may also be dedicated to specific client signals by a predefined client-port association.

An OTN link (or WDM link) is the set of the optical transmission media physically connecting two nodes. In the exemplary model herein described it is assumed that the optical cables comprised in the link are grouped into one or more ducts. Each duct comprises a number of optical fibers working in one propagation direction and a second number of optical fibers propagating in the opposite direction. Each fiber carries a given set of WDM channels. The number of WDM channels of the multiplex may vary from fiber to fiber or it may be the same for all the fibers of a duct. All the fibers in a duct are exemplarily assumed to be homogeneous (i.e. of the same type). The choice of dividing links into ducts allows to advantageously manage situations in which a link connecting two nodes is split into different "sub-links" to be routed onto geographically separated paths, so as to be failure independent one of each other (e.g., as link between nodes F and N in FIG. 11). In these cases, each sub-link may be represented as a separate duct. The introduction of the duct concept may be also useful when fibers of different types are comprised in the same in the same link (e.g. in the same cable): this can be represented by grouping fibers of the same type into different non-geographically-disjoint ducts. Furthermore, ducts can be used to differentiate between symmetrical WDM links and unidirectional links or links with more fibers in one direction than in the other. Each duct may be also associated to optical line equipment other than the optical fiber, such as optical amplifiers, dispersion compensators, optical power meters, etc.

The capacity of a WDM channel is the OCh-signal bit rate that a lightpath should sustain, i.e. the level k of the compatible OTU signal. All the WDM channels of a multiplex are exemplarily assumed to have the same capacity in terms of bit rate. Situations in which the bit rate is different from channel to channel are not herein explicitly described. However they can be represented, for example, by exploiting a duct representation in which a set of different ducts comprise fibers carrying WDM channels with different capacity.

Information regarding the physical topology can be stored in dedicated databases located in the centralized network control system or distributed to the network nodes. In this latter case, suitable signaling protocols are needed to distribute information, as known in the art. The database may be implemented in various ways. Exemplarily, a particularly flexible and simple implementation may be based on the exploitation of four lists of objects: Node list, Link list, Duct list and UNI-interface list.

Node List

The Node list contains detailed information about the nodes. Each element of the list is an instance of a general predefined Node class, identified by a series of fields. For example, each element of the Node list may contain the following information fields:

1. Node ID: an ID field that uniquely identifies each node. It may be an alphanumeric ID defined in a proprietary way, e.g. assigning strings specifically created by the management system using the model. Alternatively, protocol-compliant ID systems may be used, e.g. assigning an IP address. Another possibility is to adopt a user-defined ID set, e.g. identifying each node by its geographical location. The only constraint is that each ID is associated to one and one only node in the modeled network.
2. Adjacent ducts: this field contains the vector of all the ducts that are adjacent to the node, listed by their IDs (see below). Ducts and not links have been listed, given the prominent role of ducts over links. Most of the model construction, update and management procedures involve only ducts and nodes: it has been found that adopting a list of ducts instead of links allows to reduce the number of accesses to the database elements. However, it may be provided that link objects may be accessed instead of ducts, in order to perform routing and wavelength assignment exploiting link-based weights (e.g. load balanced distribution over the links). Adjacent links to the node can be identified by the Link field (see below) of the Ducts included in the Adjacent ducts list.
3. UNI interfaces: this field contains the vector of all the UNI interfaces that are adjacent to the node, listed by their respective IDs (see below).
4. Node type: this field may refer to a set of possible node architectures that are defined in a pre-programmed Node Library. Node type may more precisely correspond to the name of the class of which the Node in the Node List is an instance. All the Node classes relevant to the network under analysis are defined in the Equipment Library (particularly, in a Node Library being part of the Equipment Library) of the Network Manager Library. The Node type information is very important, since it allows identifying all the procedures and algorithms that are used to build and manage the model concerning a specific type of equipment. The library is a point of flexibility, since any type of architecture can be included, by developing the suitable set of procedures. Rules and features of the node-library model will be discussed later on. A detail level to be used for creating the graph modeling the network, linked to the blocking properties of the node, is associated to each Node type: in the following of the description details of the most common Node types will be given.
5. Node specific: this field may optionally be provided for including supplementary information possibly required for the management of a specific type of node. The format of this field depends upon the node type. An example of usage of the field is node-port assignment. In some cases the equipment layout can impact on the connectivity properties or the switching weights of a node. Constraints due to node hardware can be expressed by switching relations between the physical ports of the switching system. The effect of such constraints depends upon the configuration of the switch plugging to the input and output ducts. The node-specific field can be used to list the correspondences between duct terminations (and UNIs) and physical ports. An example of a node that may require this field is the OADM, as it will be described below. Port assignment could be carried out also at a finer granularity than the duct (e.g. specifying physical ports for fiber or wavelength-channel terminations).
6. Node weights: this field comprises information related to weights associated to the node, as described above with reference to the graph model. Preferred embodiments may provide that this field includes arrays for specifying different values for weights associated to respective different switching permutations. The values provided in this field should be sufficient to support the particular set of metrics and routing algorithms chosen by the network operator (with reference to the content of the above described Routing-metric library). Moreover, the values provided in this field of the Node objects are used by the Graph construction procedure to assign weights to the Weight vectors of the Switches and Common weight fields of each Arc associated to a Node (see below);
7. Node state: this field may be provided for specifying if the node is active or in failure.
8. Arcs: this field may be arranged as an array containing the set of IDs of the Arc objects generated by the node, as described above with reference to the graph model.
9. User detail: this field may be arranged for allowing a user to artificially increase the detail level above the natural detail level associated with the Node type field.

Link List

The Link list contains detailed information about the nodes. Each element of the list is an instance of a general predefined Link class, identified by a series of fields. By the term "link", it is meant the full set of optical transmission lines connecting two adjacent nodes in the two propagation directions. For example, each element of the Link list may contain the following information fields:

1. Link ID: an ID field uniquely identifying the link. For example, alphanumeric IDs may be assigned to the links in a similar way as the Node ID. Assigning protocol-compliant IDs would not make sense in this case since the link is an abstract object potentially corresponding to a set of different physical transmission systems. In any case, according to a basic constraint each ID is associated to one and one only link in the modeled network.
2. Adjacent nodes: this field contains the pair of Node IDs of the two nodes connected by the link.
3. Link weights: this field comprises information related to weights associated to the link, as described above with reference to the graph model.
4. Ducts: this field may be arranged as a vector containing the set of Duct IDs (see below) of the ducts composing the link.

Duct List

The Duct list contains detailed information about the ducts. Each element of the list is an instance of a general predefined Duct class, identified by a series of fields. For example, each element of the Duct list may contain the following information fields:
1. Duct ID: an ID field uniquely identifying the duct. Alphanumeric IDs assigned to the ducts may be exemplarily defined in a similar way as the Node IDs. Protocol-compliant ID systems may be used. For example, a duct may be identified by the IP address of one or both its termination interfaces, in the case it corresponds to a single-channel bi- or unidirectional transmission system. In a more general case, a duct can be identified by a label assigned according to the GMPLS protocol. In any case, according to a basic constraint each ID is associated to one and one only duct in the modeled network.
2. Adjacent nodes: this field is arranged to contain the pair of Node IDs of the two nodes connected by the duct. Preferred embodiments may provide that the pair is ordered in a predefined way: for example, the first node of the pair may be conventionally assumed to be the upstream node.
3. Link: this field may be optionally arranged to contain the Link ID of the link to which the duct belongs to.
4. Duct structure: this field is arranged to give a description, possibly detailed, of the physical configuration of the duct. The field format may be variable, for adaptation to the type of duct. A detail level to be used for creating the graph modeling the network is associated to each Duct structure. The Duct structure field may be composed by two independent subfields specifying a semi-duct for one direction and another semi-duct for the opposite direction. A convention may be provided for ensuring that the first subfield corresponds to the downstream directed semi-duct and the second subfield to the opposite one. Each duct or semi-duct subfield may exemplarily be structured so as to comply with the following types:
   a. In a homogeneous duct or semi-duct all the WDM channels in the duct are undistinguishable, independently of their wavelength and of the fiber which they belong to. This occurs when all the optical fibers carry the same number and the same set of wavelengths (specified by a Wavecomb field, as described below), the bit rate modulating each WDM channel is the same, all the optical signal propagation parameters are independent of the wavelength and all the fibers have the same physical features. The structure describing such a duct may be a set of two numbers: wavelength number per-fiber and WDM channel capacity. The wavelength number per-fiber is (or is associated to) the number of carried wavelengths. The WDM channel capacity is (or is associated to) the sustained bit rate. The WDM channel capacity may in some cases assume a conventional value (e.g. −1) indicating an unspecified capacity: this option is realistic for ducts in a transparent optical network where links are not terminated by transponders, and line devices associated to the ducts are assumed not to be sensitive to the bit rate (e.g. optical amplifiers).
   b. There is the need to distinguish the WDM channels of the duct on the basis of the fiber they belong to, but not of their wavelength. The duct is composed by fibers that are homogeneous as far as the wavelengths are concerned (i.e. all the fibers carry the same number of wavelength channels), but they should be distinguished one from each other with regards to some other parameters. For example, WDM channels are operated at different bit rates on each fiber, or the fibers have different weights or physical features. An array may be provided with as many elements as the number of fibers, each storing a sustained bit rate and a particular set of physical parameters for each fiber. The number of wavelengths is common to all the fibers in the duct. An alternative solution to the employment of a duct with a type-b structure is the already mentioned possibility of including fibers with different features into different ducts.
   c. There is the need to distinguish the WDM channels of the duct on the basis of their wavelength, but not of the fiber they belong to. In this semi-duct type, fibers have homogeneous physical features, all carrying the same number of wavelength, but channels at different wavelengths are modulated at different bit rates and/or optical-signal propagation parameters are wavelength dependent. An array may be provided with as many elements as the number of active wavelengths in the duct, each storing the bit rate of the WDM channels at each wavelength and/or a particular set of physical parameters for each wavelength (e.g. concerning signal impairments). Additionally, a further scalar subfield may contain the number of fibers.
   d. There is the need to distinguish the WDM channels of the duct on the basis of both their wavelength and the fiber they belong to. This may occur when the fibers in the semi-duct are non-homogeneous and equipped with different transmission systems (each fiber has its own specific features, such as bit rate and/or number of wavelengths). In this case, an array may be provided with as many elements as the number of fibers. Each element contains the particular physical parameters associated to the fiber, followed by another array having a number of elements equal to the number of wavelengths supported by the specific fiber. This inner array stores the bit rate and/or the set of wavelength-dependent physical parameters (e.g. concerning signal impairments) for each WDM channel supported by the specific fiber.
5. Wavecomb: wavelengths may be identified by a set of IDs stored in an object of the physical database called Ref wavecomb. The latter object is an array with as many elements as the number of wavelength channels that can possibly occur in any multiplexed network element. Typically, the wavelength IDs could be the nominal wavelengths, e.g. in nanometer, of the optical carriers of the wavelength channels. The Wavecomb field of each duct instructs the graph construction procedures on which particular wavelength channels among those possible (i.e., among those defined in Ref wavecomb) are included in the duct. For type-a, type-b and type-c semi-duct structure Wavecomb may be a binary number, having a number of bits equal to the length of Ref wavecomb: a "1" may indicate that each fiber of the semi-duct has one optical carrier tuned to the corresponding wavelength, while a "0" indicates no carrier at that wavelength. The total number of is equal to the number of elements of the bit-rate/wavelength-specific-parameter array specified in type-c semi-duct structure. In a type-d semi-duct structure the Wavecomb may be an array of binary numbers having a number of elements equal to the number of fibers of the semi-duct, each element of the array describing the subset of Ref wavecomb used in the specific fiber in the same way explained above for the other types of semi-duct.

6. Duct weights: a field having a structure equal to that of the Duct structure field. The values of weights provided with each Duct instance of the Duct list in the Physical database should be sufficient to support the particular set of metrics and routing algorithms chosen by the network operator (with reference to the content of the above described Routing-metric library). The values provided in this field are used by the Graph construction procedure to assign weights to the weight vector of the Common weight field of each Arc associated to a Duct.

7. Duct state: this field may be provided for specifying if the duct is active or in failure.

8. Disjoint ducts: a field array arranged for containing the Duct IDs of all the ducts of the link to which the duct belongs to, that are physically disjoint (and thus failure-independent) from the duct itself.

9. Arcs: this field may be arranged as an array containing the set of IDs of the Arc objects generated by the duct, as described above with reference to the graph model.

10. User detail: this field may be arranged for allowing a user to artificially increase the detail level above the natural detail level associated with the Duct structure field.

UNI Interface List

The UNI list contains detailed information about the UNI interfaces. Physically, rather than a single device, a UNI object represents a set of opto-electronic interfaces (transmitter or receiver cards) being part of the equipment of a node and sharing some common features. For example, the number of items (cards) available per set is specified as an attribute of the UNI object. Interfaces can be grouped according to different criteria, such as: card bit rate; card wavelength properties (transmitters may be tunable or fixed, i.e. operating at a substantially fixed wavelength; receivers may be wide-band or fixed); client port (cards may be used by any or by specific types of client signals); physical port (cards may be located anywhere in the node or in specific positions); etc. Each element of the UNI interface list is an instance of a general predefined UNI interface class, identified by a series of fields. For example, each element of the UNI interface list may contain the following information fields:

1. UNI ID: an ID field uniquely identifying the UNI interface. Alphanumeric IDs may be used, e.g. defined in a similar way as the Node IDs. Protocol-compliant ID labeling may be used. For example, an IP address may be assigned in the case the UNI object represents a single-channel transmission card. In a more general case, a UNI can be identified by a label assigned according to the GMPLS protocol. In any case, according to a basic constraint each ID is associated to one and one only UNI interface in the modeled network.

2. Node: this field is arranged in order to contain the Node ID of the node which the UNI interface belongs to.

3. Type: a field arranged for specifying the type of UNI interface. Conventionally, a positive value may indicate that the UNI object represents a group of input interfaces, and a negative value may indicate that the UNI object represents a group of output interfaces. Respective absolute values can be associated to different types of UNI interface. For example, three possible sub-values 1, 2 and 3 can be associated to the three following UNI interface types:
  1. A "tunable" UNI interface is equipped with a number of substantially identical transmitting/receiving cards, each one being able to transmit/receive on at least a sub-set of the possible wavelengths among those specified by the Wavecomb field of the UNI interface class (see below). This may be achieved by employing tunable wide-band or narrow-band transmitters or receivers in each card. The tunability range may be full (Wavecomb field with all 1-elements—fully-tunable UNI) or limited (partially-tunable UNI);
  2. An "arrayed" UNI interface is equipped with a number of substantially identical transmitting/receiving cards, each one being able to transmit/receive on a fixed set of wavelengths among those specified by the Wavecomb field of the UNI interface class (see below). Each card is equipped with an array of transmitters or receivers, each of them being fixedly tuned to the same specific wavelength;
  3. A "colored-pool" UNI interface is equipped with a number of transmitting/receiving cards, each one being able to transmit/receive on only one wavelength. The cards are individually tunable on the set of wavelengths specified by the Wavecomb field of the UNI interface class (see below), with a constraint: once a card of the UNI interface has been tuned to a given wavelength, no other cards of the UNI interface can be tuned to the same wavelength. The introduction of this type of UNI interface allows simplifying of the physical network specification. However, the same result can be also obtained by creating a set of different UNIs of type 2.

4. UNI structure: a field that can be arranged for describing the physical configuration of the UNI object. For example, the field format may be a set of two variables: number of cards, and WDM channel capacity (bit rate) of each card. It may be provided that if the WDM channel capacity sub-field assumes a suitable special value (i.e. −1, see below) the capacity is undefined (i.e. theoretically unlimited).

5. Wavecomb: a field arranged for instructing the graph construction procedures about which particular wavelength channels are included in a particular UNI interface among those possible (defined in Ref wavecomb). Wavecomb may be an array of binary values, having a number of elements equal to the length of Ref wavecomb: conventionally, a "1" may indicate that a laser of the transmitter (or a filter of the receiver) can be tuned to the corresponding wavelength, while a "0" may indicate no laser (or filter) at that wavelength.

6. UNI weights: a field arranged for containing data needed by the weight initialization procedures to build the Common weight field of the Arc objects of the above described graph, representing the UNI interface (see below). All the cards of a UNI interface may be characterized by the same weight features. The provided weight values should be sufficient to support the particular set of metrics and routing algorithms chosen by the network operator (with reference to the content of the above described Routing-metric library). The values provided in this field of the UNI objects are used by the Graph construction procedure to assign weights to Weight vectors of the Switches and Common weight fields of each Arc associated to a UNI (see below).

7. Client port a field arranged for including a particular client application associated to the UNI interface. Any lightpath originated or terminated by these cards carries the signals generated by that application. The application name (or names) written in this field match the application name of the Client spec field of the Lightpath compound of any connection attempting to use an UNI card. If a UNI is not associated with any specific application, this field may be conventionally set to "generic".

8. Node specific: a field arranged to specify attributes of UNI cards that depend on the type of node the UNI belongs to, i.e. on the specific procedures which define the node in the Node Library. For example, in an OADM two physical ports are usually identified, often named east and west ports. The network operator can decide to connect UNI interfaces to either one of these ports. This field can be used to indicate whether a given UNI is attached to the east or to the west side of the OADM. Similarly, by exploiting the Node specific field of the OADM (see above), one can specify which links are terminated on the west and which on the east side. A UNI on the west side is able to add (drop) a lightpath transmitted (received) on (from) a fiber of an output (input) duct terminated on the west side (dually for the east side);

9. UNI state: this field may be provided for specifying if the UNI interface is active or in-failure.

10. Arcs: this field may be arranged as an array containing the set of IDs of the Arc objects representing the UNI interface.

The lists of the physical database, as well as all the other lists of objects referred to in this description can be preferably implemented as dynamic lists (or dynamic linear arrays or vector). Each element can be linked to the next by a pointer; the first element is pointed by the vector root and the last points to nil. The order by which elements are included in the list has no relation with the physical topology: topological information is already implicitly embedded in the adjacency fields of the elements and is independent of the structure of the arrays. The decoupling between vector structure and topology allows to easily updating topological information by adding or deleting elements according to changes that may occur to the network during its operative life (e.g. equipment acquisition or decommissioning, new link installation, etc.). Access to each list element for data retrieval is provided by ID-field search. Vectors may be periodically sorted by ID-field value in order to improve the ID-field search algorithm efficiency and reducing the retrieval time.

The definition of the graph according to the present invention comprises steps aimed to build the Arc objects described with reference to FIG. 3 or FIG. 9, starting from information contained in the lists defined for describing the physical topology of the network. The graph is practically a vector of elements, each of which is an instance of a general Arc class, exemplary fields of which were disclosed above.

In the exemplary OTN case herein considered, the Arcs may be obtained by information included in the Duct list, the Node list, the Link list, the UNI list. Once the Arcs have been defined, a routing algorithm can be used in order to explore the graph for finding a lightpath satisfying a connection request on the network being modeled. When a suitable source-to-destination path is found for a new lightpath (i.e. at least one instance of Lightpath class comprising the Arcs crossed by the path found, and, correspondingly, an instance of Lightpath compound class are created), resources are allocated in the network for the setup of the same. In the network model, this means that the Arcs crossed by the path found are occupied by the lightpath to be set up. Correspondingly, when a further lightpath has to be routed the network may be already loaded with other previously activated lightpaths. There is the need therefore to store and update an occupancy state of the Arcs.

It could be convenient to define the Arcs in the model so as to have either simplex Arcs (i.e. Arcs being able to host a single lightpath) or multiplex Arcs. Multiplex Arcs may be implemented by adding two integer fields to the Arc class: available channel counter and max channel amount. The latter one represents a maximum number of channels usable by the Arc. The former one represents the number of channels that are still available on the Arc to host new lightpaths: this number may be set to the value contained in max channel amount when the Arc is created, decremented each time the Arc is assigned to a new lightpath, and incremented when a lightpath routed on the Arc is torn down. When the available channel counter reaches zero, the Arc is disabled: this means that while it is still part of the graph, any new run path-finding algorithm will treat the disabled Arc as non-existent. It is noticed that this is a convenient way to implement constraint-based routing. A zero in max channel amount may conventionally indicate that the Arc can hold an unlimited number of channels: in such case, assigned channels are counted (the available channel counter will assume negative values) but the Arc is never disabled.

For various reasons, sometimes an Arc could be disabled regardless of its weights and its distance from the source. In order to cope with such a case, a specific status field is provided in the Arc class, indicating a "disabled" condition (e.g. a conventional value "−1"). Such a value is an indication to any path-finding algorithm that the neighbor Arcs are unreachable, independently of what it is written in the Current distance field of the current Arc. In some other circumstances the weighting system may be bypassed in updating the distance, as if the Arc had a neutral set of weights: in this case, the status field may be given a conventional value "0". In normal conditions its value conventional value may be "1".

As stated above, each lightpath is characterized by its bit rate (2.5, 10 or 40 Gbit/s), or its OTN-hierarchy level k (1, 2 or 3): only physical resources compatible with the lightpath bit rate can be assigned to the lightpath. Therefore each Arc may contain a field containing its capacity k: when the path-finding algorithm is run to route a given lightpath request, it takes only Arcs with capacity k into account, whereas the other Arcs are implicitly disabled. A conventional value "0" in this capacity field indicates that any lightpath can use the Arc (transparent Arc), while a conventionally negative value −k may indicate that any lightpath with h<k can use the Arc (upper-bounded bandwidth).

The mechanisms described above regarding max channel amount, available channel counter, status and capacity apply independently also to each of the transitions from an Arc to its neighbor. Each switching transition should therefore be equipped with the four fields. In order to simplify the information storing system, the Common weight field may be arranged as an array containing max channel amount, available channel counter, status and capacity in predefined positions, such as in the first four elements, for example. The weight values (with number of elements variable according to the number of criteria adopted for planning) could then be arranged in the remaining positions of the array. As said before, the information in Common weight refers to the part of the Arc representing propagation of signals before they enter a switching node. In its turn, the Switches field is a bidimensional array having a number of column equal to the number of neighbor Arcs. The first element of each column may contain the neighbor Arc-ID, followed by a structure being the same as the structure of Common weight. This time, however, max channel amount, available channel amount, status, capacity and weights refer to the Arc-neighbor Arc switching transition represented by the column.

The network modeling with a graph according to the invention significantly differs from a known model such as layered graph in that the graph according to the invention is a flat-graph-like representation with multiplex arcs, whereas the layered graph is a layered-like representation. A further significant difference is that in the network representation with a graph according to the invention the minimum level of detail needed in different network segments may be automatically evaluated on the basis of the link/duct properties and/or of the switching capabilities of the nodes. For the representation of the OTN, a predetermined number of detail levels can be defined: for example, a value of a conventional variable called Detail can be associated to the Arcs:

Detail=00—duct level: a single Arc is all that is needed to represent the entire duct.

Detail=01—fiber level: a single Arc is all that is needed to represent each fiber of the duct.

Detail=10—wavelength level: a single Arc is all that is needed to represent each wavelength group of the duct. By wavelength group it is meant the set of all the WDM channels in the duct operating at the same specific wavelength, in different fibers.

Detail=11—WDM-channel level. An individual Arc represents each WDM channel in the duct.

The Detail field is evaluated during the construction of the graph, based on the information contained in the Physical database.

Summarizing, the graph model for an OTN, used as a base to run the routing algorithms, can be contained in a data structure that can be exemplarily described as follows.

Graph

It is a vector of elements, each of which is an instance of the general Arc class. The access to the elements of the graph, i.e. to the Arcs, can be performed based on an ID field.

An Arc contains the following fields:

1. Arc ID: an ID field uniquely identifying the Arc. It may be an alphanumeric ID automatically assigned to the Arc during the Graph construction procedure in a proprietary way. Preferably, no access is given to a user to this field. According to a basic constraint, each ID is associated to one and one only Arc in the Graph.

2. Detail: a field that indicates the level of Detail assigned to the Arc by the Graph construction procedure. The value inserted in this field gives an indication of what is represented by the Arc (e.g. an entire duct, or a single fiber, or a single wavelength, or a single pair fiber-wavelength). It can be a 2-digit binary number, as explained above.

3. Specification: a field having a value which depends on the Detail field value. Exemplarily, the Specification field may assume the following values:
   a. Arc Detail=00: the field is empty;
   b. Arc Detail=01: the field contains a scalar value indicating the number of the fiber (that will be conventionally indicated by "f") associated to the Arc;
   c. Arc Detail=10: the field contains a scalar value indicating the number of the wavelength (that will be conventionally indicated by "w") associated to the Arc;
   d. Arc Detail=11: the field contains a pair of numbers (that will be conventionally indicated by "(f,w)") indicating the number of the wavelength and the number of fiber associated to the Arc r;

4. Duct: a field arranged for including the ID of the Duct (or of the UNI interface) which the Arc is associated with. There may be special cases in which it may be convenient to define, in the graph, Arc objects that do not correspond to any physical element. In such cases, this field may assume a conventional value. For example, if the Arc has actually the logical meaning of a Hub (see below), this field is loaded with a special value _HUB_;

5. Node: a field arranged for including the ID of the Node which the Arc is associated with. It should be noted that an Arc is always associated to a Node, even when it has the logical meaning of a Hub: in fact Hubs (see below) are in all the cases special Arcs created to better represent the inner connectivity of a Node (as it will be explained below). When the Arc is associated to a Duct, the Node field will contain the ID of the downstream-adjacent Node of the Duct. When the Arc is associated to a UNI interface, the Node field will contain the ID of the Node which such interface is connected to.

6. Common weight: an array field that may be exemplarily composed as follows:
   a. Available channel counter (scalar): at the Graph construction this element is initialized to the Max channel amount. As explained above, if Max channel amount is greater than zero, this element stores the number of new lightpaths that can still be routed on the Arc. It is decremented by one when the Arc is assigned to a new lightpath. When its value reaches 0, the Arc is disabled. If Max channel amount is zero, Available channel counter simply counts the number of lightpaths routed on the Arc, without imposing any constraint (it will assume decreasing negative values);
   b. Max channel amount (scalar): the value to be set for this element depends upon the features of the Duct or the UNI interface which the Arc belongs to, and on the Detail of the Arc. A zero value indicates that the Arc can carry an infinite number of lightpaths;
   c. Status (scalar): this element indicates whether the weights of the Common weight field either have to be normally considered by the routing algorithm (1—enabled condition), or have to be considered as Infinite values regardless of their actual values (−1—disabled condition), or have to be considered as Zero values regardless of their actual values (0—bypass condition);
   d. Capacity (scalar): the following values are exemplarily possible for this element:
      {1, 2, 3}: in order to assign a given lightpath to the Arc, the lightpath must belong to a lightpath compound having a matching value in the Capacity field (the three values refers to k=1, k=2 and k=3 of the OTN standard);
      0: the Arc can be assigned to any lightpath, regardless of its Capacity;
      {−1, −2, −3}: in order to assign a given lightpath to the Arc, the lightpath must belong to a lightpath compound having a value of Capacity x such that: $x \leq |Capacity|$,
   e. Weights (weight vector): a vector containing one weight per routing criterion and metric among those selected by the planner. This vector is initialized during the Graph construction by a Weight initialization procedure according to the physical properties of the Duct (or of the UNI) associated to the Arc, taking also into account the physical properties of the Node associated to the Arc; when lightpath assignment is performed, the Weights vector can be also updated by a Weight updating procedure;

7. Switches: A 2-D array field, in which each column refers to a predetermined switching transition towards a neighbor Arc. The structure of each column may be composed as follows:
   a. Neighbor (Arc ID): it is the neighbor-Arc connected to the Arc via the switching transition;

b. Available channel counter (scalar): at the Graph construction this element is initialized to the Max channel amount. As explained above, if Max channel amount is greater than zero, it stores the number of new lightpaths that can still be routed on the Arc. It is decremented by one when the Arc is assigned to a new lightpath. When its value reaches 0, the Arc is disabled. If Max channel amount is zero, Available channel counter simply counts the number of lightpaths routed on the Arc, without imposing any constraint (it will assume decreasing negative values);

c. Max channel amount (scalar): the value of this element is set depending on the features of the Node associated with the Arc, as well as on the Detail of the Arc. A zero value indicates that the Arc can carry an infinite number of lightpaths;

d. Status (scalar): this element indicates whether the weights of the column of Switches either have to be normally considered by the routing algorithm (1—enabled condition), or have to be considered as Infinite values regardless of their actual values (−1—disabled condition), or have to be considered as Zero values regardless of their actual values (0—bypass condition);

e. Capacity (scalar): the following values are exemplarily possible for this element:
   {1, 2, 3}: in order to switch a given lightpath towards the specified neighbor, the lightpath must belong to a lightpath compound having a matching value in the Capacity field (the three values refers to k=1, k=2 and k=3 of the OTN standard);
   0: any lightpath can be switched, regardless of its Capacity;
   {−1, −2, −3}: in order to switch a given lightpath towards the specified neighbor, the lightpath must belong to a lightpath compound having a value of Capacity x such that: x≤|Capacity|;

f. Weights (weight vector): a vector element containing one weight per routing criterion and metric among those selected by the planner. This vector is initialized during the Graph construction by a Weight initialization procedure according to the physical properties of the Node associated to the Arc; when lightpath assignment is performed, the Weights vector can be also updated by a Weight updating procedure;

8. Current distance: an array field containing the distances currently evaluated by the routing algorithm from the source to the input end of the Arc. There is one distance value per routing criterion and metric among those selected by the planner;

9. Label type: a label assigned to the Arc by the routing algorithm during execution (e.g. 0=temporary, 1=permanent);

10. Previous arc: a field containing the Arc ID of the previous Arc calculated during execution of the routing algorithm;

11. Assignment: an array field for containing the list of the Lightpath IDs of all the lightpaths that have been routed on the Arc. It may be provided that all the lightpaths are listed, independently of their Status (hot, cold or expired).

In the graph construction procedure for the OTN, a scan of the physical database is initially performed. Exemplarily, the physical database may be scanned three times, first by inspecting all the Ducts, then the UNI interfaces and finally the Nodes. In the following description, the network of FIG. 14 will be used as a reference example, assuming that all the nodes are VWP optical cross connects (with wavelength conversion capability) except node C, which is assumed to be a WP optical cross connect (i.e. with no wavelength converters). Furthermore, link FN is assumed to be formed by two disjoint ducts o and o'. Moreover, it will be assumed that UNI interfaces of node E are of the colored pool type.

Figure 14:
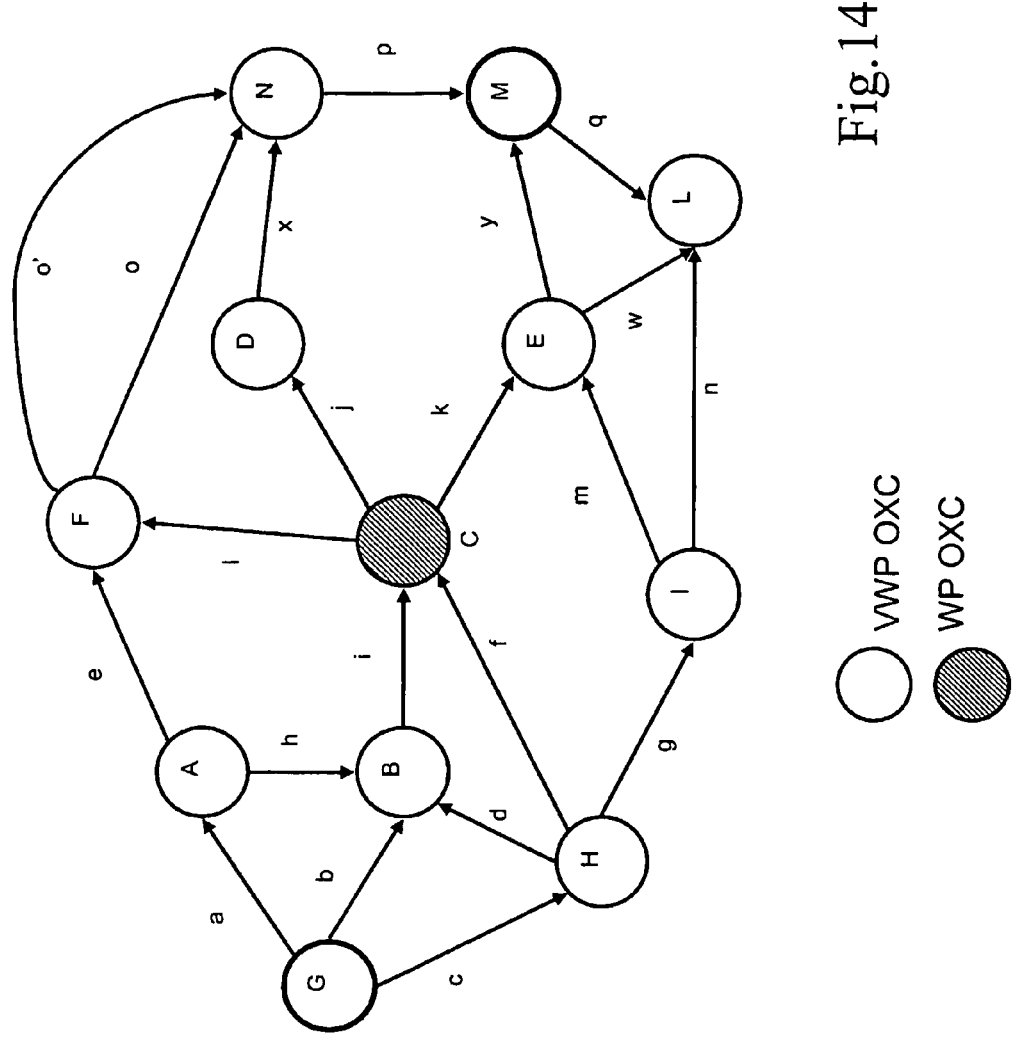
FIG. 14 schematically shows an exemplary OTN network comprising a WP node, VWP nodes and a link split into disjoint paths.
Figure 15:
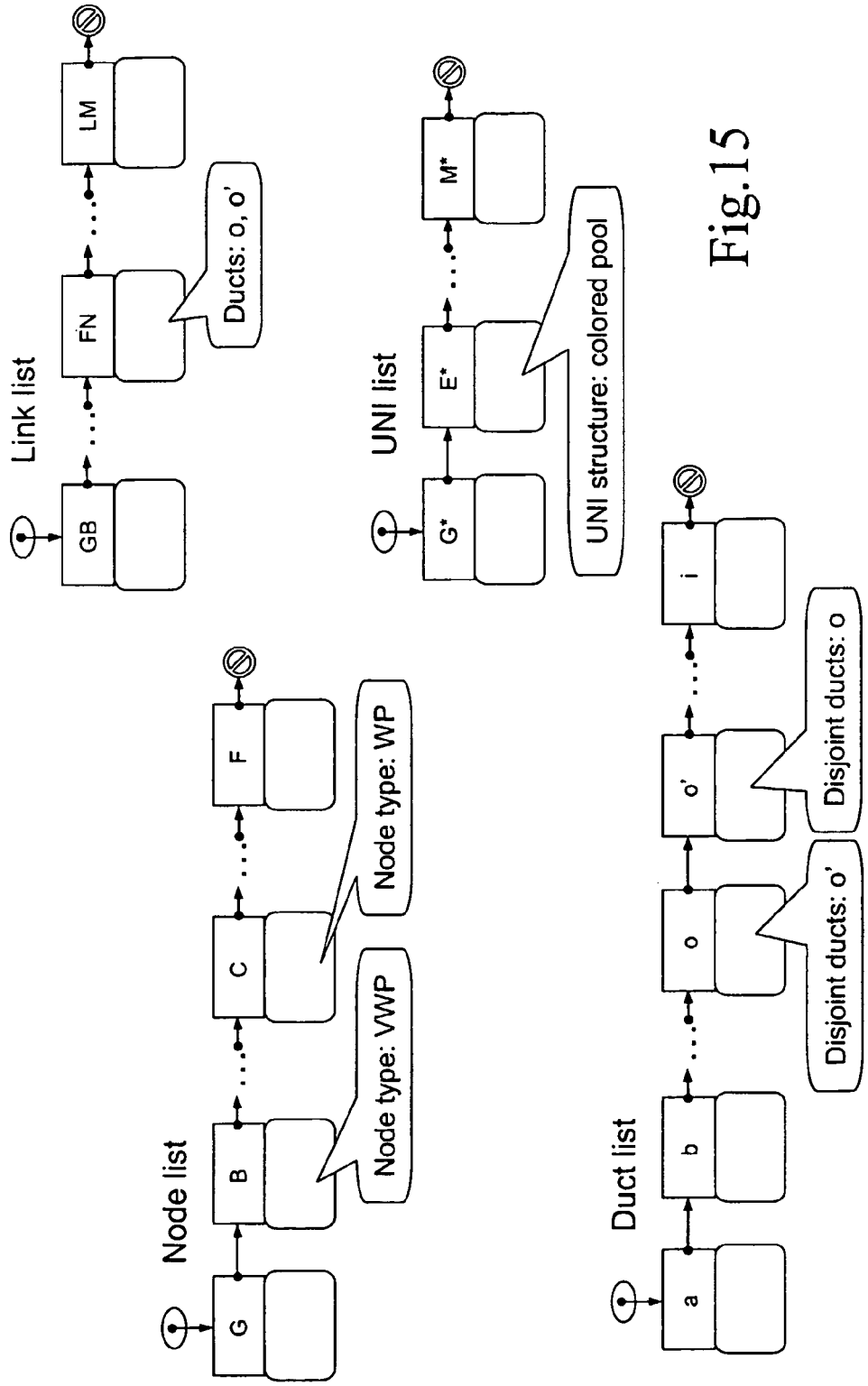
FIG. 15 schematically shows a physical topology database corresponding to the OTN network of FIG. 14.

The physical-topology database corresponding to the network of FIG. 14 is schematically represented in FIG. 15, highlighting some peculiar features of the objects that will be relevant to the subsequent explanations.

Graph Construction: Scanning the Duct List

Figure 16:
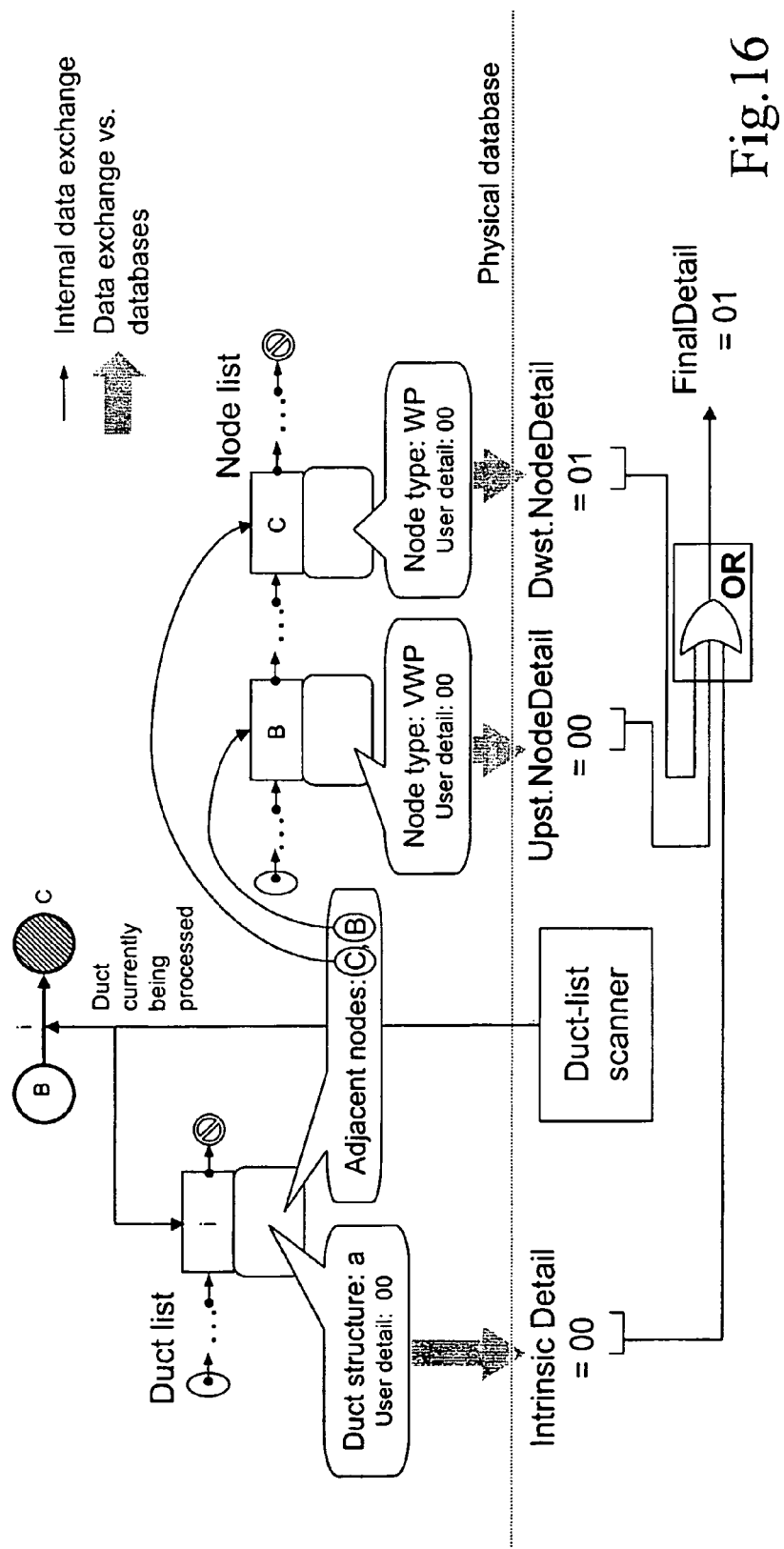
FIG. 16 schematically shows a first part of a procedure for defining Arc objects of a graph corresponding to the OTN network of FIG. 14.

The first phase of the Graph construction is based on the scan of all the ducts of the network, namely, of the Duct vector list. In FIG. 16 it is assumed that the procedure has reached Duct i.

In the Graph construction procedure, a "final" detail level is evaluated, taking into account of detail information stored in both the Duct and the adjacent Nodes, for determining how many Arcs should be created for modeling the network. In order to find the "final" detail level, knowledge of the intrinsic detail has to be gained, corresponding to the detail level stemming out of the duct/node characteristics specified in the physical database. This is readily done by firstly looking at the Duct structure field of the Duct instance representing i in the Duct list, which gives a "natural" detail level for the duct. The downstream semi-duct will be considered first. Referring to the classification reported above about this field, the following situations could occur:
   a. homogeneous semi-duct (Duct-structure type a): represented by a detail level Detail=00
   b. fiber-differentiated semi-duct (Duct-structure type b): represented by a detail level Detail=01
   c. wavelength-differentiated semi-duct (Duct-structure type c): represented by a detail level Detail=10
   d. (wavelength+fiber)-differentiated semi-duct (Duct-structure type d): represented by a detail level Detail=11

A user, for some particular needs (e.g. in order to verify if path changes are found with a new Detail level), may artificially increase the detail level above the natural detail level (i.e. the one evaluated by looking at the Duct structure). This is achieved by specifying a User detail in the appropriate field of the Duct instance for each semi-duct. In the example shown in FIG. 16, it is assumed that Duct i is a homogeneous semi-duct and has a User detail=00.

The intrinsic detail level of the semi-duct is obtained by OR-combining the natural and the user-specified details. In this way the detail of the representation is in any case according to the most stringent requirement. The OR-combination of the natural detail and of the User detail gives an intrinsic detail of 00, as shown in FIG. 16.

The decision process regarding the Detail of Duct i is not over yet. The Graph construction procedure, through the Duct i structure, acquires knowledge of the two upstream and downstream nodes connected by the semi-duct, by reading their IDs in the Adjacent node field (nodes B and C, see FIGS. 16 and 14). By inspecting the Node instances corresponding to the two nodes in the Node list, the Node type information is read. Each type of node has an associated natural detail level, which can be determined according to the blocking properties of the node, as exemplified hereinbelow. This natural detail level should preferably be specified as one of the features of the Node class of which the Node in the Node list is an instance.

A strictly non-blocking VWP node in the OTN is capable to switch a lightpath coming from any of its input WDM channel (on any fibers at any wavelength) to any of its free output WDM channels (on any fibers at any wavelengths) regardless of the state of other connections. A WP node with a strictly non-blocking space-switching matrix is capable to switch a lightpath coming from any of its input WDM channel (on any fibers at any wavelength) to any of its free output WDM channels (on any fibers), provided that it remains at the same input wavelength, regardless of the state of other connections. A fiber cross-connect with a strictly non-blocking space-switching matrix is capable to switch a lightpath coming from any of its input WDM channel (on any fibers at any wavelength) to any of its free output WDM channels (on any fibers), provided that it remains at the same input wavelength and that the state of the node has not been set before: once the first lightpath coming from an input fiber has been switched on a particular output fiber, all the other subsequent lightpaths coming from the same fiber are forced on the same output fiber. In the latter case, switching is no longer independent of the node state.

These three examples, being far from exhausting all the possible types of nodes, are however sufficient to understand the detail system. In the first case switching is always possible, regardless on the wavelength and fiber occupied by the input lightpath; in the second case, only wavelength information is required, since the output wavelength strictly depends on the input wavelength; in the third case, both the output fiber and wavelength will depend upon the input. The more constraints are imposed on the node-switching capability, the more the detail of the switched entity becomes relevant. From these considerations it follows that the natural detail level associated to a node will be 00, 01 or 11 respectively if the node is a strictly non-blocking VWP node (such as node B), a spatially strictly non-blocking WP node (such as node C) or a fiber-switch. The detail level of other node types will be given below. However, as it can be seen, the detail level assignment follows a general rule: the higher the degree of non-blocking capability, the lower the level of required detail.

As in the case of the Duct, each Node may further have a User detail field by which the user can impose a higher detail level compared to the natural level. The two detail variables are then ORed, as in the previous case. As shown in FIG. 16, it is assumed that the User detail of both node B and C is 00.

In order to conclude the decision process regarding the Duct detail, both the two adjacent nodes have to be examined. The node-defined detail for the Duct (e.g. Duct i) is obtained by ORing the detail level coming from the two adjacent nodes (i.e. B and C). This corresponds to the following assumption for the modeling system: path-finding algorithms operating on the graph should take into account only information that is relevant to the end-to-end routing and resource assignment for a lightpath; any allocation problem that can be locally solved at the edges of a single duct is not considered. For example, if a duct connects two VWP nodes, the two nodes can select by themselves which particular wavelength on which fiber of the duct have to be assigned to a given lightpath. It makes sense to assume that such a decision, locally taken, does not impact at all on lightpath routing or wavelength assignment on other links.

The latter statement is applicable to the considered example provided that all the WDM channels on Duct i are perfectly equivalent, or in other words if the previously computed intrinsic detail of Duct i is homogeneous with detail level 00. Otherwise, the detail level has to be increased.

Summarizing, the final Detail level of a semi-duct is set with the following operation:

FinalDetail(semi-duct)=Detail(semi-duct) OR Detail (upstream node) OR Detail(downstream node)

In the above OR combination, each term is on its turn obtained by ORing the intrinsic detail of the object with the User detail field contained in the respective object instance in the physical database. FIG. 16 finally shows that the formation of the FinalDetail of Duct i, which in the example under consideration is 01 (being node C a WP node).

Figure 17:
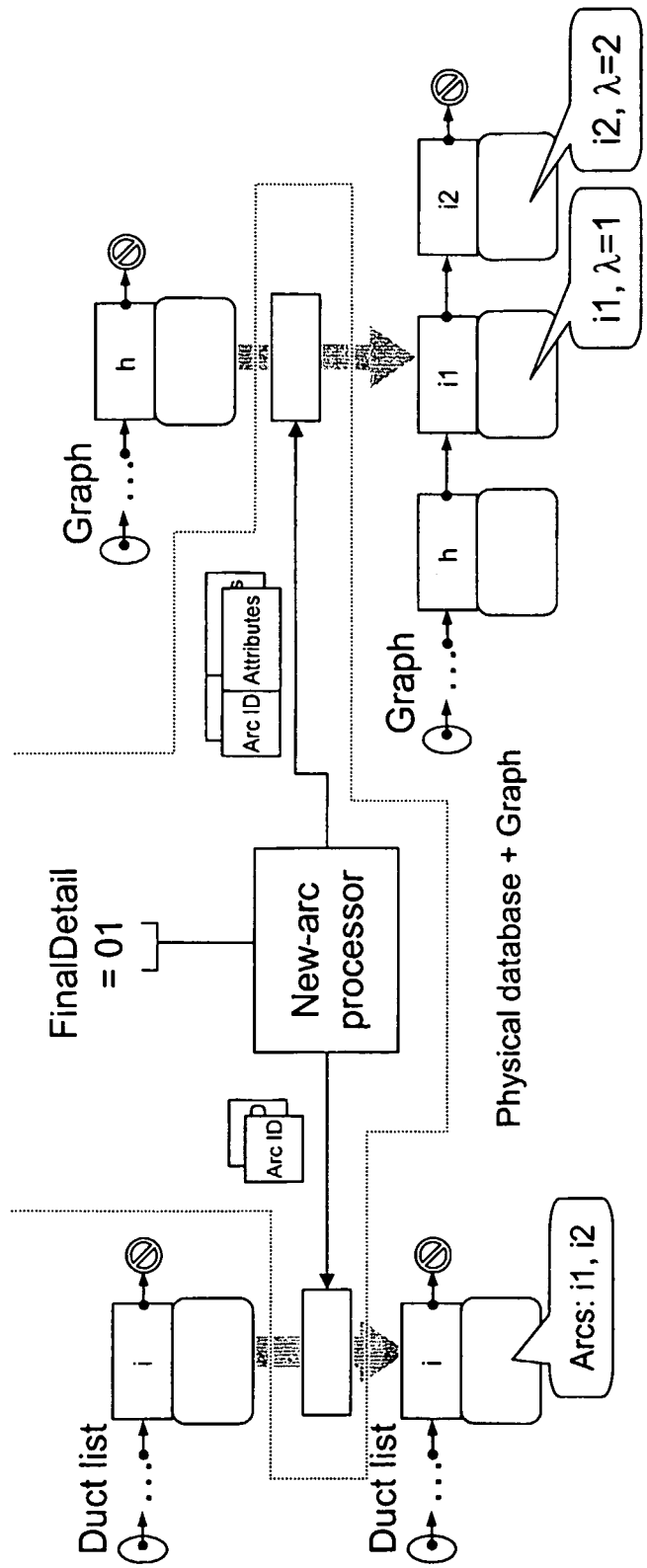
FIG. 17 schematically shows a second part of a procedure for defining Arc objects of a graph corresponding to the OTN network of FIG. 14.

Once the final Detail of a semi-duct has been defined, the Graph creating procedure can actually create the Arcs corresponding to the current Duct. This is schematically shown in FIG. 17, in which it is assumed that the Graph vector already contains Arc h (corresponding to Duct h). The creation of a single Arc comprises adding an instance of the Arc class to the Graph vector and initializing some of its fields. More precisely:

A new Arc ID is created, according to the chosen ID system;

The Duct ID of the represented duct is written in the Duct field of the new Arc, while the Node ID of the node for which the semi-duct is an input, i.e. down(up)stream node for the down(up)stream semi-duct, is written in the Node field thereof;

The new Arc is loaded with the vector of weights, elements of which are at least partially set according to what is specified by the weighting-system and by the information contained in the Duct object. The status element of the Common weight field is set to normal, while the max channel amount and capacity elements are initialized.

All the other fields, including Common weight, Switches, Previous Arc and Assignment, are left empty.

The number of new Arcs to be created for a single semi-duct, their Specification field, the capacity and max channel amount elements of their Current distance field depend upon the FinalDetail level and on the semi-duct Duct structure. If the following symbols are introduced:

|X(y)|: number of elements of a vector X,
Wo: number of elements of Wavecomb,
WP: generic weight component associated to the wavelength,
FP: generic weight component associated to the fiber,
F: number of fibers in the semi-duct
C: capacity (e.g. bit rate) supported by the duct/fiber/wavelength
w: a generic wavelength,
f: a generic fiber,
[ . . . ]: content of the relevant fields of the Duct structure,
The following cases are possible:
Structure "a" [F, C, FP, WP, Wavecomb], FinalDetail 00: one Arc is created, with Detail 00, Specification empty, max channel amount=Wo·F, capacity=C;
Structure "a" [F, C, FP, WP, Wavecomb], Detail 01: F Arcs are created, with Detail=01, Specification f$\in$[0, F-1], max channel amount=Wo, capacity=C, all the Arcs have the same FP and WP;
Structure "a" [F, C, FP, WP, Wavecomb], Detail 10: Wo Arcs are created, with Detail=10, Specification w E [Wavecomb(1) . . . , Wavecomb(Wo)], max channel amount=F, capacity=C, all the Arcs have the same FP and WP;
Structure "a" [F, C, FP, WP, Wavecomb], Detail 11: Wo·F Arcs are created, with Detail=11, Specification (f, w) with: f$\in$[0, F-1] and w $\in$[Wavecomb(1, f) . . . , Wavecomb (Wo, f)], max channel amount=1, capacity=C, all the Arcs having the same FP and WP;
Structure "b" [FP(f), C(f), F=|C(f)|, WP, Wavecomb], Detail 01: F Arcs are created, with Detail=01, Specification f$\in$[0, F-1], max channel amount=Wo, capacity=C (f), fiber-dependent FP(f), all the Arcs having the same WP;
Structure "b" [FP(f), C(f), F=|C(f)|, WP, Wavecomb], Detail 11: Wo·F Arcs are created, with Detail=11, Specification (f, w) with: f$\in$[0, F-1] and w$\in$[Wavecomb(1, f) . . . , Wavecomb(Wo, f)], max channel amount=1, capacity=C(f), fiber-dependent FP(f), all the Arcs having the same WP;

Structure "c" [WP(w), C(w), W=|C(w)|, F, Wavecomb], Detail 01: W Arcs are created, with Detail=10, Specification w∈[Wavecomb(1) . . . , Wavecomb(Wo)], max channel amount=F, capacity=C(w), all the Arcs having the same FP, wavelength-dependent WP(w);

Structure "c" [WP(w), C(w), W=|C(w)|, F, Wavecomb], Detail 11: W F Arcs are created, with Detail=11, Specification (f, w) with: f∈[0, F-1] and w E [Wavecomb(1, f) . . . , Wavecomb(Wo, f)], max channel amount=1, capacity=C(w), all the Arcs having the same FP, wavelength-dependent WP(w);

Structure "d" [WP(w), W(f), C(f), FP(f), F=|C(f)|, Wavecomb(f)], Detail 11: $\Sigma_f$ W(f) Arcs are created, Detail=11, Specification (f, w) with: f∈[0, F-1] and w∈[Wavecomb (1, f) . . . , Wavecomb(Wo, f], max channel amount=1, capacity=C(f), FP(f), WP(Wavecomb(w, f)).

The exemplary case herein considered for Duct i corresponds to the third case of the above list. Thus, Wo Arcs are created. Exemplarily, FIG. 17 shows the generation and inclusion in the Graph vector of two Arcs corresponding to Duct i, namely Arc i1 and Arc i2 (a case with Wo=2 is exemplarily considered), respectively corresponding to wavelengths $\lambda$1 and $\lambda$2. The Arc IDs i1 and i2 are included in the Arcs field of Duct i.

The entire procedure is then repeated for the other semi-duct of the Duct structure. At the end, the IDs of all the created Arcs are written into the Arcs field of the Duct.

Graph Construction: Scanning the UNI List

The UNI interfaces are represented in the Graph by Arc objects which have approximately the same structure of the Arcs representing the Ducts. Input UNI interfaces do not have any other Arc connected to their input termination, while output UNI interfaces are not linked to any other Arc on their output. The Switches field of this latter UNI type holds no information (a single-column matrix may be present for implementation reasons, but with elements set to nil, with no Arc address specified in the top element).

The creation of the Arcs representing the UNI interfaces is based on scanning all the UNIs of the network physical database (the UNI list vector). The procedure is very similar to the duct-Arc creation described above. It is however simpler, since the detail level of the representation of a UNI depends only on its own intrinsic detail and on the intrinsic detail of the node which the interface is attached to, and not on any further network element. The two intrinsic detail numbers are combined in OR, as in the duct case.

The UNI intrinsic detail depends upon the Type field and upon the Wavecomb specification. If type is 1 (fully tunable UNI, see above) the UNI intrinsic detail is 00; whereas it is 10 in all the other cases.

When the UNI interface has intrinsic detail 00, a single Arc is created having a max channel amount attribute equal to the number of cards of the UNI structure. The capacity of the Arc is set to the channel capacity specified in UNI structure. In all the remaining cases, the ORed detail level of UNI and node is always 10 or 11. UNI-Arc construction is then performed according to the following rules, which are applied indifferently at both detail levels. If W is the maximum number of wavelengths available for the UNI (i.e. the number of 1-elements in the binary Wavecomb field):

a. Partially-tunable UNI (type 1, with some zeros in Wavecomb): a set of W Arcs is created, assigning to each Arc a wavelength among those referenced by a 1-digit of Wavecomb; these Arcs will have a common available channel counter. By this, it is meant that the max channel amount of any of them is initialized to the number of cards of the UNI structure. When a new lightpath is routed in one of the Arcs, the available channel counter field is decremented in all the Arcs of the set, so that they all have the same amount of available channels. All the counters are vice-versa incremented in case of lightpath removal;

b. Fixed UNI (type 2): a set of W Arcs is created, assigning to each Arc a wavelength among those referenced by a 1-digit of Wavecomb; these Arcs will have the max channel amount set to the number of cards attribute of the UNI structure. Differently from case-a, the available channel counter fields of the created Arcs will be independent one from each other;

c. Colored-pool UNI (type 3): a set of Arcs with Detail=10 is created, one for each of the wavelengths referenced by a 1-digit of Wavecomb and all with max channel amount set to 1.

All the Arcs created as representations of UNI interfaces may be assigned a special conventional value (e.g. _LOCAL_) in their Link field, to distinguish them from Arcs descending from Ducts. Other parameters specified in other fields of the UNI object (e.g. Client port, Node specific, etc.) are not directly loaded into the UNI Arcs field, but are used in lightpath routing or in the later switches assignment step.

Graph Construction: Scanning the Node List

Once the entire Duct list and UNI list have been scanned and all the Arcs have been created according to the suitable detail level for ducts and UNI interfaces, the third part of the Graph creation procedure begins.

At this point of the procedure all the Arc objects have been created: however, the Switches field is still unspecified in each of them. Specifying such fields is the task of the node arc-creation procedure: this corresponds to set up the virtual links joining the Arcs, so as to actually build the topology of the Graph.

Similarly to the previous steps, the Arc-creation procedure is based on scanning the Node list, node-by-node. The Graph portion constructed at each node should reproduce the node internal structure: information contained in the physical database and in the equipment library regarding the node is thus needed. However, it is not sufficient. The main difficulty in reproducing the node structure in the model resides in the fact that representation of the transmission systems adjacent to the node may be variable and only partially independent on the node type. It has been already shown that the detail of each Duct depends on the type of the Duct and on both its end nodes: a node can therefore be adjacent to ducts with different detail levels. Thus, the model of the node architecture has to adapt to the detail levels of its adjacent ducts: information regarding the detail levels of incoming and outgoing ducts is thus necessary.

Figure 18:
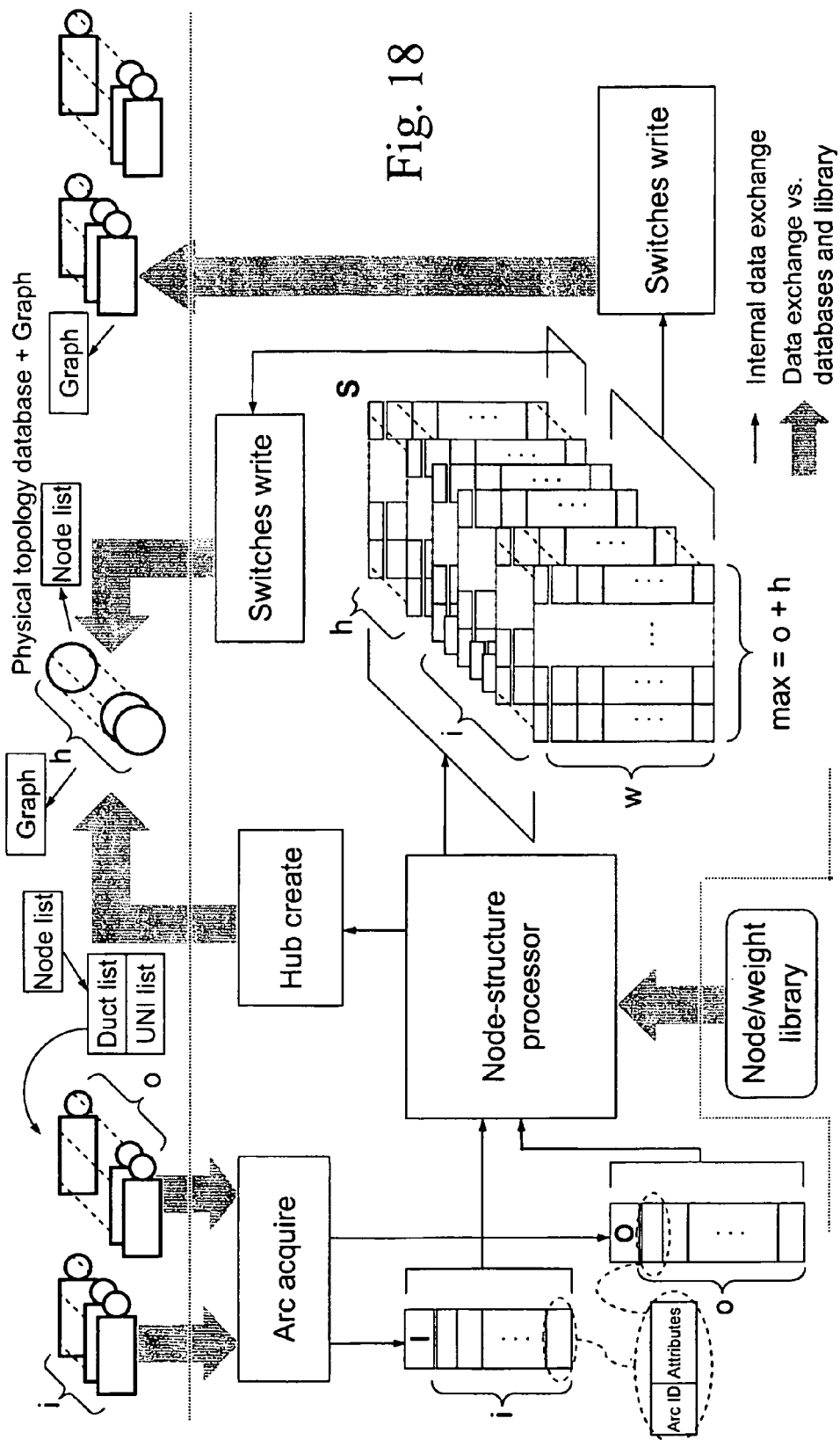
FIG. 18 schematically shows a third part of a procedure for defining Arc objects of a graph corresponding to the OTN network of FIG. 14.

Let us assume that the node-list scanning has reached a given node. As schematically shown in FIG. 18, an exemplary Arc-creation procedure may require the following actions to be carried out in sequence:

Arc acquisition: the Node object itself directly contains no information regarding its adjacent ducts. However, the set of incoming and outgoing Arcs modeling the adjacent ducts can be retrieved by reading the list of ducts in the Adjacent ducts field of the Node and by further reading the list of Arcs in the Arcs field of each Duct of the list. This retrieval operation will be summarized, in the following, by the synthetic notation: Node.Adjacent ducts→Duct.Arcs. The set of Arcs used to represent the UNI interfaces of the node can be gathered by reading the list of UNIs in the UNI interfaces field of the Node and by further reading the list of Arcs in the Arcs field of each UNI of the list (synthetic notation: Node.UNI interfaces→UNI.Arcs). At the end of the acquisition action two vectors I and O are created, for node input and output, respectively. The two vectors have a number of elements equal to the number of Arcs arriving to or departing from the node. Each vector element contains the Arc ID followed by the attributes of the Arc. Such attributes are the collection of the contents of the following fields of the Arc: Detail, Specification (none, fiber, wavelength or fiber and wavelength, according to the detail), Duct, Link (obtained via Arc.Duct→Duct.Link), Node specific (obtained getting info included in Node..Node specific regarding the duct Arc.Duct or via Arc.Duct→UNI.Node specific if the Arc belongs to a UNI). The Arcs representing UNI interfaces are identified by setting their Link attribute to the special conventional value (e.g. _LOCAL_);

Node-structure processing—input: as the second action, the two vectors I and O are processed in order to compute the Switches matrices. The implementation of this action can be controlled by user-defined procedures contained in the Node Library section dedicated to the specific node type. Procedures of the Routing-metric Library are also required, since the columns of the Switches matrices will contain weights for all the metrics selected by the user. Therefore, node-structure processing, the core of node arc-creation, varies from node-type to node-type and from metric set to metric set.

Node-structure processing—Hubs: while processing the structure of the node, requests for creation of some new objects in the Graph structure may be issued. These objects are called Hubs: they have already been mentioned, without a formal introduction, about the colored-pool UNIs. The name "Hubs" is only used for sake of clarity: actually a Hub is an Arc, i.e. an element of the Graph, instance of the Arc class, having particular field attributes. The main difference versus the other Arc instances is that the Hub does not correspond to any element of the physical network (an Arc logically corresponding to a Hub can be recognized by a special conventional value, e.g. _HUB_, in its Duct field); in fact, it is not present in the physical network database and has no individually specified parameters. A Hub can be created as part of a node structure basically to reduce the size of the Switches matrices. When a set of input Arcs is full-mesh connected by the inner node structure to a set of output Arcs and all the involved transitions have the same weights, all the Arcs of the input set will have the same Switches matrices. This representation is redundant and can be simplified without loosing information: a Hub is created; all the input Arcs are connected to the Hub and the Hub is then connected to all the output Arcs. The input Arcs will then have single-column Switches matrices, while only the Hub will have a matrix with as many columns as the output Arcs. The saving in memory occupation can be relevant if the number of involved Arcs is high. Hubs can also be created in some node architectures to introduce switching constraint, as it was already seen for the colored-pool UNI interfaces.

Node-structure processing—output: a first result of the processing action is a series of requests for Hub creation issued to the Hub creation action (if present). The final result of the processing action is a three-dimensional matrix S, which contains all the Switches matrices needed to complete the node structure. If i(o) is the number of elements of vector I(O), h Hubs have been created and w metrics are used, then the size of S is [(w×q×(i+h)], where q≤o+h. Among all the two-dimensional matrices of S, i are addressed to the proper input Arcs, while the remaining h to Hubs; those of the first i two-dimensional matrices- addressed to Arcs that have been connected to Hubs will have a single column.

Hub creation and Switches writing: these actions comprise making suitable updates to the physical database and to the graph data structures in order to implement the outputs of node-processing. Specifically, new Arc instances are added to Graph to accommodate the newly-created Hubs (if any), accordingly updating the Arcs field in the Node; Graph is finally modified writing the Switches matrices in all the input Arcs and the Hubs of the node.

Figure 19:
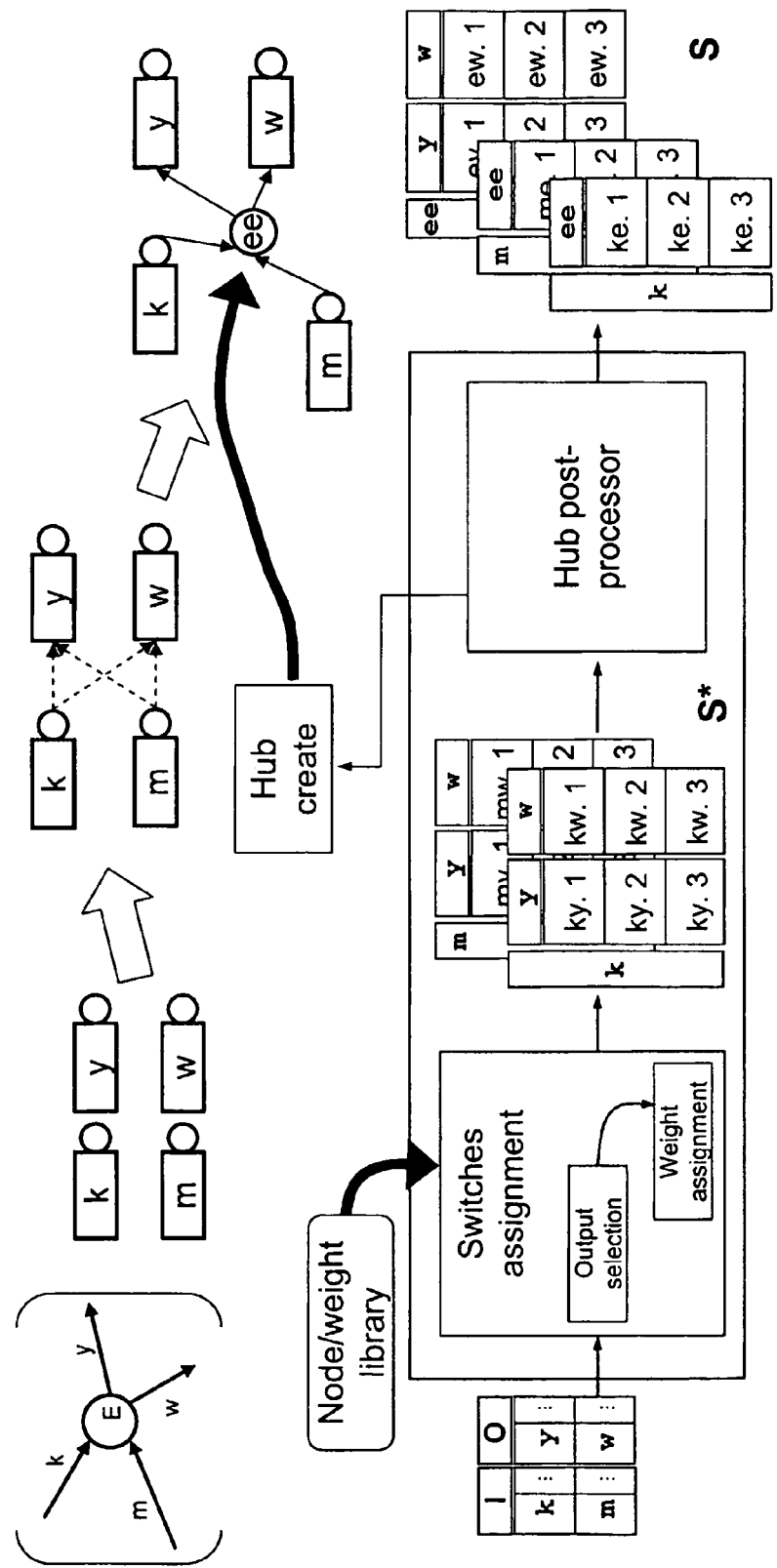
FIG. 19 shows an exemplary application to node E, included in the OTN network of FIG. 14, of the procedure part shown in FIG. 18.

FIG. 19 shows a possible procedure to be used and its application to node E of the sample network of FIG. 14 (a VWP-OXC type node without particular routing constraints). According to the procedure, at first the Switches assignment function creates a preliminary and temporary version of S, named S*, by considering no Hubs. S* is not used to write Switches in the Arcs, but it is fed to a second function of post-processing (Hub post-processor) that creates Hubs when needed and suitably connects them to the Arcs of the node, thus producing the final matrix S, which is then used to actually write the Switches field. In the example a Hub is inserted since both the input Arcs k and m are equally connected to both the output Arcs y and w. In this specific example we have assumed that, according to the set of metrics selected by the operator, three weights are required. Hence, all the matrices have three-rows weight-vectors (plus a top row reporting the Neighbor Arc IDs). Each weight element has been indicated (for sake of representation) by the sequence of the two Arc IDs of the particular transition it is referring to, followed by a number identifying the metric (e.g. ke.2 means the weight of the metric number 2 related to the transition between Arc k and Arc ee through Node E). A more detailed description of how weights are managed is reported below. In FIG. 19 other elements of the Switches matrices (e.g. available channel counter, max channel amount, status, capacity) have not been explicitly represented, for the sake of simplicity.

Figure 20:
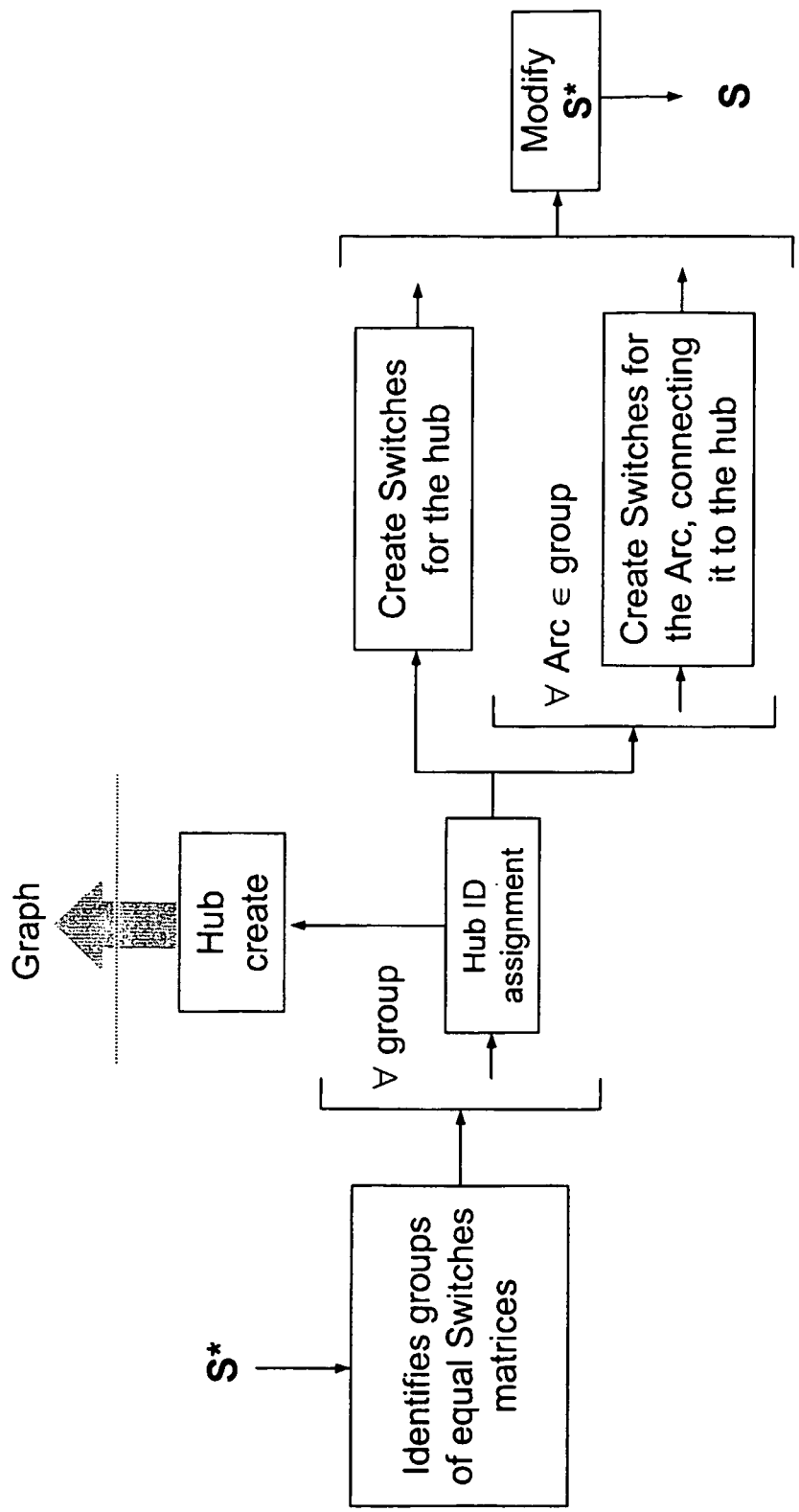
FIG. 20 schematically shows a possible flow-diagram for the hub post-processing function of FIG. 19.

FIG. 20 shows an exemplary flow-diagram for the functioning of the Hub post-processor. This function inspects S* to identify groups (if any) of more than one input Arcs which are going to be assigned exactly the same Switches matrix (say X). For each group found, the procedure chooses an Arc ID for the Hub and activates the subsequent creation of the Hub. Then it creates the Switches for the Hub, simply by addressing X to the Hub ID, thus connecting the Hub to the output Arcs. All the Switches matrices of the Arcs of the group are then modified in order to find the final Switches matrix S: in particular, they are replaced by replicas of a single-column matrix, having the Arc ID of the Hub as first element and each of the weight elements set to the Zero Value of the related metric: this connects the input Arcs to the Hub.

Coming back to FIG. 19, the Switches assignment function is the core of the node Arc-assignment procedure. Though described in relation to a particular class of node-types, its main structure and basic mechanisms are intended to be common to any kind of node.

Figure 21:
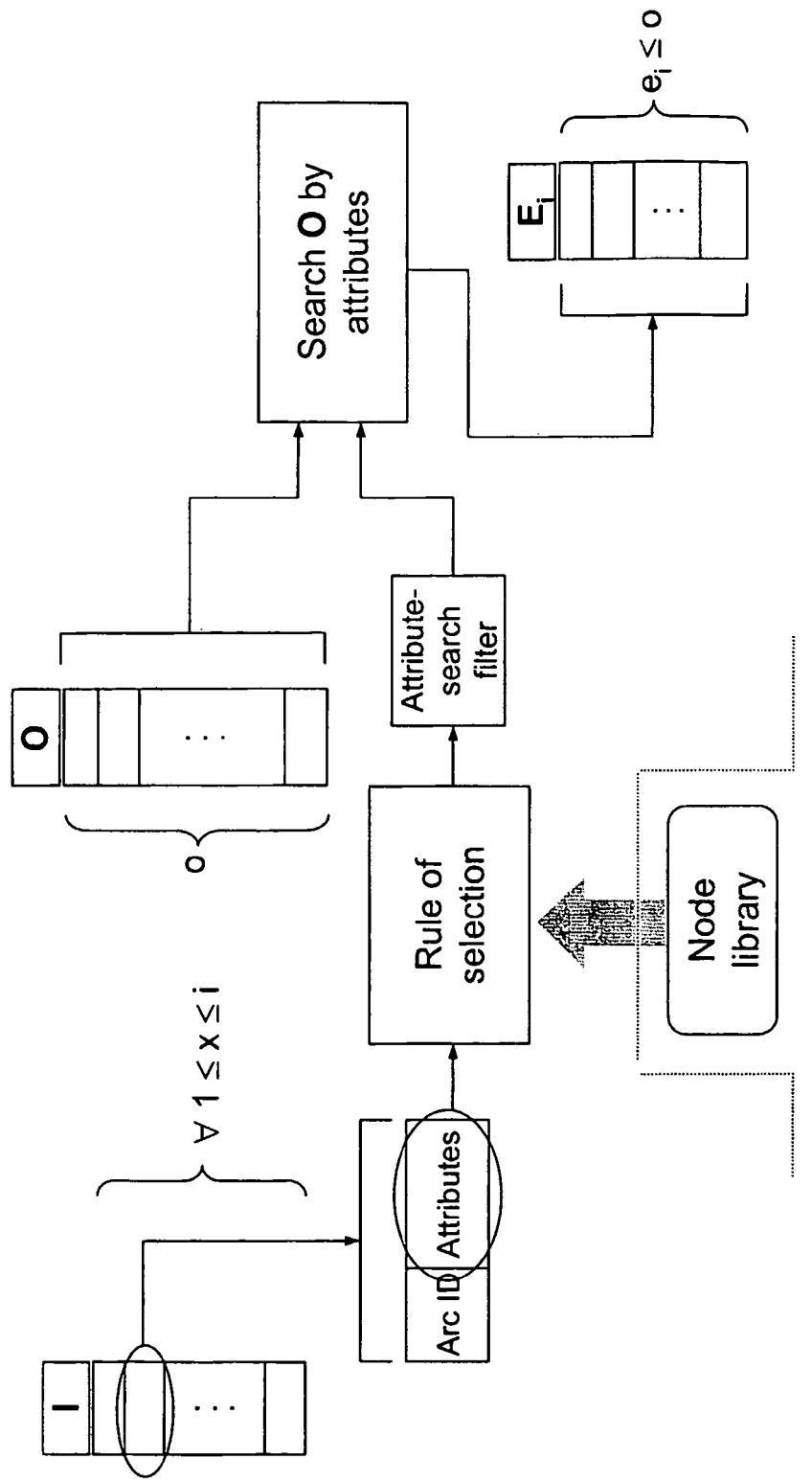
FIG. 21 schematically shows a possible flow-diagram for a first part of the Switches assignment function of FIG. 19.

The first step of the Switches assignment function is the Output selection, exemplarily shown in FIG. 21. A cycle scans the elements of vector I: at iteration x, a Selection rule is applied to the attributes of the x-th input. This rule, provided by the Node Library, returns an attribute-search filter describing what kind of attributes an output Arc should have, in order to be connected to the input Arc with the given input attributes in that node. The Selection rule depends on the node type. Rules can be different for Arcs representing Ducts and those representing UNI interfaces. Some examples better clarify this point:

The simplest possible node is the VWP-OXC, which is able to perform any kind of switching, including transitions between an input Arc and an output Arc belonging to the same link (loopback). In this case, for Duct Arcs the filter is all-pass, since each input Arc should be connected to all the output Arcs. On the other hand, in order to prevent input-output UNI shortcut, which has no actual meaning, a filtering condition is set for UNI Arcs: <<filter out any output Arc having Link=_LOCAL_>>;

Commonly, the loopback function is undesirable. For a standard VWP-OXC with no loopback, a possible filter may contain the condition: <<select all the output Arcs except those belonging to the same Link of the input Arc>>. The condition applies also for UNI Arcs, since the UNI shortcut is automatically prevented in this case;

For a WP version of the above node, the filter may have the following condition: <<select all the output Arcs having the same wavelength as the input Arc, except those belonging to the same Link of the input Arc>>. The same holds for UNI Arcs;

In an OADM with assigned physical ports more strict conditions are set. For Duct Arcs and UNI Arcs a possible filter may have the condition: <<select all the output Arcs having the same wavelength and fiber as the input Arc, except those belonging to the same Link of the input Arc, and select UNI Arcs assigned to the same physical port>>.

The selection rule is an advantageous technique in all the simple node architectures in which connections can be classified by a small number of logical conditions, each class comprising a large number of transitions. If the internal node architecture is very complicated with sort-of-"random" patterns, a matrix representing the permutations performed by the node can substitute the selection rule.

With reference to FIG. 21, the attribute search filter is used by a Search O function in order to identify those output Arcs that are compliant to the filtering conditions. The $e_i$ matching elements of O are copied in a vector $E_i$. The search of O by attributes is not a simple comparison, due to the previously mentioned need to cope with different levels of detail. The attribute-search filter is always specified at the node intrinsic level of detail. Due to the duct arc-construction, there cannot be Duct Arcs adjacent to the node having a coarser-granularity detail (e.g. Detail 00 when the intrinsic Detail of the node is 01) or with the same granularity but incompatible (e.g. Detail 01 when the intrinsic Detail of the node is 01); however, there may be Arcs with a finer detail. Thus the search procedure has to identify Arcs in an adaptive way, so to include in the vector $E_i$ those Arcs which, despite their finer detail, are nevertheless compliant to the conditions set by the filter. For example, in the above mentioned WP OXC the filter is clearly specified at Detail 10 (wavelength detail): any Arc having Detail 11 can be included into $E_i$, provided that it does not belong to the input Link and its wavelength is the same as the input Arc.

Figure 22:
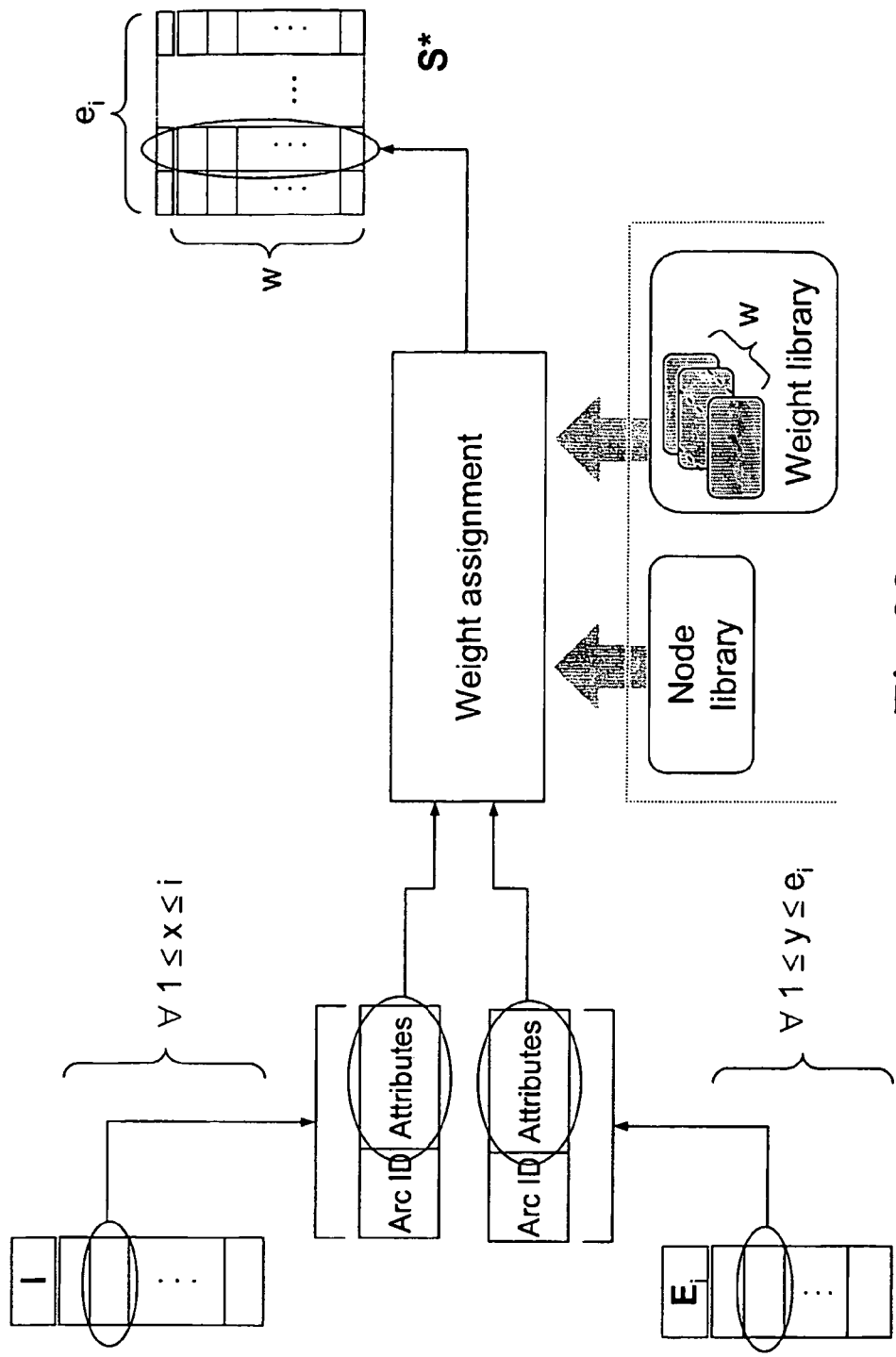
FIG. 22 schematically shows a possible flow-diagram for a second part of the Switches assignment function of FIG. 19.

Once the vector $E_i$ has been evaluated for each entry of I, the set of $E_i$ vectors is fed together with I to the weight assignment function, as shown in FIG. 22. The weight assignment function evaluates the transition weights according to the specifications of the type of node and applying a Weight initialization procedure (contained into the Routing-metric, or weight, Library) for each metric among those selected by the user. The overall result is the already introduced temporary matrix S*.

For a quantitative evaluation of the advantages of the graph model according to the present invention versus other known routing-graph representations of OTN, the exemplary network of FIG. 14, having all the nodes equipped with VWP OXCs, except for node C, which is a WP OXC, will be used. For the sake of simplicity, links in just one propagation direction and a lightpath to be routed connecting node G to node M will be considered.

The flat representation according to the graph of FIG. 14 comprises twelve node objects plus a dummy node (F') inserted to represent link FN, which comprises two disjoint ducts. As it was already stated, this representation is useful for joint routing and wavelength assignment only in the case all the nodes are VWP OXCs.

Let us now assume that all the ducts comprises F=1 fiber with W=2 wavelengths per fiber.

Figure 23:
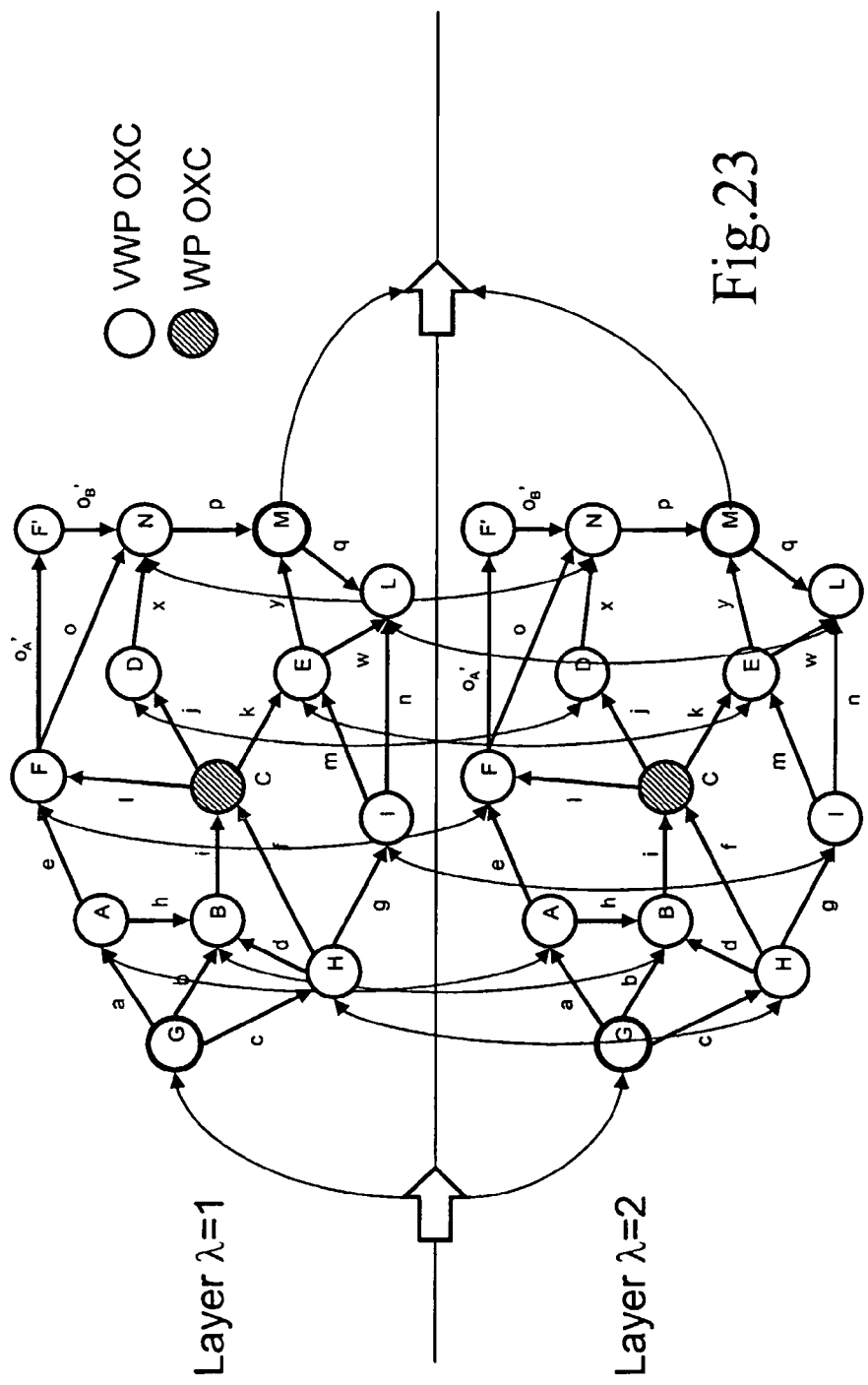
FIG. 23 shows an exemplary layered graph modeling the OTN network of FIG. 14.

A layered graph, comprising two planes for the two wavelengths, would lead to 2·13=26 node objects, plus two extra node objects (shown as solid arrows) included to represent lightpath adding and dropping, as well as to enable the wavelength selection on the initial and final fiber, summing to OL=28 node objects. The layered graph is shown in FIG. 23. Vertical counter-directed bidirectional arcs connect the images on the two planes of all the nodes except node C, to model wavelength converters.

Figure 24:
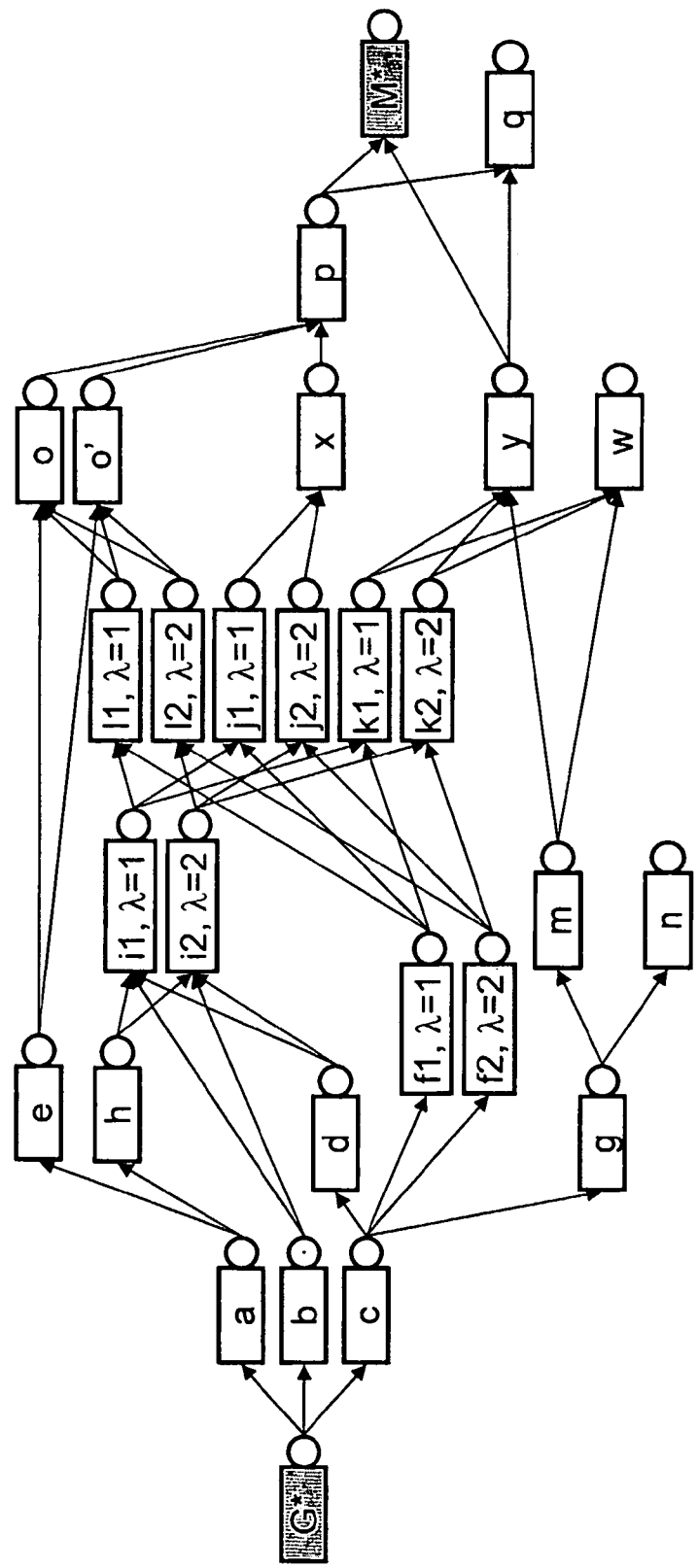
FIG. 24 shows a first exemplary Arc-based graph modeling the OTN network of FIG. 14, according to the present invention.

FIG. 24 shows an equivalent Arc-based graph built according to the present invention. A number OA=28 Arc objects is required, exactly as in the layered-graph case. No Hubs were introduced.

Let us now assume to apply a method similar to that proposed in the present invention, in order to model the topology of the Arc-based graph (a matrix stored in each Arc having as many columns as the neighbor Arcs connected to it), also in the layered graph (a matrix stored in each node having as many columns as the neighbor nodes connected to it). The total number of columns obtained by summing the number of columns of all the matrices can be easily graphically obtained, being equal to the total number of arrowheads in the two drawings. For the layered graph of FIG. 23 a number CL=68 of columns is obtained, while in the Arc-based graph of FIG. 24 there are CA=50 columns.

Figure 25:
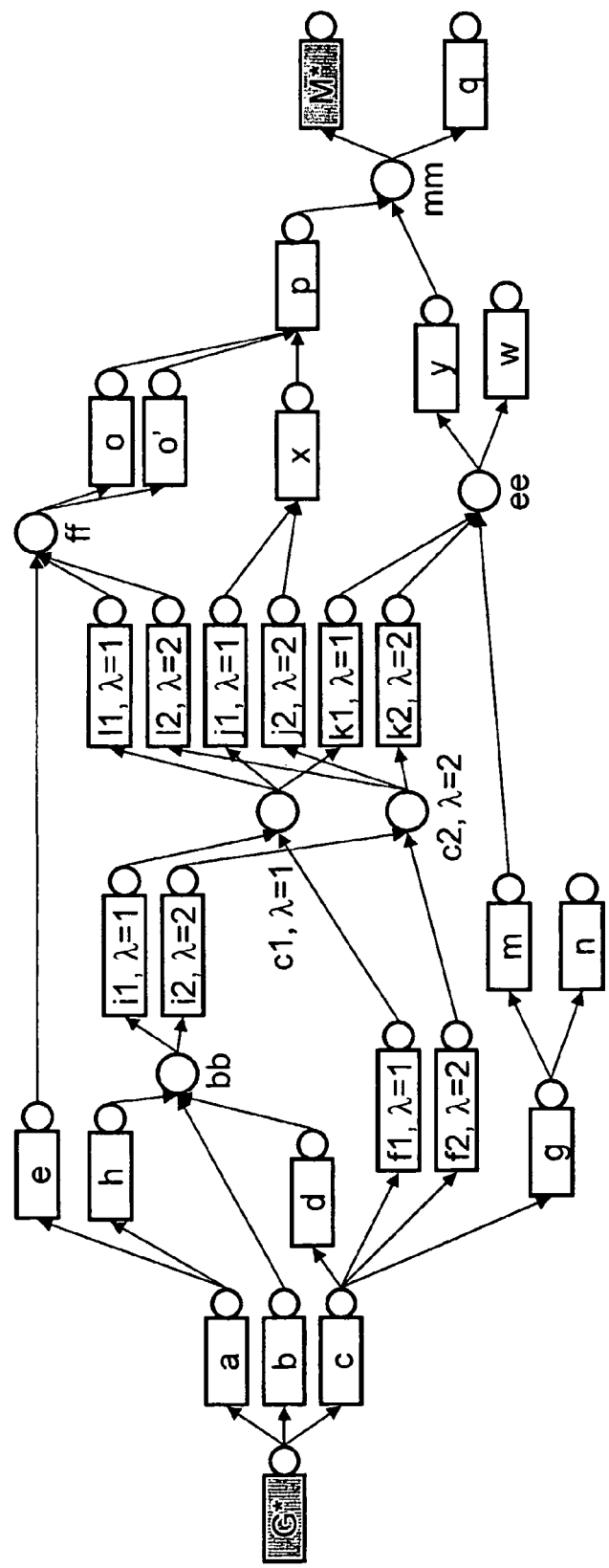
FIG. 25 shows a second exemplary Arc-based graph modeling the OTN network of FIG. 14, according to the present invention.

An Arc-based graph optimized by adopting the Hub technique is shown in FIG. 25 (assuming weights are all the same for all the transitions). In this case the number of objects OH is increased by 4 to OH=32 (the four hubs bb, ff, ee, mm), but the number of columns becomes CH=45.

Let us now imagine increasing the number of wavelengths to 8. In this case the above numbers change as follows:

OL=13·8+2=106,

CL=22·8 (horizontal links)+2·8 (add/drop nodes)+10·[8·(8−1)] (vertical links)=752

OA=16 (Detail 00 Arcs)+2 (Detail 00 UNI-Arcs)+5·8 (Detail 10 Arcs)=58

CA=[4 (Detail 00–Detail 10)+5 (Detail 10–Detail 00)+6 (Detail 10–Detail 10)]·8+20 (Detail 00–Detail 00)=140

OH=[5 (Detail 10 Arcs)+1 (Detail 10 Hubs)]·8+16 (Detail 00 Arcs)+2 (Detail 00 UNI-Arcs)+4 (Detail 00 Hubs)=70, CH=[2 (Detail 00–Detail 10)+3 (Detail 10–Detail 00)+5 (Detail 10–Detail 10)]·8+25 (Detail 00–Detail 00)=105

The memory saving of a model according to the present invention compared to layered graph, for both the number of objects and of matrices columns, is evident, since it increases with the increasing number of wavelengths per fiber.

In order to generalize the above examples, a common complexity parameter that combines columns and object complexity can be provided. It is assumed that m metrics are employed in RWFA and add and drop elements are neglected. According to the above defined Arc class, each column has (5+m) elements, while each Arc object contains seven scalar field (neglecting Assignments) and two fields each comparable to a column with (4+m) elements, in order to store Common weight and Current distance. It is further assumed that node objects of the layered graph have the same structure as Arcs of the Arc-based graph. If the quantum memory occupation q corresponds to the amount of memory necessary to store a scalar data (the difference between integer and real numbers and strings is neglected), it can be shown that the total normalized memory occupation of layered-graph, Arc-based graph and Arc-based graph with Hubs for the sample network of FIG. 14 is given by, respectively:

ML=(15+2·m)·(13·W)+(5+m)·[22+12·(W−1)]·W
MA=(15+2·m)·(5·W+16)+(5+m)−(15·W+20)
MH=(15+2·m)·(6·W+20)+(5+m)·(10·W+25), wherein W is the number of wavelengths per fiber. Absolute memory occupation can be obtained by multiplying ML, MA and MH by q. In FIG. 26 the trends of ML, MA and MH have been plot for increasing values of W and for m=3 and m=8. The two lower graphs show a zoom of the small wavelength portion of the corresponding two upper graphs. As it can be seen, while MA and MH linearly increase with W, ML increases as $W^2$, due to the presence of vertical arcs. Similar or even stronger advantages of the Arc-based graph would be achieved in memory-occupation if node C had been a FXC.

From FIG. 26, it can be also noted that the employment of Hubs for small values of W is not an advantage, in this sample network, in terms of total memory occupation (it is slightly worse than the Arc solution with no Hubs). Generally speaking, a Hub always substitutes a full-mesh digraph pattern between j input and k output Arcs. If c and o are the normalized memory occupation of a column and an object without Switches, then the Hub becomes an advantage when (k·j)·c>(k+j)·c+o, and thus: k>(+o/c)/(j−1). In our example, with m=3 and m=8, k should be at least 5 with j=2 and 3 with j=3. None of the two conditions is satisfied in nodes having Hubs with Detail 01 for any value of W. They are satisfied instead for example in node B for W>2. It is likely that the Hub adoption gives the most significant improvement for nodes with a high physical-connectivity degree (number of adjacent ducts) and for nodes that have a high-granularity intrinsic detail (e.g. 00) but that should be represented at a lower-granularity detail level due to a different User defined detail or to the lower-granularity detail of their neighbor nodes. In order to improve efficiency, a check of the above condition could be included in the Hub post-processor of the nodes so that the Hub solution is chosen only if it is convenient, given the memory occupation values c and o.

A comparison between a layered graph and an Arc-based graph was described in an example in which a single node is WP OXC, while all the others are VWP OXCs. For other node configurations the advantages may be different, or there can be no advantage at all. It has to be pointed out that the model according to the present invention is efficient when the detail can be locally variable, and thus in cases in which the detail should be spot-like increased in few network regions due to the particular switching constraint of few nodes. It is noticed that this is the most common scenario in the real world of OTNs.

The routing algorithm for allocating a lightpath on the graph modeling the OTN network built according to the above is used as explained beforehand, in the general part of the description. Initially, a routing initialization procedure creates source and destination dummy Arcs corresponding to the source and to the destination node of the lightpath. In the initialization procedure, the Current Distance fields of the Arcs are updated as in the following: Zero Value for the source dummy Arc, Infinite Value for all the remaining Arcs. A temporary label is assigned and the source dummy Arc is set as previous Arc for all the Arcs of the graph. Then, a routing procedure lists the Arcs crossed by the path found by the routing algorithm (e.g. a Dijkstra algorithm). Afterwards, a post-routing update procedure updates the fields of the crossed Arcs (e.g. the Status field, the Assignment field, etc.). The lightpath and lightpath compound object are also updated during this phase. Furthermore, the labels (e.g. Current Distance, Label Type) of the Arcs modified by the execution of the algorithm are reset. Finally, a weight updating procedure is run for each metric and routing criterion, in order to update the values of the weights included in the Common Weight and Switches fields of the crossed Arcs.

As explained before, the lightpath-compound activation comprises the setup of all the lightpaths of the compound. It should be noted that this operation requires suitable routing procedures. Such procedures can be implemented by a skilled-in-the-art by modifying the above described basic routing algorithm. For example, if bidirectional symmetrical traffic relations are requested, once the main lightpath of a compound has been routed, a procedure to route a lightpath connecting the same source and destination node in the opposite direction has to be provided. Moreover, if traffic relations protected by a given protection technique in the optical layer are requested, a procedure to reserve capacity to one or more backup lightpaths (according to the chosen protection technique) has to be provided.

The invention claimed is:

1. A computer-implemented method executed by one or more computers for routing at least one traffic flow between a source node and a destination node in a network, said network comprising a plurality of nodes interconnected with each other by a plurality of links according to a predetermined network topology, comprising:
   representing said network with a graph, wherein the graph comprises at least a first plurality of arcs, wherein each of said first plurality of arcs comprises a structure in said network containing information describing at least one link in said network and a node in said network being adjacent to said link;
   determining at least one path on the graph for the at least one traffic flow based on said information, said at least one path on the graph comprising a group of said first plurality of arcs; and
   associating with said at least one path on the graph a respective path in said network for said at least one traffic flow,
   wherein representing the network with the graph comprises associating with each link of the network a number of arcs at least depending on a capability of said node of switching a lightpath from a first wavelength division multiplexing channel at an input of said node to a second wavelength division multiplexing channel at an output of said node in a strictly non-blocking way.

2. The method according to claim 1, wherein said information comprises at least one weighting parameter.

3. The method according to claim 2, wherein a value of said at least one weighting parameter is set based on a first weighting parameter associated with said link and with a second weighting parameter associated with said node.

4. The method according to claim 3, wherein said first weighting parameter comprises at least one first value associated with at least a piece of equipment associated with said link.

5. The method according to claim 4, wherein said second weighting parameter comprises at least one second value respectively associated with at least one switching transition from said link to an adjacent link, supported by said node.

6. The method according to claim 5, wherein said at least one first or second value is set based on a predefined metric.

7. The method according to claim 6, wherein said first or said second weighting parameter respectively comprises an array of first or second values disposed according to predefined array positions, each array position being associated with said respective metric.

8. The method according to claim 7, wherein said second weighting parameter comprises a plurality of arrays of second values, each array of the plurality of arrays being associated with a respective switching transition.

9. The method according to claim 8, wherein said determining at least one path on the graph for the at least one traffic flow based on said information comprises determining a plurality of distances, each distance being associated with said respective metric, based on said array of first values and on said plurality of arrays of second values.

10. The method according to claim 9, wherein said plurality of distances are combined according to a predefined rule in order to determine said at least one path on the graph.

11. The method according to claim 1, wherein said information comprises a unique identifier of the arc.

12. The method according to claim 1, wherein said information further comprises a list of neighbor arcs.

13. The method according to claim 12, wherein said list of neighbor arcs comprises unique identifiers of said neighbor arcs.

14. The method according to claim 1, wherein the higher a blocking capability associated with said switching capability, the higher the number of associated arcs.

15. The method according to claim 14, wherein said number of associated arcs further depends on a transmission capability of said link, said transmission capability of said link being associated with a property of said link to transmit traffic flows having different features.

16. The method according to claim 1, wherein said network nodes comprise respective interfaces, and wherein the graph further comprises a second plurality of arcs, each arc of the second plurality of arcs being associated with a respective interface.

17. The method according to claim 16, wherein the arcs of the first plurality and the arcs of the second plurality have a same field structure.

18. The method according to claim 16, wherein said determining at least one path on the graph for the at least one traffic flow comprises:
    determining a first arc of the second plurality of arcs being associated with interfaces of said source node;
    determining a second arc of the second plurality of arcs being associated with interfaces of said destination node; and
    determining said at least one path on the graph starting from the first arc and arriving at the second arc.

19. A non-transitory computer-readable storage medium having stored thereon a program comprising software code which, when executed by a processor of a computer, performs the method of claim 1.

* * * * *